United States Patent [19]
Yoshida et al.

[11] Patent Number: 5,806,585
[45] Date of Patent: *Sep. 15, 1998

[54] HEAT EXCHANGER, REFRIGERATION SYSTEM, AIR CONDITIONER, AND METHOD AND APPARATUS FOR FABRICATING HEAT EXCHANGER

[75] Inventors: Takayuki Yoshida; Takashi Gotoh; Tsuneo Yumikura; Michimasa Takeshita; Atsushi Motizuki; Yuji Sueto; Kaoru Ikejima, all of Tokyo, Japan

[73] Assignee: Mitsubishi Denki Kabushiki Kaisha, Tokyo, Japan

[ * ] Notice: The term of this patent shall not extend beyond the expiration date of Pat. No. 5,647,431.

[21] Appl. No.: 561,173

[22] Filed: Nov. 20, 1995

[30] Foreign Application Priority Data

Feb. 27, 1995 [JP] Japan ................................ 7-038351
Mar. 20, 1995 [JP] Japan ................................ 7-061023
Jul. 19, 1995 [JP] Japan ................................ 7-182750

[51] Int. Cl.⁶ .................................................. F28F 1/22
[52] U.S. Cl. ................................ 165/171; 165/DIG. 498
[58] Field of Search .................................. 165/150, 171, 165/DIG. 498, 183, 184

[56] References Cited

U.S. PATENT DOCUMENTS

| | | | |
|---|---|---|---|
| 2,469,635 | 5/1949 | Dalin et al. | 165/171 X |
| 2,507,273 | 5/1950 | Schultz . | |
| 3,568,764 | 3/1971 | Newman et al. . | |
| 3,941,293 | 3/1976 | Chartet . | |
| 4,259,771 | 4/1981 | Ogata et al. . | |
| 4,332,080 | 6/1982 | Bleckmann . | |
| 5,647,431 | 7/1997 | Takeshita et al. | 165/119 |

FOREIGN PATENT DOCUMENTS

| | | | |
|---|---|---|---|
| 0031866 | 7/1981 | European Pat. Off. . | |
| 0292565 | 11/1988 | European Pat. Off. . | |
| 0339552 | 11/1989 | European Pat. Off. . | |
| 0693666 | 1/1996 | European Pat. Off. . | |
| 793344 | 1/1936 | France . | |
| 61-153388 | 7/1986 | Japan . | |
| 63-197888 | 8/1988 | Japan | 165/171 |
| 6-26737 | 2/1994 | Japan . | |
| 6-101935 | 4/1994 | Japan . | |
| 6-117728 | 4/1994 | Japan . | |
| 6-159983 | 6/1994 | Japan . | |
| 247836 | 12/1947 | Switzerland . | |
| 636615 | 7/1948 | United Kingdom . | |
| 976003 | 11/1964 | United Kingdom | 165/171 |

Primary Examiner—Allen J. Flanigan
Attorney, Agent, or Firm—Wolf, Greenfield & Sacks, P.C.

[57] ABSTRACT

A plurality of heat transfer tubes are disposed at certain intervals, in-tube operating fluid (such as coolant) passes therethrough, and a plurality of small-gage wires are used as a heating fin. One small-gage wire is wound at a pair of heat transfer tubes 1a and 1c in a spiral manner, and another small-gage wire is wound at a pair of heat transfer tubes 1b and 1c in the spiral manner, and still another small-gage wire is wound at a pair of heat transfer tubes 1b and 1d in the spiral manner. Thereby, while higher heat transfer coefficient can be achieved, and a heating surface area is ensured, clogging can be avoided even when moisture in air condenses on a surface of a heat exchanger. As a result, it is possible to realize a high-performance and compact heat exchanger used for air conditioning.

10 Claims, 39 Drawing Sheets

FIT SMALL-GAGE WIRE
WHILE ROTATING

JOIN

SOLDER LAYER

⟵— FLOW IN COOLING OPERATION

⟵-- FLOW IN HEATING OPERATION

HEAT EXCHANGER, REFRIGERATION SYSTEM, AIR CONDITIONER, AND METHOD AND APPARATUS FOR FABRICATING HEAT EXCHANGER

BACKGROUND OF THE INVENTION

1. Field of the Invention

The present invention relates to a heat exchanger used for a refrigeration system, an air conditioner, and so forth, and to a method and an apparatus for fabricating the heat exchanger.

2. Description of the Prior Art

FIG. 64 is a perspective view showing a conventional heat exchanger used for air conditioning disclosed in Japanese Patent Publication (Kokai) No. 61-153388, and FIG. 65 is a sectional view of FIG. 64. In FIGS. 64 and 65, reference numeral 1 means heat transfer tubes, and 2 is small-gage wires connected to the heat transfer tubes 1 so as to serve as a fin. Reference mark A means out-tube operating fluid (such as air), and B is in-tube operating fluid (such as coolant). In the heat exchanger, the small-gage wires 2 thread through the heat transfer tubes 1 disposed in parallel, and mutually intersect. That is, the heat exchanger has a mesh-type structure including the heat transfer tubes 1 serving as the warp, and the small-gage wires 2 serving as the weft.

A description will now be given of the operation. As shown in FIG. 65, in the heat exchanger used for air conditioning in the conventional embodiment, when the out-tube fluid A flows between the small-gage wires 2 threading through the heat transfer tubes 1, the small-gage wires 2 disturb a flow of the out-tube fluid A. That is, as shown by the arrow of FIG. 65, the out-tube fluid A flowing directly below the small-gage wire 2 collides with the small-gage wire 2, and is divided into right and left flows. Besides, there is another flow of the out-tube fluid A upward moving on a surface of the heat transfer tube 1 along the small-gage wire 2. This results in a long contact time between the out-tube operating fluid A and the heat transfer tubes 1, that is, a long contact time between the out-tube operating fluid A and the in-tube operating fluid B.

In order to fabricate such a heat exchanger, the small-gage wires 2 may thread through the plurality of heat transfer tubes 1 disposed in parallel with the small-gage wires 2 mutually intersecting. That is, the heat exchanger is assembled to have the mesh-type structure including the heat transfer tubes 1 serving as the warp, and the small-gage wires 2 serving as the weft. Further, after the assembly of the mesh-type structure, contact portions between the heat transfer tubes 1 and the small-gage wires 2 are welded one by one in order to enhance thermal conductivity.

FIG. 66 shows another conventional embodiment, i.e., a plate fin-type heat exchanger used for a room air conditioner and so forth. For assembly of the heat exchanger, instead of the small-gage wires 2 serving as a fin, plate-type fins are mounted at interval of about 1 to 5 mm. Further, a heat transfer tube 1 is inserted into a hole provided in the fin, and after the insertion, fluid is introduced into the heat transfer tube 1 with pressure. Thereby, a diameter of the heat transfer tube 1 is expanded to bring the heat transfer tube 1 into tight contact with the plate fin 102.

In the plate fin-type heat exchanger, the out-tube operating fluid A can flow along the plate fin without large turbulence, resulting in reduced thermal conductivity.

In recent years, a diameter of the heat transfer tube has been decreased in order to provide a more compact and higher-performance heat exchanger. However, when the narrow heat transfer tube is applied to the heat exchanger (in particular, an evaporator), a higher pressure loss is caused in a coolant flowing in the tube, resulting in a reduced performance of an air conditioner. Hence, in a typical method, the number of path of the heat exchanger is increased to decrease an amount of circulating coolant per path, thereby avoiding the reduction of performance.

Typically, a branch pipe may be used for several paths. For several tens to several hundreds paths, in many cases, an inlet header and an outlet header are mounted, and a plurality of heat transfer tubes are disposed between the headers so as to provide a multi-path heat exchanger (evaporator).

FIG. 67 is a sectional view of a conventional multi-path evaporator disclosed in Japanese Patent Publication (Kokai) No. 6-26737. In the drawing, reference numeral 3a means an inlet header, and 3b is an outlet header. Reference numeral 45 means inlet coolant piping. The inlet coolant piping is a straight pipe whose length is equal to or less than twenty times a bore diameter of an expansion valve 58, and an irregular surface 61 is provided in the inlet coolant piping 45.

FIGS. 68 and 69 are font views of a conventional gas-liquid separating heat exchanger disclosed in Japanese Patent Publication (Kokai) No. 6-117728. In FIG. 68, an opening in a lower inlet header 3a is coupled with an opening in an upper outlet header 3b through a gas-liquid separating cylinder 63 having a predetermined length. Further, reference numeral 2 means a plurality of mesh fins mounted to heat transfer tubes 1 in a direction perpendicular to a heating surface, and 64 is a throttle valve mounted to avoid a counter-flow in the vicinity of a connecting portion of the outlet header 3b to the gas-liquid cylinder 63. A gas-liquid two-phase coolant flows through inlet coolant piping 45, and is vertically divided into two phases, i.e., an upper gaseous phase and a lower liquid phase, by a difference in gravity therebetween in the gas-liquid separating cylinder 63. The gas coolant is bypassed through the outlet header 3b, and only the liquid coolant is supplied into the heat transfer tubes 1 through the inlet header 3a. Thus, the liquid can uniformly be distributed to paths.

As shown in FIG. 69, a float pipe 66 vertically passes through the gas-liquid separating cylinder 63 to form a liquid level controller 65. Further, a cylindrical float 67 is fitted into the float pipe 66 so as to vertically move according to a variation in liquid level of the liquid coolant in a gas-liquid separating chamber. A plurality of openings 68 and 69 are provided in both upper and lower ends of the float pipe 66. In such a structure, the gas coolant can be bypassed through the openings 68 in the upper end to the outlet header 3b.

FIG. 70 is a sectional view of a conventional multi-path evaporator disclosed in Japanese Patent Publication (Kokai) No. 6-159983. In the drawing, a plurality of coolant dispersing holes 71 are provided in a peripheral wall of a coolant dispersing tube body 70, and the coolant dispersing tube body 70 is disposed in an inlet header 3a. A liquid coolant introduced into the inlet header 3a through the coolant dispersing holes 71 can be distributed to the heat transfer tubes 1.

FIG. 71 is a front view of a conventional multi-path evaporator disclosed in Japanese Patent Publication (Kokai) No. 6-101935. In the drawing, a plurality of heat transfer tubes 1 are vertically disposed in parallel to each other, and an inlet header 3a and an outlet header 3b are connected through the heat transfer tubes 1. Further, an upper portion of the inlet header 3a and an upper portion of the outlet header 3b are communicated through a gas bypass pipe 72.

The conventional heat exchanger used for air conditioning has the above structure. In the heat exchanger used for air conditioning, the heat transfer tube itself has a narrow width in the range of 1 to 5 mm. The heat exchanger has greater heat transfer coefficient than that of a heat exchanger used in a conventional room air conditioner. However, for the same front surface area, the heat exchanger has too small heating surface area which is equal to or less than one fifth of a heating surface area of the heat exchanger used in the conventional room air conditioner. Consequently, there is a problem in that a required amount of heat exchange can not be obtained. In order to overcome the problem, it can be considered to use a plurality of rows of heating surfaces. However, when the conventional heat exchangers as described above are used in a plurality of rows, an air side pressure loss becomes high, and an air flow is reduced in spite of the same fan power. Thus, there is the problem in that the required amount of heat exchange can not be obtained. In particular, there is another problem in that the above tendency becomes significant when the heat exchanger is used as an evaporator, and vapor in air condenses on the heating surface.

Further, non-azeotropic mixed coolant can be used in the heat transfer tube. In this case, the plurality of rows of heat exchangers may be arranged, and the non-azeotropic mixed coolant may sequentially be supplied to the heat exchangers starting from the back row. The non-azeotropic mixed coolant may be a cross flow serving as a spurious counter-flow with respect to a flow of the air. It is known that this technique can provide a considerably enhanced performance. However, an increase in the number of row increases a width of the heat exchanger, resulting in a larger unit. Hence, at the most, only two rows of the heat exchangers can be used in the conventional room air conditioner and so forth. Thus, there are problems in that, for example, it is extremely difficult to provide the cross flow serving as the spurious counter-flow.

Further, in the conventional heat exchanger, after the completion of assembly of the heat transfer tubes and the small-gage wires in the mesh-type structure, tight contact becomes insufficient between the heat transfer tube and the small-gage wire. Consequently, thermal conductivity between the heat transfer tube and the small-gage wire is reduced. As a result, there is a problem of reduction of heat exchanging ability.

Further, after the heat transfer tubes and the small-gage wires are assembled in the mesh-type structure, the heat transfer tubes the small-gage wires are welded for assembly. When the assembly is completed, the heat exchanging ability can be enhanced. However, since each connecting portion between the heat transfer tube and the small-gage wire should discretely be welded, fabrication requires vast amount of labor. As a result, there is another problem in that it is difficult to realize mass production.

Further, in order to connect the heat transfer tube to the header, each connecting portion therebetween should discretely be welded so that fabrication requires vast amount of labor. In addition, since supply of welding material can not be controlled, an excess or a shortage is caused in welding material, resulting in insufficient tight contact between the heat transfer tube and the header. As a result, there is a further problem in that the heat exchanging ability is reduced due to leakage of the in-tube operating fluid.

Further, the heat transfer tubes and the small-gage wires are assembled in the mesh-type structure so that the small-gage wires mutually intersect between the heat transfer tubes. Hence, water generated by dehumidification can not drop from an intersecting portion, and a flow of the out-tube operating fluid A is disturbed. As a result, there is a problem of reduction of the heat exchanging ability.

Further, in the plate fin-type heat exchanger, the out-tube operating fluid A can flow along the plate fin without large turbulence, resulting in reduced heat transfer coefficient. As a result, there is a problem in that the heating surface area of the heat exchanger, that is, the heat exchanger itself must be made larger so as to compensate for the reduced heat transfer coefficient.

Further, in the conventional multi-path heat exchanger, when the coolant flows into the inlet header through the inlet coolant piping, in many cases, the coolant forms a wave-like flow in which a gaseous phase and a liquid phase are separated from one another in the inlet header. Hence, when the coolant flows into the plurality of heat transfer tubes, an inhomogeneous distribution of a coolant flow is caused. In addition, there are some heat transfer tubes into which only the gaseous phase flows, and at which heat exchange can not effectively be performed. As a result, there is a still further problem in that an area used for effective heat exchange (hereinafter referred to as effective heating surface area) becomes smaller than an actual heating surface area.

Further, in the conventional heat exchanger, the coolant is expanded by the expansion valve to form a homogeneous two-phase flow, and passes through the coolant piping including the straight pipe to flow into the inlet header. Therefore, the coolant forms the homogeneous two-phase flow at an inlet portion of the header. However, in many cases, the coolant is decelerated at a time of inflow, the gaseous phase and the liquid phase are gradually separated from one another, and the coolant finally forms the wave-like flow. Hence, at a portion other than the inlet portion of the inlet header, there is caused the inhomogeneous distribution of the coolant flowing into the plurality of heat transfer tubes. In addition, since the gaseous phase and the liquid phase are separated from one another, only the gaseous phase flows into some of the heat transfer tubes. As a result, there is a still further problem of reduction of the effective heating surface area.

Further, the conventional heat exchanger requires special means such as gas-liquid separating cylinder. As a result, there are problems in that the heat exchanger has a complicated structure, and the coolant can not smoothly flow because the coolant flows into the headers after division into the gaseous phase and the liquid phase.

Further, in the conventional heat exchanger, it is necessary to provide an additional dispersing tube body in the header. Further, a flow velocity is more decreased toward the inner side of the inlet header in its longitudinal direction. As a result, there is a further problem in that the coolant can not uniformly be distributed.

Further, in the conventional heat exchanger, inlet coolant piping 5 is mounted at a lower position of the inlet header, and outlet coolant piping 6 is mounted at an upper portion of the outlet header 2. Thus, the heat exchanger requires a large mounting space in a unit, and is inconveniently mounted to an air conditioner which is long from side to side. In addition, since the coolant flows in a direction from a lower portion to an upper portion in the inlet header, the coolant can not sufficiently be distributed to the upper portion of the header in case of a reduced flow rate. As a result, there is a problem in that a control is required to sufficiently distribute the coolant to the heat transfer tubes.

SUMMARY OF THE INVENTION

The present invention is made to overcome the above problems, and it is an object of the present invention to provide a heat exchanger in which heat transfer coefficient on the outside of a heat transfer tube can be increased to promote heating, and reduction of an amount of heat exchange due to reduction of an air flow can be restrained, and to provide a high-performance refrigeration system or air conditioner.

It is another object of the present invention to provide a heat exchanger in which an amount of heat exchange can be increased by increasing an area of a heating fin, a pressure loss can be reduced, and reduction of the amount of heat exchange due to reduction of an air flow can be restrained.

It is still another object of the present invention to provide a heat exchanger in which an amount of heat exchange can be increased by increasing a heating surface area, and an occupied space can be reduced as a whole.

It is a further object of the present invention to provide a heat exchanger in which heat transfer coefficient on the outside of a heat transfer tube can be increased to promote heating, an amount of heat exchange can be increased by increasing a heating surface area, reduction of the amount of heat exchange due to reduction of an air flow can be restrained, and an air side pressure loss can be decreased.

It is a still further object of the present invention to provide a heat exchanger having a simple structure in which an amount of heat exchange can be increased by increasing heating surface area, and reduction of the amount of heat exchange due to reduction of an air flow can be restrained.

It is another object of the present invention to provide a heat exchanger in which sufficiently tight contact can be established between small-gage wires and heat transfer tubes so as to enhance heat transfer of a heating surface of the heat exchanger including the small-gage wires and the heat transfer tubes, and promote heat exchange between in-tube operating fluid and out-tube operating fluid.

It is still another object of the present invention to provide a highly reliable heat exchanger in which it is possible to avoid leakage of in-tube operating fluid from a connecting portion between a heat transfer tube and a header, and avoid reduction of heat exchanging ability due to, for example, deformation of a small-gage wire.

It is a further object of the present invention to provide a method of fabricating a highly reliable heat exchanger, in which tight contact can be easily and surely made with a good workability in each connecting portion of the heat exchanger including small-gage wires and heat transfer tubes, or including small-gage wires, heat transfer tubes, and herders, and deformation of the small-gage wires can be avoided.

It is a still further object of the present invention to provide a tension jig of an apparatus for fabricating a heat exchanger, having a convenient structure in which appropriately balanced tension can be applied to small-gage wires, and deformation of the small-gage wires can be avoided.

It is a still further object of the present invention to provide a heat exchanger in which only a liquid phase can be introduced into heat transfer tubes at a time of inflow of a two-phase coolant, and an effective heating surface area is never decreased.

According to the first aspect of the present invention, for achieving the above-mentioned objects, there is provided a refrigeration system including a compressor, a condenser, and an evaporator, to circulate a coolant through the compressor, the condenser, and the evaporator. In the refrigeration system, a heat exchanger of at least one of the condenser and the evaporator has a plurality of heat transfer tubes disposed between a pair of headers, through which fluid such as coolant passes, and a small-gage wire fin wound in a spiral manner between specific heat transfer tubes among the plurality of heat transfer tubes.

In the operation, operating fluid such as air flows on the outside of the heat transfer tubes. When the air passes by the small-gage wire, the air is accelerated, and the small-gage wire serves as an accelerator to disturb an air flow, thereby generating a three-dimensional turbulent flow. Hence, the turbulent air passing through the heat exchanger can enhance surface heat transfer coefficient of the heat exchanger. As a result, it is possible to promote heat transfer between the air and the coolant passing through the heat transfer tubes. Further, the small-gage wires are wound at the heat transfer tubes in the spiral manner. Consequently, the small-gage wires do not intersect each other in a cross-section perpendicular to the heat transfer tubes, and a larger gap can be established between the small-gage wires in an air flow direction. Therefore, even in such a circumstance that moisture in the air condenses, drops of water are rarely held between the small-gage wires so that clogging is more rarely caused due to the drops of water. As a result, it is possible to avoid reduction of heat exchanging ability of the heat exchanger.

According to the second aspect of the present invention, there is provided an air conditioner including an indoor machine and an outdoor machine mutually connected through piping, to circulate a coolant by a compressor. In the air conditioner, a heat exchanger of any one of the indoor machine and the outdoor machine includes a plurality of heat transfer tubes disposed between a pair of headers, through which fluid such as coolant passes, and a small-gage wire fin wound in a spiral manner between specific heat transfer tubes among the plurality of heat transfer tubes.

Preferably, an angle of spiral of the small-gage wire wound in the spiral manner is set greater than a predetermined angle.

The plurality of heat transfer tubes may be curved.

Alternatively, an array including the plurality of heat transfer tubes may be disposed in a curved form or a bent form.

According to the third aspect of the present invention, there is provided a heat exchanger including a plurality of heat transfer tubes disposed at intervals, and small-gage wires wound to surround outer peripheries of a plurality of specific heat transfer tubes among the plurality of heat transfer tubes. In the heat exchanger, the small-gage wires are joined with outer surfaces of the plurality of heat transfer tubes while tension is applied to pull in a direction to expand intervals between the plurality of heat transfer tubes. Preferably, the small-gage wires are joined with the heat transfer tubes through brazing joint with predetermined tension applied to the heat transfer tubes.

According to the fourth aspect of the present invention, there is provided an apparatus for fabricating a heat exchanger, including a forming mechanism for providing a ring-shaped form or a spiral form for small-gage wires wound to surround outer peripheries of a plurality of specific heat transfer tubes among a plurality of heat transfer tubes disposed at intervals, a brazing mechanism for concurrently heating and brazing the plurality of heat transfer tubes and the wound small-gage wire, and jigs engaging the heat transfer tubes so as to apply tension to expand intervals between the heat transfer tubes at a time of brazing by the brazing mechanism.

The jig may include at least two engaging mechanisms for respectively removably engaging the one heat transfer tube, a guiding mechanism for allowing the engaging mechanisms to move in a predetermined direction, and a loading mechanism for applying force to move the guiding mechanism in a predetermined direction. Preferably, the jig further includes a plurality of fixtures to respectively fix the engaging mechanisms, the guiding mechanism guides the plurality of fixtures in a predetermined direction and moves the fixtures so as to expand a heating surface including the plurality of heat transfer tubes. Preferably, in an apparatus for fabricating a heat exchanger, at least tension is applied in a direction parallel to heating surfaces so as to expand an interval between a pair of heat transfer tubes in the heating surfaces including the plurality of heat transfer tubes.

According to the fifth aspect of the present invention, there is provided an apparatus for fabricating a heat exchanger, having an engaging mechanism for engaging a heating surface including a plurality of heat transfer tubes, and small-gage wires wound to surround outer peripheries of specific heat transfer tubes among the plurality of heat transfer tubes, a guiding mechanism connected to the engaging mechanism, for guiding the engaging mechanism movably in a predetermined direction, and an elastic mechanism connected to the engaging mechanism, for pushing the engaging mechanism in a predetermined direction.

According to the sixth aspect of the present invention, there is provided a heat exchanger including a plurality of heat transfer tubes disposed at intervals, small-gage wires wound to surround outer peripheries of specific heat transfer tubes among the plurality of heat transfer tubes, and headers having joints joined with any one ends of both ends of the plurality of heat transfer tubes, and connected to the respective ends of the plurality of heat transfer tubes through the joints. In the heat exchanger, brazing material having a predetermined thickness is previously applied to at least one of outer surfaces of the plurality of heat transfer tubes and joint surfaces of the headers, and the previously applied brazing material is melted and cooled for brazing joint between the ends of the heat transfer tubes and the joints of the headers.

According to the seventh aspect of the present invention, there is provided a heat exchanger including a plurality of heat transfer tubes disposed at intervals, headers having fitting portions fitted with any one ends of both ends of the plurality of heat transfer tubes, and connected to the ends of the plurality of heat transfer tubes through the fitting portions, and small-gage wires wound in a spiral manner to surround outer peripheries of the plurality of heat transfer tubes. In the heat exchanger, brazing material having a predetermined thickness is previously applied to outer surfaces of at least one of the small-gage wires and the plurality of heat transfer tubes, and to at least any one of outer surfaces of the plurality of heat transfer tubes and fitting portion surfaces of the headers. Further, the previously applied brazing material is melted and cooled to join the small-gage wires with the outer surfaces of the plurality of heat transfer tubes, and to join the both ends of the heat transfer tubes with the fitting portions in the headers.

According to the eighth aspect of the present invention, there is provided a method of fabricating a heat exchanger including a plurality of heat transfer tubes disposed at intervals, and small-gage wires wound in a spiral manner to surround outer peripheries of the plurality of heat transfer tubes. The method includes the forming step of providing a spiral form for the small-gage wires engaging the plurality of heat transfer tubes, the applying step of applying brazing material having a predetermined thickness to outer surfaces of at least any one of the small-gage wires and the plurality of heat transfer tubes, the setting step of setting the spiral small-gage wires to surround outer peripheries of heat transfer tubes, the tension step of applying tension to the spiral small-gage wires by, after the setting step, pulling the heat transfer tubes in a direction to expand intervals between the disposed heat transfer tubes, and the joint step of melting and cooling the brazing material so as to join the tensioned small-gage wires with outer surfaces of the heat transfer tubes.

According to the ninth aspect of the present invention, there is provided a method of fabricating a heat exchanger including a plurality of heat transfer tubes disposed at intervals, headers having fitting portions fitted with any one ends of both ends of the plurality of heat transfer tubes, and connected to the ends of the plurality of heat transfer tubes through the fitting portions, and small-gage wires wound in a spiral manner at the heat transfer tubes between the headers. The method includes the applying step of applying brazing material having a predetermined thickness to at least any one of outer surfaces of the plurality of heat transfer tubes and fitting portion surfaces of the headers, the setting step of, after the applying step, fitting the both ends of the heat transfer tubes with the fitting portions in the headers, and the joint step of, after the setting step, melting and cooling the brazing material so as to join the ends with the fitting portions.

According to the tenth aspect of the present invention, there is provided a method of fabricating a heat exchanger including a plurality of heat transfer tubes disposed at intervals, headers having fitting portions fitted with any one ends of both ends of the plurality of heat transfer tubes, and connected to the ends of the plurality of heat transfer tubes through the fitting portions, and small-gage wires wound in a spiral manner to surround outer peripheries of the plurality of heat transfer tubes. The method includes the forming step of providing a spiral form for the small-gage wires engaging the plurality of heat transfer tubes, the first setting step of setting the spiral small-gage wires to surround the outer peripheries of the heat transfer tubes, the second setting step of fitting the ends of the heat transfer tubes with the fitting portions in the headers, the first joint step of joining the ends of the heat transfer tubes with the fitting portions in the headers, and the second joint step of joining the small-gage wires with outer surfaces of the plurality of heat transfer tubes.

According to the eleventh aspect of the present invention, there is provided a method of fabricating a heat exchanger including a plurality of heat transfer tubes disposed at intervals, headers having fitting portions fitted with any one ends of both ends of the plurality of heat transfer tubes, and connected to the ends of the plurality of heat transfer tubes through the fitting portions, and small-gage wires wound in a spiral manner to surround outer peripheries of the plurality of heat transfer tubes. The method includes the forming step of providing a spiral form for the small-gage wires engaging the plurality of heat transfer tubes, the first applying step of applying brazing material having a predetermined thickness to outer surfaces of at least any one of the spiral small-gage wires and the plurality of heat transfer tubes, the second applying step of applying brazing material having a predetermined thickness to at least any one of outer peripheries of the plurality of heat transfer tubes and fitting portion surfaces of the headers, the first setting step of setting the spiral small-gage wires to surround outer peripheries of the adjacent heat transfer tubes, the second setting step of fitting the ends of the heat transfer tubes with the fitting portions in the headers, and the joint step of melting the brazing material applied in the first and second applying steps so as to join the small-gage wires with the outer surfaces of the heat transfer tubes, and of concurrently joining the ends of the heat transfer tubes with the fitting portions in the headers.

Preferably, the method of fabricating the heat exchanger further includes the step of dipping the ends of the plurality of heat transfer tubes and the fitting portions in the headers into a bath of molten solder.

According to the twelfth aspect of the present invention, there is provided a heat exchanger including a plurality of heat transfer tubes disposed at intervals, a small-gage wire fin joined with the plurality of heat transfer tubes to form a heating surface, flat or channel-shaped header plates connected to ends of the plurality of heat transfer tubes through fitting portions fitted with at least any one ends of the both ends of the plurality of heat transfer tubes, and header covers joined with side surfaces of the header plates to cover one surfaces of the header plates. In the heat exchanger, the heating surface including the plurality of heat transfer tubes is connected to the fitting portions in the header plates such that the heating surface is mounted to the header plates on the side opposed to the header covers.

According to the thirteenth aspect of the present invention, there is provided a method of fabricating a heat exchanger including a plurality of heat transfer tubes disposed at intervals, header plates connected to ends of the plurality of heat transfer tubes through fitting portions fitted with any one ends of both ends of the plurality of heat transfer tubes, and header covers connected to the header plates. The method includes the first joint step of inserting the ends of the plurality of heat transfer tubes into the fitting portions in the header plates for joint, the cutting step of cutting excess portions of the heat transfer tubes passing through the fitting portions, the forming step of bending the header plates to form channel-shaped header plates, and the second joint step of, after the forming step, coating openings in the channel-shaped header plates with the header covers for joint.

According to the fourteenth aspect of the present invention, there is provided a heat exchanger including an inlet header into which a gas-liquid two-phase coolant flows, an outlet header from which the coolant is discharged after heat exchange, the inlet header and the outlet header being disposed on the upper and lower sides at an interval, and a plurality of heat transfer tubes in communication between the inlet header and the outlet header. The heat exchanger further includes a decelerating portion mounted to the inlet header so as to decelerate a coolant flow, and a gas bypass pipe to send to the outlet header a gaseous phase coolant among the coolant divided into the gaseous phase and a liquid phase in the decelerating portion. Preferably, a rectifying mechanism for rectifying the coolant is provided between a coolant flow inlet of the inlet header and the gas bypass pipe. Alternatively, the rectifying mechanism may include a honeycomb-like lattice. Further, a projection may preferably extend from an upper portion in a section of a flow path between the coolant flow inlet of the inlet header and the gas bypass pipe.

According to the fifteenth aspect of the present invention, there is provided a heat exchanger including an inlet header connected to coolant piping, into which a gas-liquid two-phase coolant flows, an outlet header disposed at an upper position than that of the inlet header, and a plurality of heat transfer tubes to communicate the inlet header with the outlet header. The heat exchanger further includes a gas bypass pipe mounted between the heat transfer tubes and a coolant piping connecting portion of the inlet header, and to communicate an upper portion of the inlet header with a lower portion of the outlet header. Preferably, the connecting portion of the gas bypass pipe to the inlet header has a larger bore diameter than that of the connecting portion to the outlet header. Alternatively, a tube axis of the gas bypass pipe may eccentrically extend on the side of the heat transfer tubes in the vicinity of the connecting portion to the inlet header.

According to the sixteenth aspect of the present invention, there is provided a heat exchanger including an inlet header connected to coolant piping, into which a coolant flows, an outlet header disposed at an upper position than that of the inlet header, and a plurality of heat transfer tubes to communicate the inlet header with the outlet header. The heat exchanger further includes a perforated plate having through-holes to partition a space in the inlet header into upper and lower spaces, and a gas bypass pipe to communicate an end of the inlet header on the side opposed to a coolant piping connecting portion with the outlet header. In the heat exchanger, openings in the heat transfer tubes are positioned under the perforated plate.

According to the seventeenth aspect of the present invention, there is provided a heat exchanger including an inlet header connected to coolant piping, into which a coolant flows, an outlet header disposed at a lower position than that of the inlet header, and a plurality of heat transfer tubes in communication between the inlet header and the outlet header. The heat exchanger further includes a gas bypass pipe mounted at an end of the inlet header on the side opposed to a coolant piping connecting portion so as to communicate the inlet header with the outlet header.

Preferably, an interval in which the coolant forms a stratified flow is provided between the coolant piping connecting portion of the inlet header and the heat transfer tubes.

Preferably, the inlet header is provided with a first interval having a coolant flow inlet, and a second interval coupled with the heat transfer tubes and the gas bypass pipe, and the inlet header is bent to adjacently dispose the first interval and the second interval.

Preferably, a gas-liquid separating member is mounted to separate a gas from liquid in the gas bypass pipe.

Preferably, a fin used for heat exchange is provided for the gas bypass pipe.

Preferably, a check valve is provided for the gas bypass pipe.

Preferably, in all the heat exchangers, a small-gage wire having a fin diameter less than 0.5 mm is employed.

According to the eighteenth aspect of the present invention, there is provided a heat exchanger in which heat exchange is performed by bringing a heating fin into contact with a lot of heat transfer tubes disposed in parallel between two upper and lower headers. The heat exchanger further includes the fin including small-gage wires wound in a spiral manner between the heat transfer tubes, and a gas bypass pipe in communication between an upper portion of the inlet header and the outlet header from which a coolant is discharged, and having a larger sectional area than that of the heat transfer tube. In the heat exchanger, the inlet header has a larger sectional area than that of inlet coolant piping into which a gas-liquid two-phase coolant flows. Preferably, the heat exchanger further includes a stabilizing mechanism mounted to an inflow portion through which the coolant flows into the inlet header, for stabilizing a liquid level of a liquid phase coolant.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
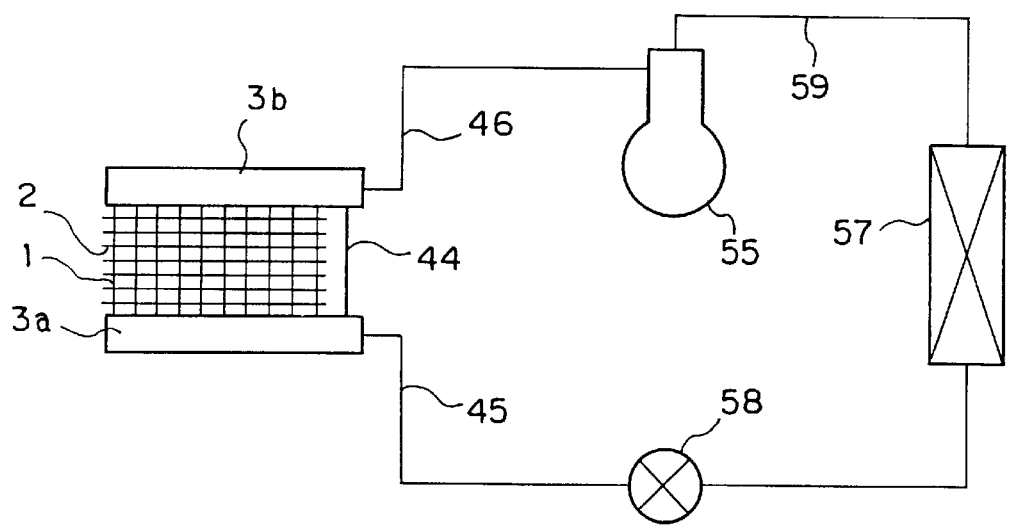
FIG. 1 is a circuit diagram showing a coolant circuit according to one embodiment of the present invention.
Figure 2:
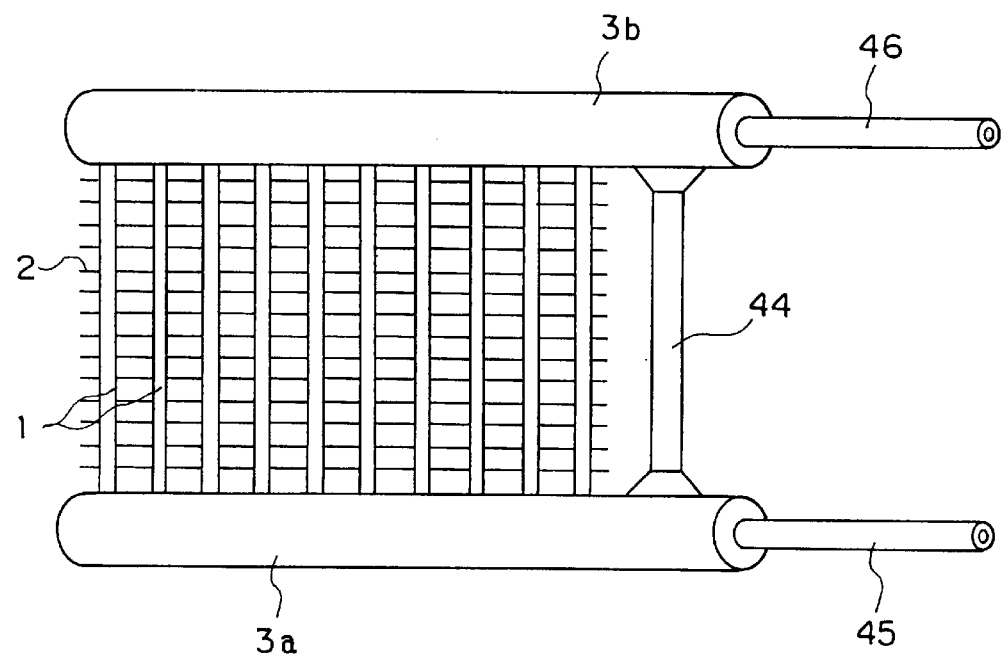
FIG. 2 is a front view of a heat exchanger according to one embodiment of the present invention.

FIG. 1 is a diagram showing an illustrative structure of a coolant circuit including a heat exchanger according to one embodiment of the present invention. In the drawing, reference numeral 55 means a compressor, 57 is a heat exchanger used for an outdoor machine, 58 is an expansion valve, 59 is coolant piping, 45 is inlet coolant piping, and 46 is outlet coolant piping. The inlet and outlet coolant piping are connected to the heat exchanger of the present invention, including an inlet header 3a, an outlet header 3b, heat transfer tubes 1, a gas bypass pipe 44, and fins 2. FIG. 2 is a perspective view showing the enlarged heat exchanger in the embodiment. Though the present invention is applied to the heat exchanger used for an indoor machine in FIG. 1, it must be noted that the present invention may be applied to the heat exchanger used for the outdoor machine, or a heat exchanger used for another purpose. A description will now be given of embodiments of the present invention.

A two-phase coolant flows into the inlet header 3a through the inlet coolant piping 45 while the coolant is decelerated. The coolant forms a wave-like flow in which an upper gaseous phase and a lower liquid phase are separated from one another. Hence, the gaseous phase intensively flows into the gas bypass pipe 44, and only the liquid phase passes through the plurality of heat transfer tubes 1. As a result, it is possible to eliminate an inhomogeneous distribution of the coolant. Thereafter, the coolant flows into the plurality of heat transfer tubes 1 to perform heat exchange between the coolant and out-tube operating fluid, and is evaporated in the tube. After the coolant turns into the gaseous phase to flow into the outlet header 3b, the coolant is discharged through the outlet coolant piping 46 together with the gaseous phase discharged through the gas bypass pipe 44. As a result, it is possible to provide uniform heat exchange in the plurality of heat transfer tubes 1.

Figure 3:
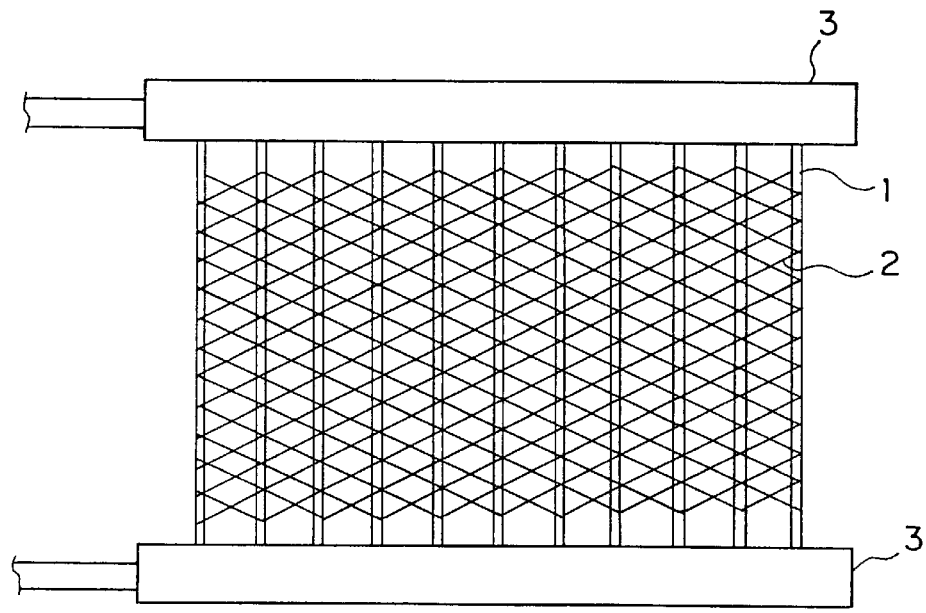
FIG. 3 is a front view showing a heating surface of a heat exchanger used for air conditioning according to one embodiment of the present invention.
Figure 4:
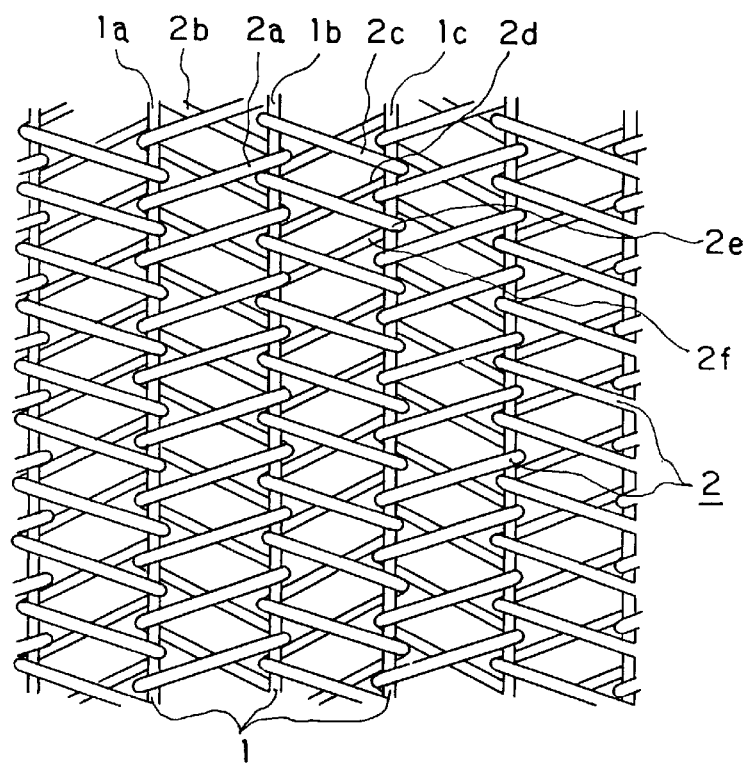
FIG. 4 is an enlarged diagram of the heating surface of FIG. 3.

FIG. 3 is a plan view of a heat exchanger used for air conditioning according to the embodiment, and FIG. 4 is a diagram showing an enlarged heating surface. In FIG. 4, reference numerals 1, 1a, 1b, and 1c mean heat transfer tubes disposed at certain intervals. In-tube operating fluid A (such as coolant) serving as heating medium passes through the heat transfer tubes.

Reference numerals 2, 2a and 2b, and 2c and 2d mean the same small-gage wires respectively forming heating fins. The small-gage wire 2a and 2b is wound at the heat transfer tubes 1a and 1b in a spiral manner, and the small-gage wire 2c and 2d is wound at the heat transfer tubes 1b and 1c in the spiral manner. The small-gage wire 2a and 2b, and the small-gage wire 2c and 2d are wound such that directions of rotation of spirals are mutually opposed.

Further, the small-gage wires 2a and 2d are disposed in the upstream of out-tube operating fluid (such as air), and the small-gage wires 2b and 2c are disposed in the downstream thereof. Further, a pair of upper and lower headers 3 are mounted to distribute the in-tube operating fluid A to the heat transfer tubes, or gather the in-tube operating fluid from the heat transfer tubes.

A description will now be given of the operation. When air passes through the small-gage wire 2a (or 2c), the air is accelerated, and the small-gage wire 2a serves as an accelerator to disturb an air flow, thereby generating a three-dimensional turbulent flow. Hence, the turbulent air passing through the heat exchanger can enhance surface heat transfer coefficient of the heat exchanger. As a result, it is possible to promote heat transfer between the air and the coolant in the heat transfer tube 1.

Further, the small-gage wires 2 are wound at the adjacent heat transfer tubes 1 in the spiral manner. Consequently, the small-gage wires 2 do not intersect each other in a cross-section perpendicular to the heat transfer tubes 1, and a larger gap can be established between the small-gage wires 2 in an air flow direction. Thus, in such a structure, the small-gage wires 2 rarely prevent drops of water generated by dehumidification from dropping in a tube axial direction of the heat transfer tube 1. Therefore, even if the heat exchanger is used in such a circumstance that moisture in the air condenses, the drops of water are rarely held, and clogging is more rarely caused due to the drops of water. As a result, there are advantages of, for example, restraining reduction of heat exchanging capacity of the heat exchanger, which is caused by reduction of an air flow due to the clogging of the drops of water.

Figure 5:
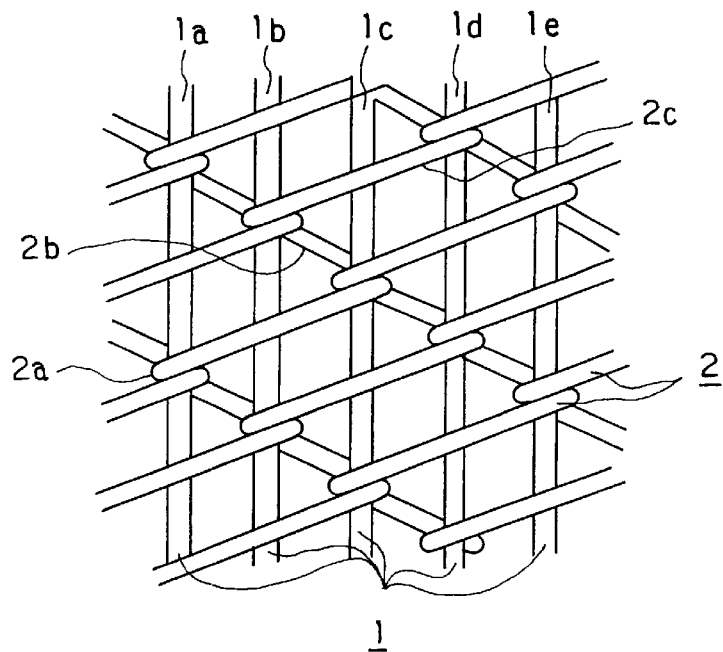
FIG. 5 is a front view showing a heating surface of a heat exchanger used for air conditioning according to one embodiment of the present invention.

FIG. 5 is a partial front view showing a heat exchanger used for air conditioning according to another embodiment of the present invention. In the drawing, reference numerals 1, 1a to 1e mean heat transfer tubes disposed at certain intervals, and in-tube operating fluid (such as coolant) passes therethrough. Reference numerals 2a to 2c mean the same small-gage wire forming a heating fin. The small-gage wire 2a is wound at the heat transfer tubes 1a and 1c in a spiral manner, and the small-gage wire 2b is wound at the heat transfer tubes 1b and 1c in the spiral manner. In addition, the small-gage wire 2c is wound at the heat transfer tubes 1b and 1d in the spiral manner. In this case, the small-gage wires 2a and 2c are disposed in the upstream of out-tube operating fluid (such as air), and the small-gage wire 2b is disposed in the downstream thereof.

A description will now be given of the operation. When air passes through the small-gage wires 2, the air is accelerated, and the small-gage wire 2 serves as a turbulence accelerator, thereby generating three-dimensional turbulence. Hence, a turbulent air flow is caused in the heat exchanger. As a result, heating is promoted, and a heating surface exhibits higher heat transfer coefficient.

Further, the small-gage wires 2 are wound in the spiral manner, thereby providing a larger gap between the small-gage wires 2 in an air flow direction. In addition, the small-gage wires 2 rarely prevent drops of water generated by dehumidification from dropping in a tube axial direction of the heat transfer tube 1. Therefore, the drops of water are rarely held in such a structure. Hence, even if the heat exchanger is used in such a circumstance that moisture in the air condenses, the drops of water are rarely held, thereby rarely causing clogging. As a result, there is an advantage of restraining reduction of an amount of heat exchange, which is caused due to reduction of an air flow.

Figure 6:
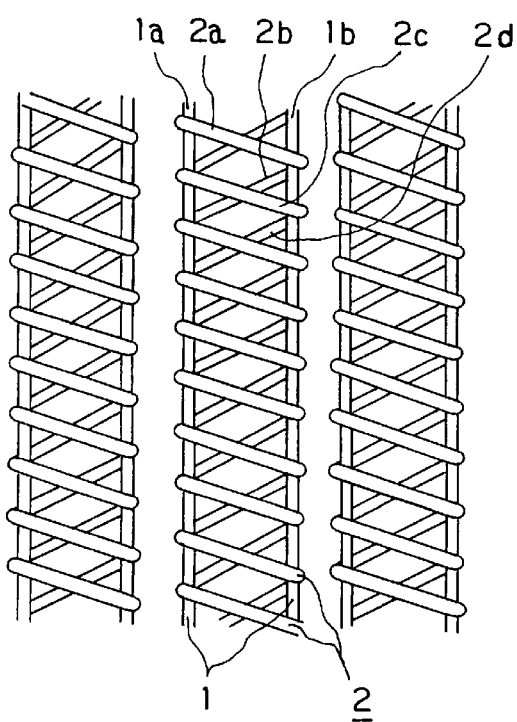
FIG. 6 is a front view showing a heating surface of a heat exchanger used for air conditioning according to one embodiment of the present invention.

FIG. 6 is a partial front view showing a heat exchanger used for air conditioning according to still another embodiment of the present invention. In the drawing, reference numerals 1a and 1b mean adjacent right and left heat transfer tubes among a plurality of heat transfer tubes disposed at certain intervals, and in-tube operating fluid (such as coolant) passes therethrough. Reference numerals 2a to 2d mean small-gage wires forming a heating fin, and the small-gage wires are wound at the heat transfer tubes 1a and 1b. In this case, reference numerals 2a and 2b, and 2c and 2d respectively mean the same small-gage wires. The small-gage wires 2a and 2c are disposed in the upstream of out-tube operating fluid (such as air), and the small-gage wires 2b and 2d are disposed in the downstream thereof.

A description will now be given of the operation. When air passes through the small-gage wire 2a (or 2c), the air is accelerated, and the small-gage wire 2a serves as a turbulence accelerator, thereby generating three-dimensional turbulence. Hence, a turbulent air flow is caused in the heat exchanger. As a result, heating is promoted, and a heating surface exhibits higher heat transfer coefficient.

Among the heat transfer tubes, the adjacent right and left heat transfer tubes are respectively paired, and the small-gage wires are wound at the pairs of heat transfer tubes to form a fin. It is thereby possible to provide a larger area in a cross-section perpendicular to the heat transfer tube, resulting in a structure in which drops of water generated by dehumidification are rarely held. Hence, even if the heat exchanger is used in such a circumstance that moisture in the air condenses, the drops of water are rarely held so that clogging is rarely caused. As a result, there is an advantage of restraining reduction of an amount of heat exchange, which is caused due to reduction of an air flow.

According to the embodiments as shown in FIGS. 4 to 6, the small-gage wires 2 serving as the fin are wound at the specific heat transfer tubes. Therefore, it is possible to provide a structure in which the heat transfer tubes are easily removable even in case the heat transfer tube should be removed and changed in the course of fabrication for connection to a header, or due to piping failure and so forth. Further, in the structure, even after the fabrication, modification may be made by changing a specific portion, and maintenance is facilitated.

Figure 7:
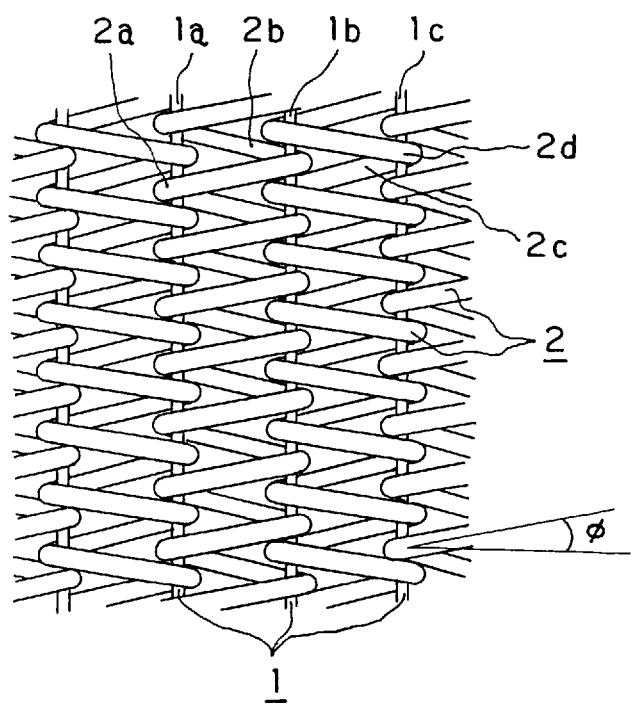
FIG. 7 is a front view showing a heating surface of a heat exchanger according to one embodiment of the present invention.

FIG. 7 is a partial front view showing a heat exchanger according to a further embodiment of the present invention. In the drawing, reference numerals 1, 1a and 1c mean adjacent heat transfer tubes disposed at certain intervals, and in-tube operating fluid (such as coolant) passes therethrough. Reference numerals 2, 2a and 2b, and 2c and 2d respectively mean the same small-gage wires forming heating fins. The small-gage wire 2a and 2b is wound at the heat transfer tubes 1a and 1b in a spiral manner, and the small-gage wire 2c and 2d is wound at the heat transfer tubes 1b and 1c in the spiral manner. The small-gage wire 2a and 2b, and the small-gage wire 2c and 2d are wound such that directions of rotation of spirals are mutually opposed. In this case, the small-gage wires 2a and 2d are disposed in the upstream of out-tube operating fluid (such as air), and the small-gage wires 2b and 2c are disposed in the downstream thereof.

A description will now be given of the operation.

When air passes through the small-gage wire 2a (or 2d), the air is accelerated, and the small-gage wire 2a serves as a turbulence accelerator, thereby generating three-dimensional turbulence. Hence, a turbulent air flow is caused in the heat exchanger. As a result, heating is promoted, and a surface of the heat exchanger exhibits higher heat transfer coefficient.

Figure 8:
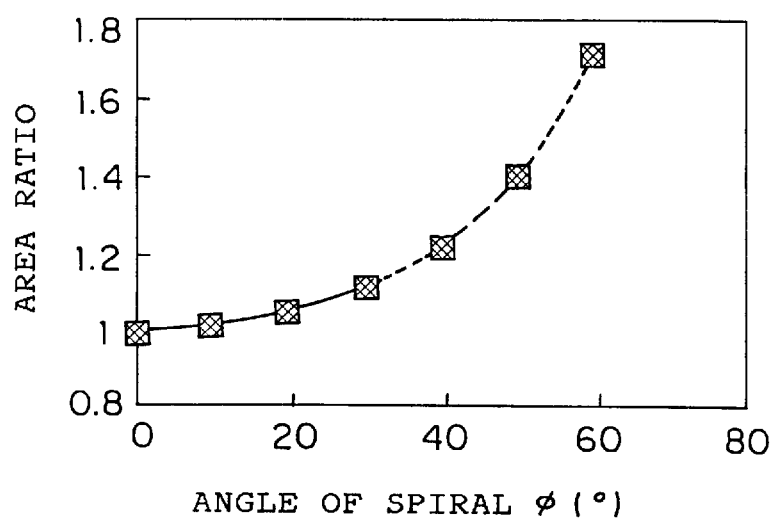
FIG. 8 is a graph diagram showing a relationship between an angle of spiral and an area ratio in a heat exchanger used for air conditioning according to one embodiment of the present invention.

Further, the small-gage wires 2 are wound in the spiral manner. Consequently, the small-gage wires 2 do not intersect each other in a cross-section perpendicular to the heat transfer tubes 1, and a larger gap can be established between the small-gage wires 2 in an air flow direction. Further, in such a structure, the small-gage wires 2 rarely prevent drops of water generated by dehumidification from dropping in a tube axial direction of the heat transfer tube 1 so that the drops of water are rarely held. Therefore, even if the heat exchanger is used in such a circumstance that moisture in the air condenses, the drops of water are more rarely held so that clogging is more rarely caused. As a result, there are advantages of, for example, restraining reduction of an amount of heat exchange due to reduction of an air flow. In addition, FIG. 8 is a graph diagram showing a relationship between an area ratio and an angle of spiral. As is seen from the graph diagram, an increase in the angle of spiral φ can increase a heating surface area greater than that in a mesh-type structure with the same pitch.

That is, in the small-gage wire fins successively contacting a lot of heat transfer tubes, it is possible to increase the heating surface area by setting the angle of spiral to 20° or more, resulting in an effective heat exchanger.

The graph diagram of FIG. 8 shows a variation in heating surface area according to a variation in the angle of spiral with the same fin pitch. A heating surface area for the angle of spiral φ of 0° is defined as a reference area, and a ratio of a heating surface area for each angle of spiral φ and the heating surface area for the angle of spiral φ of 0° is defined as an area ratio. That is, in FIG. 8, in the heating surface area for the angle of spiral φ of 0°, the area ratio becomes one. As the angle of spiral becomes larger, the small-gage wire becomes longer, and the heating surface area more increases as shown in FIG. 8.

Figure 9:
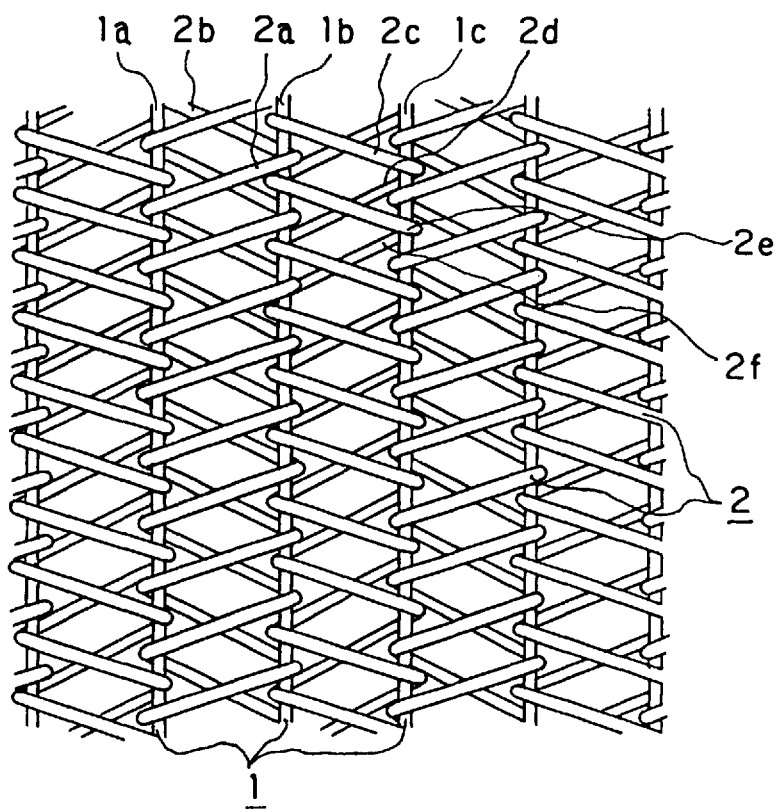
FIG. 9 is a front view showing a heating surface of a heat exchanger used for air conditioning according to one embodiment of the present invention.

FIG. 9 is a partial front view of a heat exchanger used for air conditioning according to another embodiment of the present invention. In the drawing, reference numerals 1a to 1c mean heat transfer tubes disposed at certain intervals, and in-tube operating fluid (such as coolant) passes therethrough. Reference numerals 2a to 2f mean small-gage wires forming heating fins, and reference numerals 2a and 2b, 2c and 2d, and 2e and 2f respectively mean the same small-gage wires. The small-gage wire 2a and 2b is wound at the heat transfer tubes 1a and 1b in a spiral manner, and the small-gage wire 2c and 2d and the small-gage wire 2e and 2f are wound at the heat transfer tubes 1b and 1c in the spiral manner. Further, the spiral small-gage wire 2c and 2d is disposed between a pitch of the spiral small-gage wire 2e and 2f, and is wound so as to have a direction of rotation opposed to that of rotation of the spiral small-gage wire 2a and 2b. The small-gage wires 2a, 2c, and 2e are disposed in the upstream of out-tube operating fluid (such as air), and the small-gage wires 2b, 2d, and 2f are disposed in the downstream thereof.

A description will now be given of the operation. When air passes through the small-gage wire 2a (or 2c, 2e), the air is accelerated, and the small-gage wire 2a serves as a turbulence accelerator, thereby generating three-dimensional turbulence. Hence, a turbulent air flow is caused in the heat exchanger. As a result, heating is promoted, and a surface of the heat exchanger exhibits higher heat transfer coefficient.

Further, the small-gage wires 2 are wound in the spiral manner. Consequently, the small-gage wires 2 do not intersect each other in a cross-section perpendicular to the heat transfer tubes 1, and a larger gap can be established between the small-gage wires 2 in an air flow direction. In such a structure, the small-gage wires 2 rarely prevent drops of water generated by dehumidification from dropping in a tube axial direction of the heat transfer tube 1, and the drops of water are rarely held. Therefore, even if the heat exchanger is used in such a circumstance that moisture in the air condenses, the drops of water are rarely held so that clogging is more rarely caused. As a result, there are advantages of, for example, restraining reduction of an amount of heat exchange due to reduction of an air flow. In addition, an increase in an angle of spiral can increase a heating surface area greater than a heating surface area in a mesh-type structure with the same pitch.

As set forth above, the predetermined heat transfer tubes are combined with the predetermined small-gage wires. Thus, it is possible to provide a structure in which drops of water can easily drop even when the drops of water are generated on fins due to a difference in temperature between the in-tube operating fluid and the out-tube operating fluid, and humidity of the out-tube operating fluid. As a result, it is possible to provide a high-performance heat exchanger which can be used for long-term with high reliability.

Figure 10:
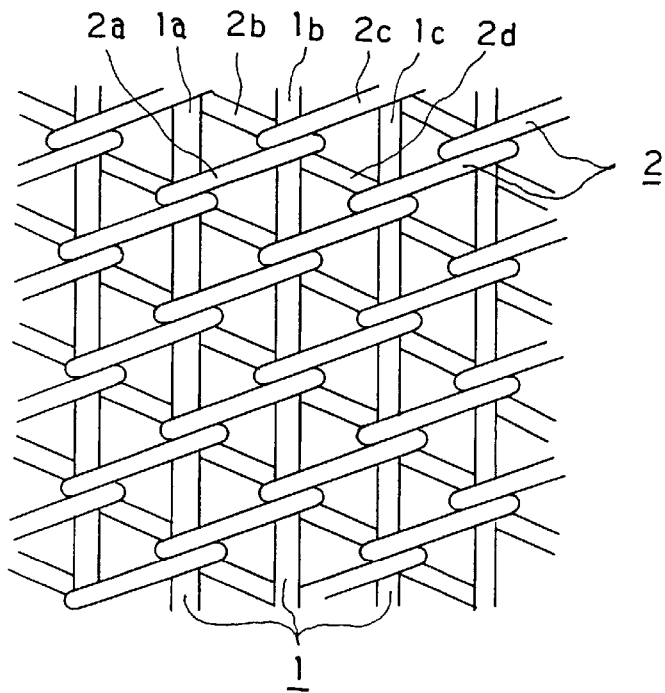
FIG. 10 is a front view showing a heating surface of a heat exchanger used for air conditioning according to one embodiment of the present invention.

FIG. 10 is a partial front view of a heat exchanger used for air conditioning according to another embodiment of the present invention. In the drawing, reference numerals 1a to 1c mean heat transfer tubes disposed at certain intervals, and in-tube operating fluid (such as coolant) passes therethrough. Reference numerals 2a to 2f mean small-gage wires forming heating fins, and reference numerals 2a and 2b, and 2c and 2d mean the same small-gage wires. The small-gage wire 2a and 2b is wound at the heat transfer tubes 1a and 1b in a spiral manner, and the small-gage wire 2c and 2d is wound at the heat transfer tubes 1b and 1c in the spiral manner. Further, the small-gage wires are wound so as to have the same direction of rotation of spiral.

Further, the small-gage wire 2a and 2b, and the small-gage wire 2c and 2d may be brought into contact with the heat transfer tube 1b at the same position. It is also possible to provide a larger space defined by the heat transfer tubes 1 and the spiral small-gage wires. The small-gage wires 2a and 2c are disposed in the upstream of out-tube operating fluid (such as air), and the small-gage wires 2b and 2d are disposed in the downstream thereof.

A description will now be given of the operation. When air passes through the small-gage wire 2a (or 2c), the air is accelerated, and the small-gage wire 2a serves as a turbulence accelerator, thereby generating three-dimensional turbulence. Hence, a turbulent air flow is caused in the heat exchanger. As a result, heating is promoted, and a surface of the heat exchanger exhibits higher heat transfer coefficient.

Further, the small-gage wires 2 are wound in the spiral manner. Consequently, the small-gage wires 2 do not intersect each other in a cross-section perpendicular to the heat transfer tubes 1, and a larger gap can be established between the small-gage wires 2 in an air flow direction. In such a structure, the small-gage wires 2 rarely prevent drops of water generated by dehumidification from dropping in a tube axial direction of the heat transfer tube 1, and the drops of water are rarely held. Therefore, even if the heat exchanger is used in such a circumstance that moisture in the air condenses, the drops of water are rarely held so that clogging is more rarely caused. As a result, there are advantages of, for example, restraining reduction of an amount of heat exchange due to reduction of an air flow. In addition, an increase in an angle of spiral can increase a heating surface area greater than a heating surface area in a mesh-type structure with the same pitch.

Figure 11:
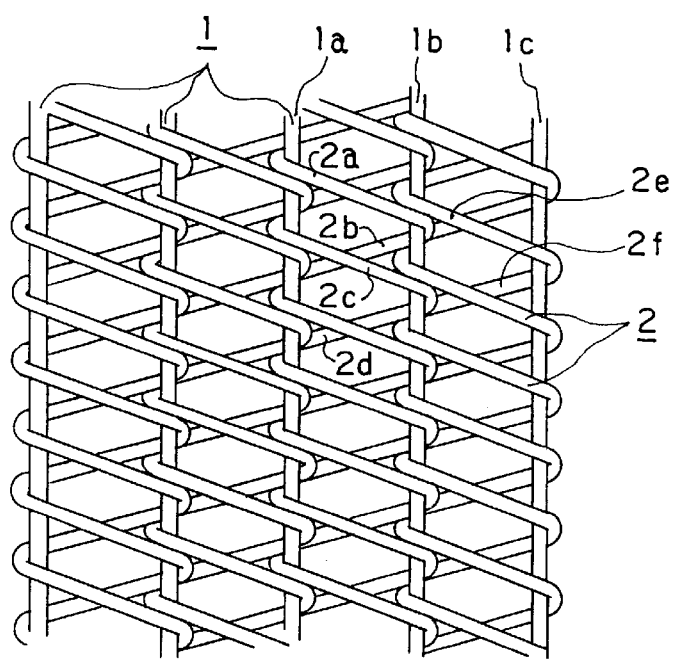
FIG. 11 is a front view showing a heating surface of a heat exchanger used for air conditioning according to one embodiment of the present invention.

FIG. 11 is a partial front view of a heat exchanger used for air conditioning according to another embodiment of the present invention. In the drawing, reference numerals 1*a* to 1*c* mean heat transfer tubes disposed at certain intervals, and in-tube operating fluid (such as coolant) passes therethrough. Reference numerals 2*a* to 2*f* mean small-gage wires forming heating fins, and reference numerals 2*a* and 2*b*, 2*c* and 2*d*, and 2*e* and 2*f* mean the same small-gage wires. The small-gage wire 2*a* and 2*b*, and the small-gage wire 2*c* and 2*d* are wound at the heat transfer tubes 1*a* and 1*b* in a spiral manner, and the small-gage wire 2*e* and 2*f* is wound at the heat transfer tubes 1*b* and 1*c* in the spiral manner. Further, the spiral small-gage wire 2*a* and 2*b* is disposed between a pitch of the spiral small-gage wire 2*c* and 2*d*, and is wound so as to have a direction of rotation opposed to a direction of rotation of the spiral small-gage wire 2*e* and 2*f*.

Further, the small-gage wires 2*a* and 2*e* may be brought into contact with the heat transfer tube 1*b* at the same position. It is also possible to provide a larger space defined by the heat transfer tubes 1 and the spiral small-gage wires. The small-gage wires 2*a*, 2*c*, and 2*e* are disposed in the upstream of out-tube operating fluid (such as air), and the small-gage wires 2*b*, 2*d*, and 2*f* are disposed in the downstream thereof.

When air passes through the small-gage wire 2*a* (or 2*c*, 2*e*), the air is accelerated, and the small-gage wire 2*a* serves as a turbulence accelerator, thereby generating three-dimensional turbulence. Hence, a turbulent air flow is caused in the heat exchanger. As a result, heating is promoted, and a surface of the heat exchanger exhibits higher heat transfer coefficient.

Further, the small-gage wires 2 are wound in the spiral manner. Consequently, the small-gage wires 2 do not intersect each other in a cross-section perpendicular to the heat transfer tubes 1, and a larger gap can be established between the small-gage wires 2 in an air flow direction. In such a structure, the small-gage wires 2 rarely prevent drops of water generated by dehumidification from dropping in a tube axial direction of the heat transfer tube 1, and the drops of water are rarely held. Therefore, even if the heat exchanger is used in such a circumstance that moisture in the air condenses, the drops of water are rarely held so that clogging is more rarely caused. As a result, there are advantages of, for example, restraining reduction of an amount of heat exchange of the heat exchanger due to reduction of an air flow. In addition, an increase in an angle of spiral can further increase a heating surface area greater than a heating surface area in a mesh-type structure with the same pitch.

As stated above, the plurality of heat transfer tubes may be disposed between the upper and lower headers, and the small-gage wire fins may be wound between specific heat transfer tubes in the spiral manner. It is thereby possible to provide a high-performance and highly reliable refrigeration system or air conditioner.

Figure 12:
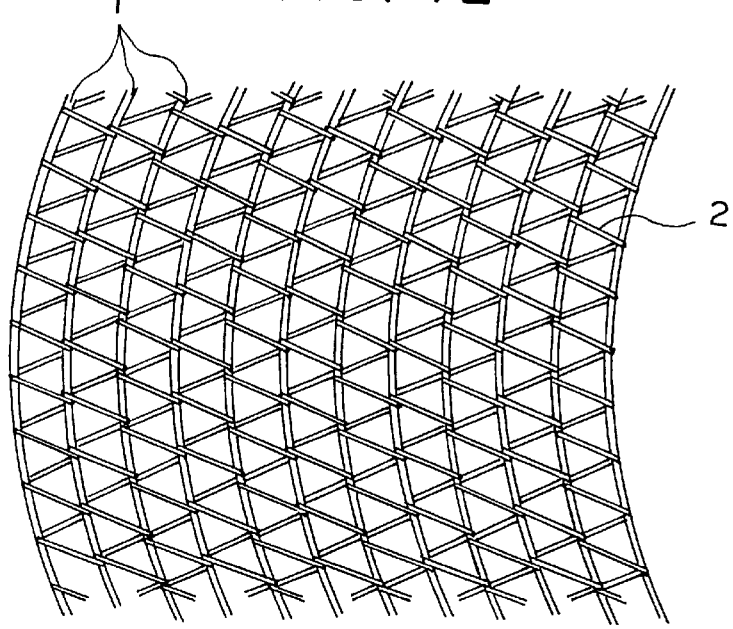
FIG. 12 is a front view showing a heating surface of a heat exchanger according to one embodiment of the present invention.

FIGS. 12 to 17 are explanatory views showing structures of heat exchangers according to further embodiments of the present invention. In FIG. 12, heat transfer tubes 1 are curved, and fins 2 are wound at the heat transfer tubes 1 in a spiral manner.

Figure 13:
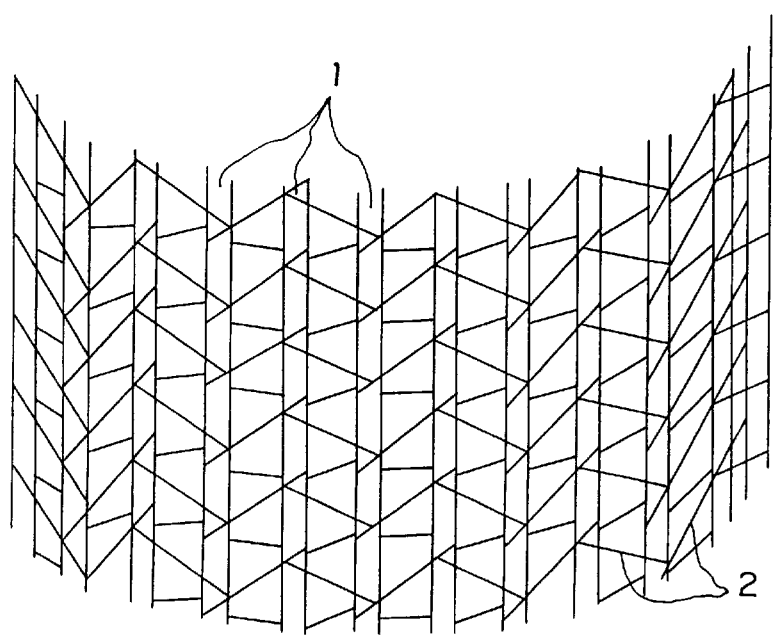
FIG. 13 is a front view showing a heating surface of a heat exchanger according to one embodiment of the present invention.

In FIG. 13, linear arrays of heat transfer tubes are disposed in a curved form, and fins 2 are wound at the heat transfer tubes 1 in a spiral manner.

As stated above, the small-gage wire serving as the fin is wound at the corresponding heat transfer tubes in the spiral manner to form a set of assembly. Thus, even when the tube is modified, or an arrangement of tubes is varied, it is possible to easily fabricate the heat exchanger. Further, a heating surface is curved, thereby enhancing heat exchanger effectiveness per front surface which is effective in heat transfer.

Figure 14:
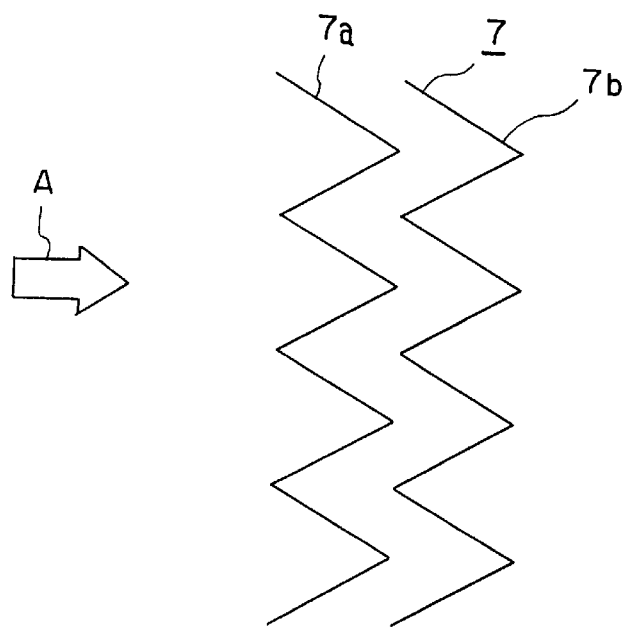
FIG. 14 is a plan view showing a heating surface of a heat exchanger used for air conditioning according to one embodiment of the present invention.

In FIG. 14, a plurality of heating surfaces are folded in parallel to a tube axial direction of a heat transfer tube so as to provide wave-like structures. Reference mark A means a flow of out-tube operating fluid (such as air). Reference numeral 7 means the heating surfaces including a plurality of heat transfer tubes disposed at certain intervals and small-gage wires in a mesh-type structure. The heating surfaces are folded in parallel to the tube axial direction to provide the wave-like structures. Further, as shown by 7*a* and 7*b*, a plurality of rows of heating surfaces are disposed such that a peak portion of the wave-like heating surface 7*b* in the back row can enter the back side of a peak portion of the heating surface 7*a* disposed in front of the heating surface 7*b*.

A description will now be given of the operation. In the above structure, it is possible to increase a heating surface area for the same front area by the plurality of rows of heating surfaces so as to increase an amount of heat exchange, and reduce an occupied space as a whole. Further, a passing air flow per unit in the heating surface is reduced so that a local flow velocity is reduced, resulting in reduction of a pressure loss per row. A mechanism of promotion of heat transfer is identical with that described in the above embodiment, and a description thereof is omitted.

Figure 15:
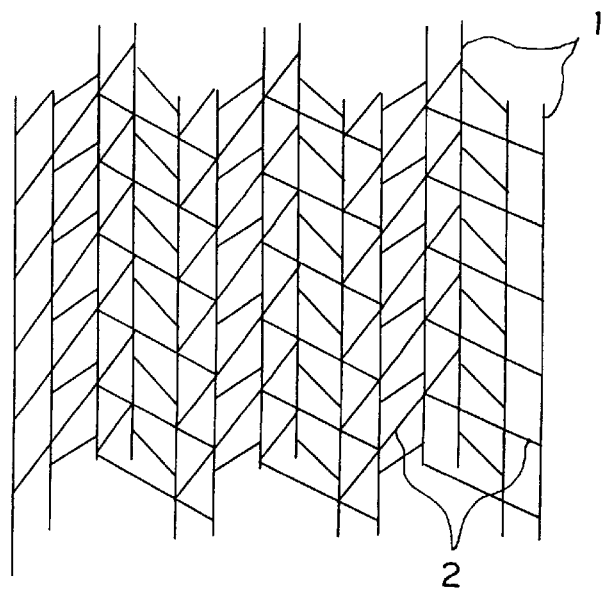
FIG. 15 is a front view showing a heating surface of a heat exchanger according to one embodiment of the present invention.

In FIG. 15, heating surfaces are folded to provide a wave-like arrangement of heat transfer tubes.

Figure 16:
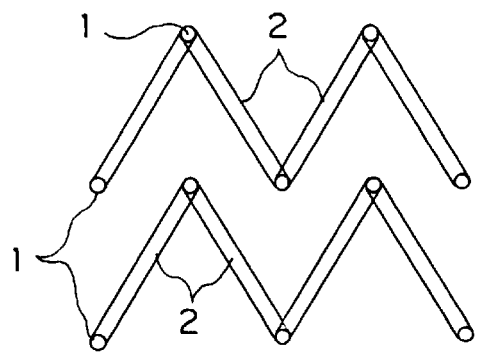
FIG. 16 is an explanatory view showing an arrangement of heat transfer tubes in a heat exchanger according to one embodiment of the present invention.

FIG. 16 shows a heat exchanger in which heating surfaces are folded such that heat transfer tubes are arrayed in a wave-like form, and the heat transfer tubes are positioned at tops of the wave-like form. As stated above, the heating surfaces are folded such that the heat transfer tubes are positioned at the tops of the wave-like form. It is thereby possible to provide the wave-like form without folding a heating fin by simply varying a winding angle of the heating fin with respect to the heat transfer tube. Further, this structure can more easily be fabricated than a structure with the fin folded.

Figure 17:
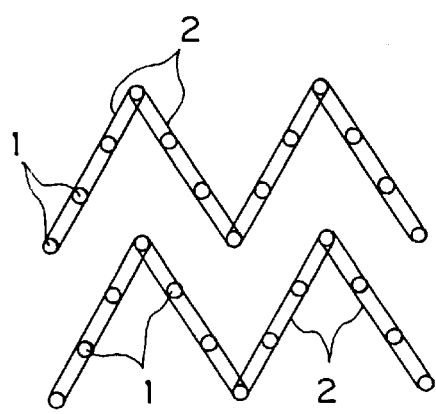
FIG. 17 is an explanatory view showing an arrangement of heat transfer tubes according to one embodiment of the present invention.

FIG. 17 shows a heat exchanger having an illustrative arrangement in which heat transfer tubes are arrayed in a wave-like form, and heating surfaces are folded such that the heat transfer tubes are positioned at tops of the wave-like form, and one or more heat transfer tubes are disposed between the top heat transfer tubes. An increase in the number of heat transfer tube can increase a heating surface area so as to enhance heat exchanger effectiveness.

Figure 18:
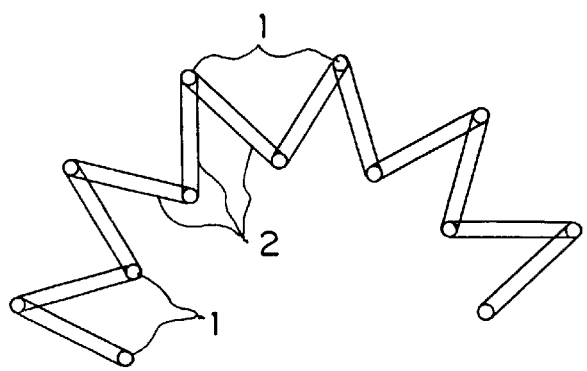
FIG. 18 is an explanatory view showing an arrangement of heat transfer tubes according to one embodiment of the present invention.

FIG. 18 shows a heat exchanger having an arrangement in which a heating surface is folded to provide a wave-like form, and a folding angle is varied to curve the wave-like form. Because of the curved form, it is possible to provide an effect of enhancing heat exchanger effectiveness per front surface area.

A combination of the heat transfer tube and a fin is specified, and the fin is wound at adjacent piping in a spiral manner. As a result, it is possible to extremely simplify fabrication of the heat exchanger having the wave-like form arrangement. Needless to say, it must be noted that the present invention should not be limited to the two specific heat transfer tubes between which the fin is wound, and a predetermined fin may be wound between three or more heat transfer tubes.

A description has been given of the structure of the heat exchanger, in which the small-gage wire fin is wound at and joined with the specific pair of heat transfer tubes in the spiral manner so as to form the heating surface. However, it is to be noted that the spiral fin may be divided into a plurality of spiral fins along a tube axial direction of the heat transfer tube. For example, a partition may be mounted in the tube axial direction of the tube to divide the spiral fin into an upper fin and a lower fin. Alternatively, without dividing the fin for each pair, one spiral fin can successively be wound at outer peripheries of a plurality of pairs of tubes. In any event, the spiral fin may be fabricated in view of facility of fabrication, thereby enabling rapid and simple fabrication.

A description will now be given of a method of fabricating a heat exchanger in which a fin is wound at heat transfer tubes in a spiral manner as shown in FIGS. 3 and 4.

Figure 19:
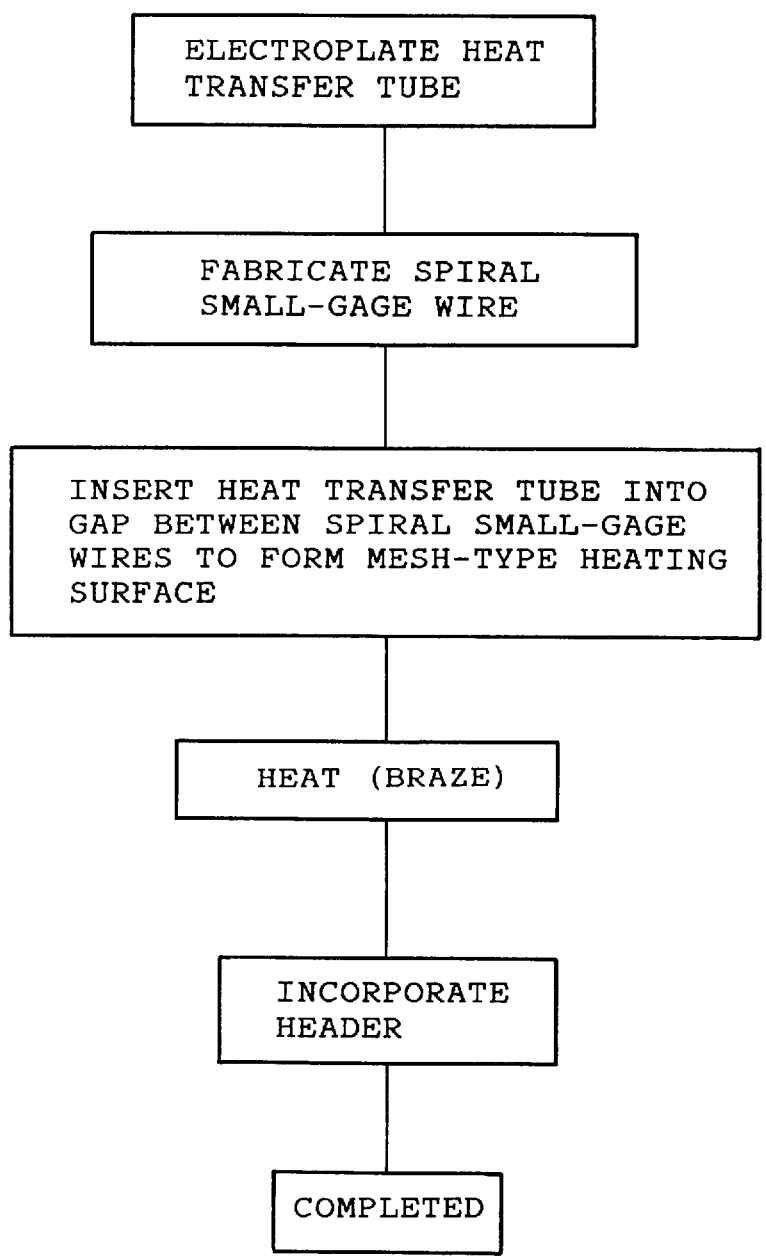
FIG. 19 is a flowchart showing a method of fabricating a heat exchanger according to one embodiment of the present invention.
Figure 20:
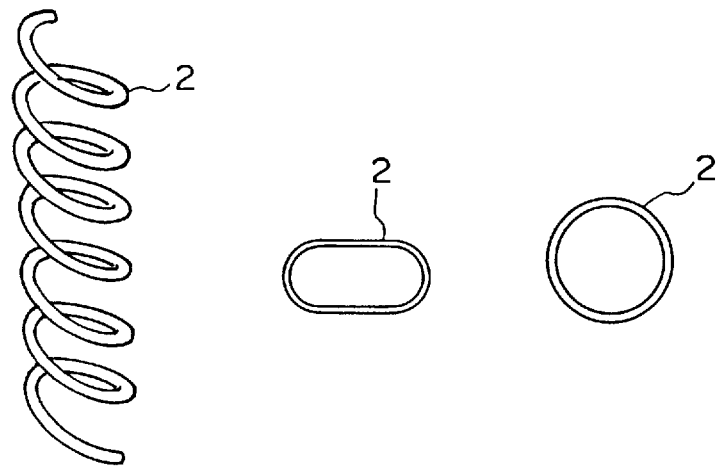
FIG. 20 is a perspective view and sectional views showing a small-gage wire according to one embodiment of the present invention.

FIG. 19 is a flowchart showing the steps of fabricating the heat exchanger. First, a small-gage wire 2 is fabricated to form a heating fin as shown in FIG. 20*a*. As shown in FIGS. 20*b* and 20*c*, the small-gage wire has a ring-like section including a circular form, an elliptical form, or an elongatedly circular form, and is made of copper or alloy thereof. The structure is identical with that of a spring so that an equipment for fabricating the spring can directly be applied to fabricate the small-gage wire. Any method can be employed as long as the small-gage wire can be coiled to have various types of shapes. For example, the coiled small-gage wire may be fabricated by winding the small-gage wire at a jig. For example, in order to fabricate an elliptical spiral, a wire feed roll, rotating dies, a pitch tool, and a cutting mandrel may be used under computer control. It is thereby possible to provide the elliptical spiral in which a bent R portion or a linear portion can freely be fabricated, a uniform pitch can be set, an end can be brought into tight contact, a shape such as circle can be changed, or cutting may be made at an optional position. The winding end may be joined with a header through brazing, or may be brought into tight contact with the header as described above.

Figure 21:
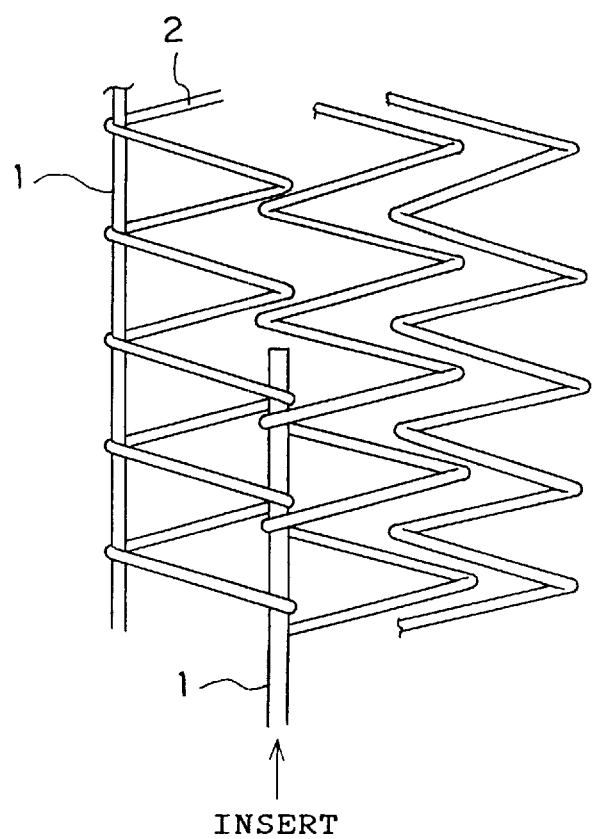
FIG. 21 is a front view showing a method of fabricating a heat exchanger according to one embodiment of the present invention.

As shown in FIG. 21, the adjacent coil-like small-gage wires 2 are partially superimposed, and the small-gage sires 2 are disposed such that a heat transfer tube 1 can pass through superimposed portions. Then, the heat transfer tube 1 passes through the superimposed portions. The step is repeatedly carried out, thereby completing the steps of assembling a mesh-type heating surface including the small-gage wires 2 and the heat transfer tubes 1 in the heat exchanger.

In this case, the heat transfer tube 1 is previously plated with brazing material. "Brazing material" as used herein includes both of soft solder and hard solder. Though the heat transfer tube 1 is preferably made of copper or alloy thereof, the heat transfer tube 1 may be made of another material such as stainless.

Figure 22:
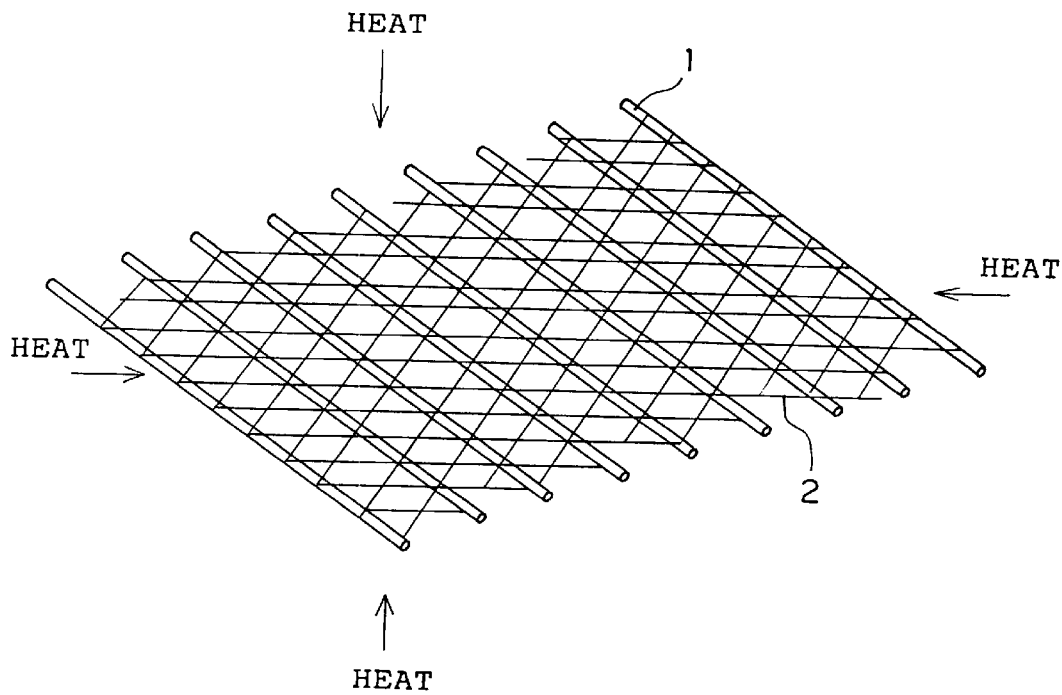
FIG. 22 is a perspective view showing a method of fabricating a heat exchanger according to one embodiment of the present invention.
Figure 23:
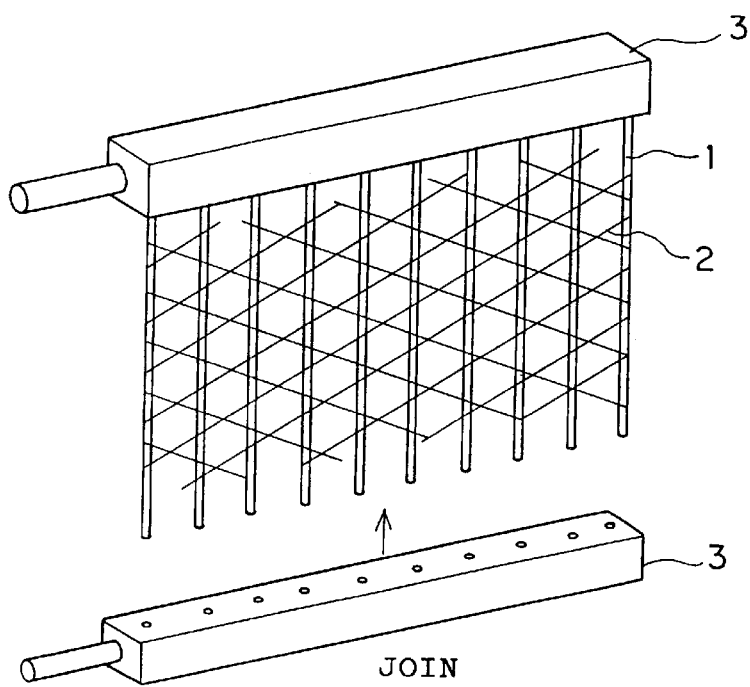
FIG. 23 is a perspective view showing a method of fabricating a heat exchanger according to one embodiment of the present invention.

Next, as shown in FIG. 22, the mesh-type structure including the small-gage wires 2 and the heat transfer tubes 1 is inserted into a furnace heated at a temperature equal to or more than a melting point of the brazing material, or into oil heated at the temperature equal to or more than the melting point of the brazing material. The brazing material on the heat transfer tube 1 is thereby fused, and is thereafter cooled to join the heat transfer tube 1 with the small-gage wire 2. Then, headers 3 are joined as shown in FIG. 23, resulting in completion of assembly of the heat exchanger.

In this case, the heat transfer tube is longer than the small-gage wire 2 having the coil-like form. In the illustrative fabrication, the heat transfer tube 1 has a diameter in an approximate range of 1 to 5 mm, the small-gage wire 2 has a diameter in an approximate range of 0.1 to 1 mm, and the heat transfer tubes are spaced at an interval in an approximate range of 2 to 10 mm.

As set forth above, in the method of fabricating the heat exchanger, after the small-gage wires and the heat transfer tubes are assembled in the mesh-type structure, instead of joining, one by one, contact points between the heat transfer tubes and the small-gage wires, the contact points are concurrently joined to fabricate the heat exchanger. As a result, there are advantages in that a time required to fabricate the heat exchanger can be reduced, and production cost can extremely be reduced. In the course of fabrication, as long as heating is not started, it is possible to easily replace, for example, the heat transfer tube by another heat transfer tube having a different length or a different diameter. As a result, there are advantages in that, for example, the heat exchanger can be applied to various types of products.

Figure 24:
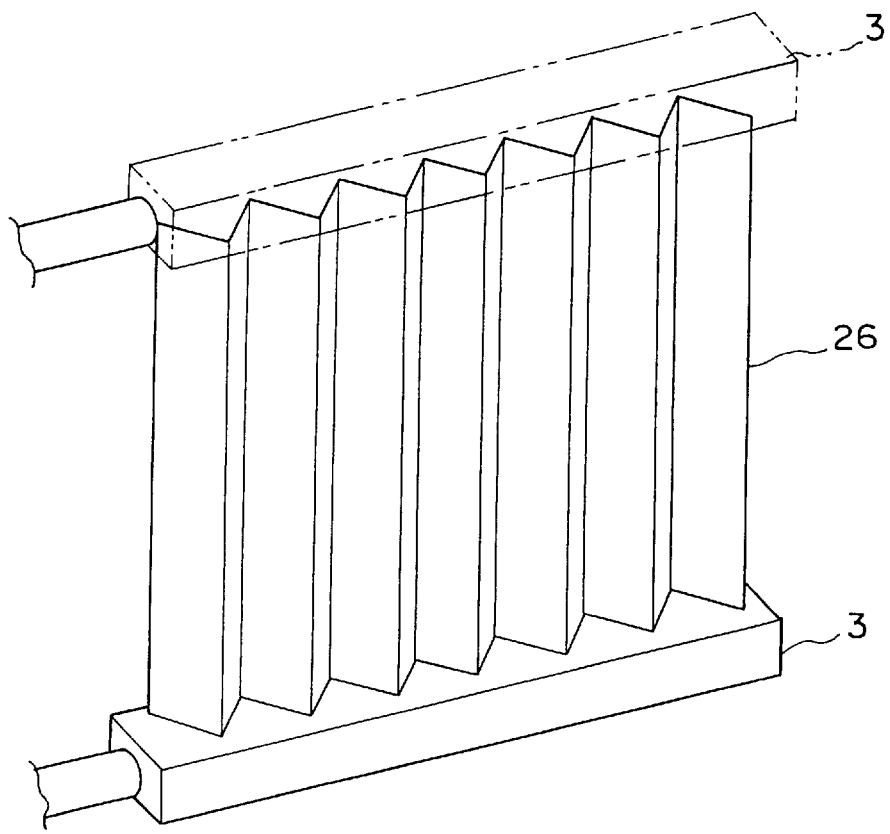
FIG. 24 is a perspective view showing a method of fabricating a heat exchanger according to one embodiment of the present invention.
Figure 25:
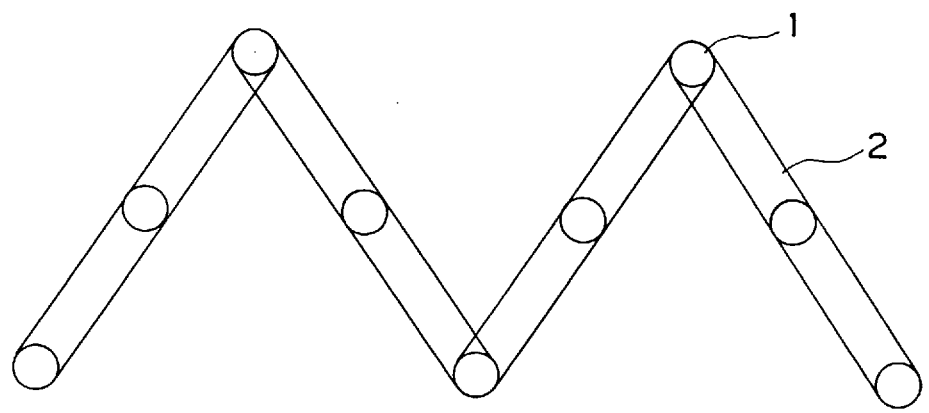
FIG. 25 is an enlarged diagram of a heating surface of a heat exchanger according to one embodiment of the present invention.
Figure 26:
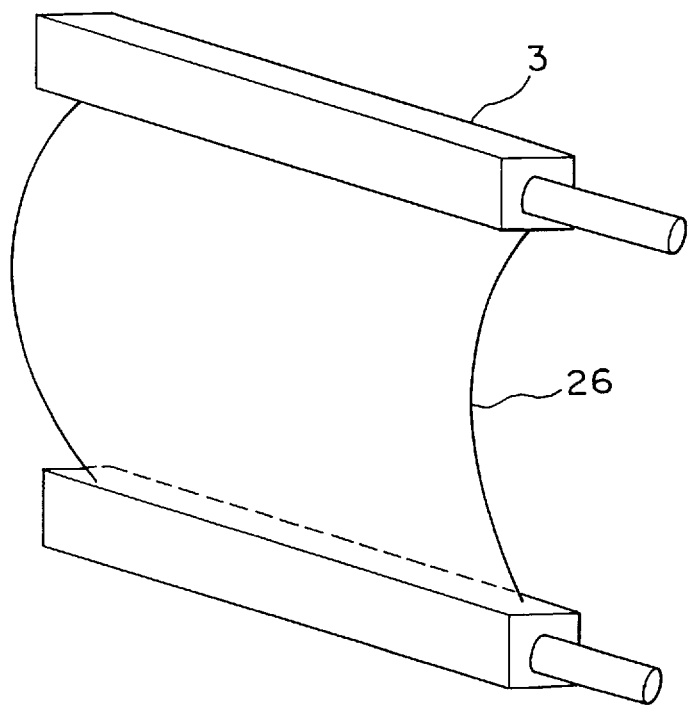
FIG. 26 is a front view showing a shape of another heat exchanger according to one embodiment of the present invention.
Figure 27:
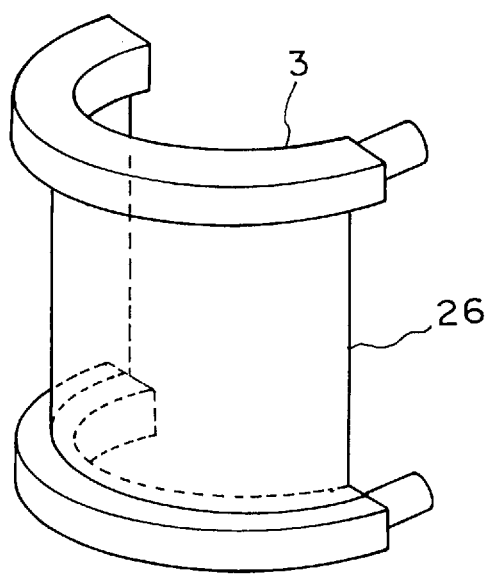
FIG. 27 is a front view showing a shape of still another heat exchanger according to one embodiment of the present invention.
Figure 28:
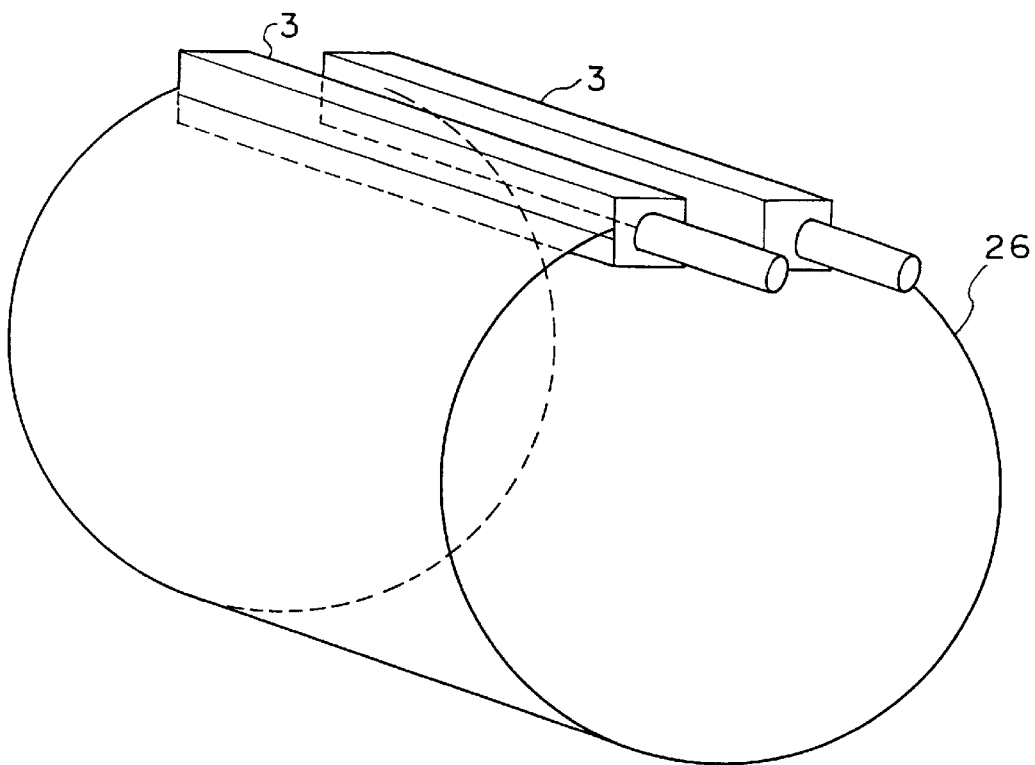
FIG. 28 is a front view showing a shape of a further heat exchanger according to one embodiment of the present invention.
Figure 29:
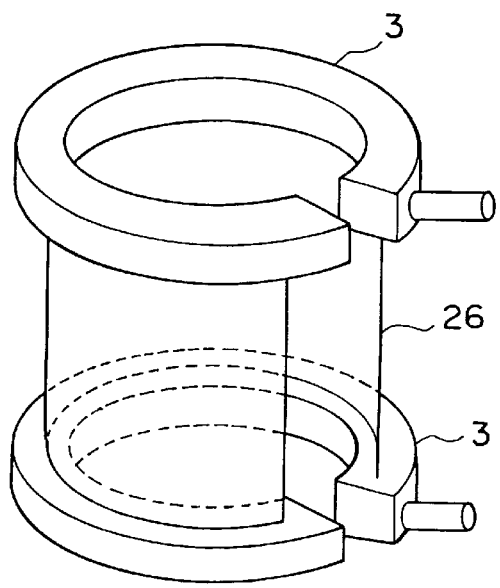
FIG. 29 is a front view showing a shape of a still further heat exchanger according to one embodiment of the present invention.

The method of fabrication can be carried out depending upon the above combination of the small-gage wires and the heat transfer tubes. That is, the method can be applied to any one of the combinations of the heat transfer tubes and the fins as shown in FIGS. 4 to 7, and 9 to 18. In any case, the heat exchanger can similarly be fabricated. That is, the method of fabrication can similarly be applied to heating surfaces other than a flat heating surface 26 of the heat exchanger, i.e., a wave-like heating surface as shown in FIGS. 24 and 25, or a heating surface of a heat exchanger in which heat transfer tubes 1 and small-gage wires 2 are assembled as shown in FIG. 26. Further, the method of fabrication can similarly be applied to a curved heating surface as shown in FIG. 27, or a cylindrical heating surface as shown in FIGS. 28 and 29. Alternatively, a structure including a plurality of superimposed heating surfaces (hereinafter referred to as multi-row) can similarly be fabricated. Further, it must be noted that a heat transfer tube pitch is not necessarily uniform.

Figure 30:
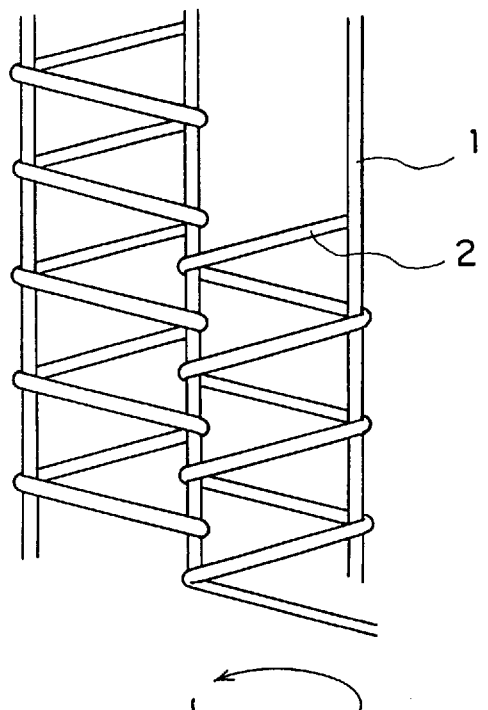
FIG. 30 is a front view showing a method of fabricating a heat exchanger according to one embodiment of the present invention.

In FIG. 21, the small-gage wires 2 provided in the spiral forms are partially superimposed, and the heating surface of the heat exchanger is fabricated by passing the heat transfer tube 1 through the superimposed portions. Instead of the method, as shown in FIG. 30, the spiral small-gage wire 2 may be fitted with the heat transfer tubes 1 while the small-gage wire 2 is rotated. In the assembly, it is also possible to fabricate a mesh-type heating surface structure.

The small-gage wire may be made of copper, alloy thereof, stainless, aluminium, or the like. Similarly, the heat transfer tube may be made of copper, alloy thereof, stainless, aluminium, or the like.

In a modified method of fabrication, a heat transfer tube 1 and a small-gage wire 2 are made of aluminium, or alloy thereof. Further, according to rolling and so forth, the heat transfer tube 1 or the small-gage wire 2 is coated with brazing material made of aluminium alloy (hereinafter referred to as brazing). Then, as in the above embodiment, the small-gage wires are provided in a mesh-type structure, and the heat transfer tubes 1 and the small-gage wires 2 are joined through vacuum brazing or Nocolok brazing which is a kind of flux brazing developed by Alan co., in Canada. Thereafter, as shown in FIG. 23, the headers 3 are joined to complete the heat exchanger. In the heat exchanger, an action, a specification, and a shape are identical with those in the heat exchanger in the above method of fabrication.

As set forth above, the heat exchanger is fabricated by brazing the heat transfer tube or the small-gage wire. That is, after the small-gage wires and the heat transfer tubes are assembled in the mesh-type structure, instead of joining, one by one, contact points between the heat transfer tube and the small-gage wire, the contact points are concurrently joined to fabricate a heating surface of the heat exchanger. As a result, there are advantages in that a time required for fabrication can be reduced, and production cost can extremely be reduced. Further, since the heat transfer tube and the small-gage wire are made of aluminium or alloy thereof, there is another advantage of an extremely light product.

In addition, since the small-gage wire 2 is made of aluminium or alloy thereof, surface treatment is facilitated. For example, by processing the surface to be hydrophilic, drops of water generated on the small-gage wire 2 are more rarely held, that is, more easily flow. Therefore, even if the heat exchanger is used in such a circumstance that moisture in the air condenses, the drops of water are rarely held so that clogging is more rarely caused. As a result, it is possible to provide a highly reliable heat exchanger in which an air flow is not reduced, and a high heat exchange performance can be maintained.

Figure 31:
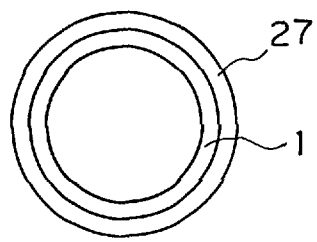
FIG. 31 is a sectional view showing a heat transfer tube according to one embodiment of the present invention.
Figure 32:
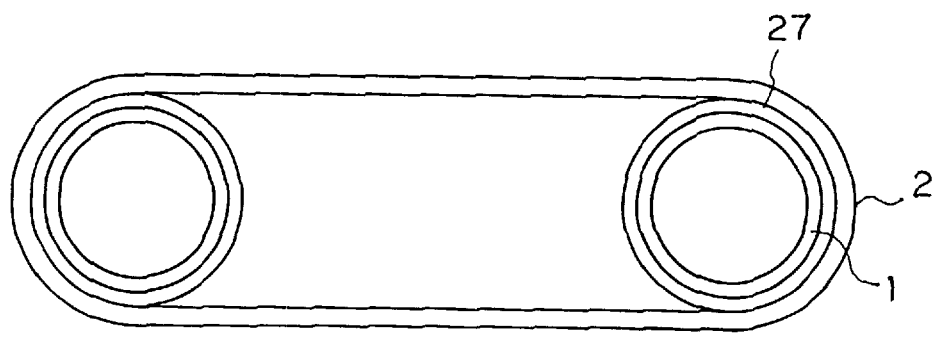
FIG. 32 is sectional views showing a joint between heat transfer tubes and a small-gage wire according to one embodiment of the present invention.
Figure 32:
Figure 32:
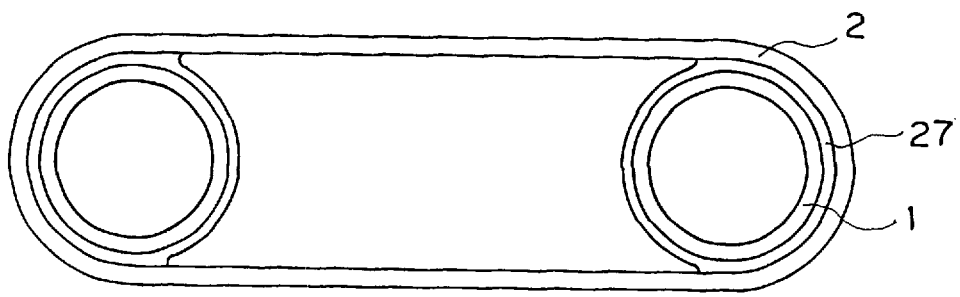

FIG. 31 is a sectional view showing a heat transfer tube used in the modified method of fabrication. In a discrete step, a heat transfer tube 1 is previously electroplated with solder 27. "Solder" as used herein means tin, alloy of tin and lead, alloy of tin, lead, and silver, or alloy of tin and silver. At a time of the electroplating, current density and an electroplating time are controlled so as to provide a deposit thickness in an approximate range of 20 to 30 μm. Then, small-gage wires are incorporated with the heat transfer tubes 1. The incorporated assembly is dipped into flux, or flux is applied to the assembly. Thereafter, the assembly is dipped into oil heated at the temperature ranging from 200° to 300° C., or is inserted into, for example, an infrared oven for a period ranging from 30 seconds to 5 minutes. Consequently, this melts the solder 27 on the heat transfer tube, and the melted solder is gathered at contact portions between the heat transfer tubes 1 and the small-gage wires 2. After the completion of heat treatment, the assembly is cooled to condense the solder 7 as shown in FIG. 32, resulting in completion of joint.

When the solder having a low melting point is used as the brazing material to join the small-gage wires with the heat transfer tubes as set forth above, sure thermal connection can be established, and heat exchanger effectiveness can be enhanced in the heat exchanger. Further, since so tremendous thermal energy is not required for joint, it is possible to provide a method of fabrication, which is very advantageous in view of workability, security, processability, and cost.

Figure 33:
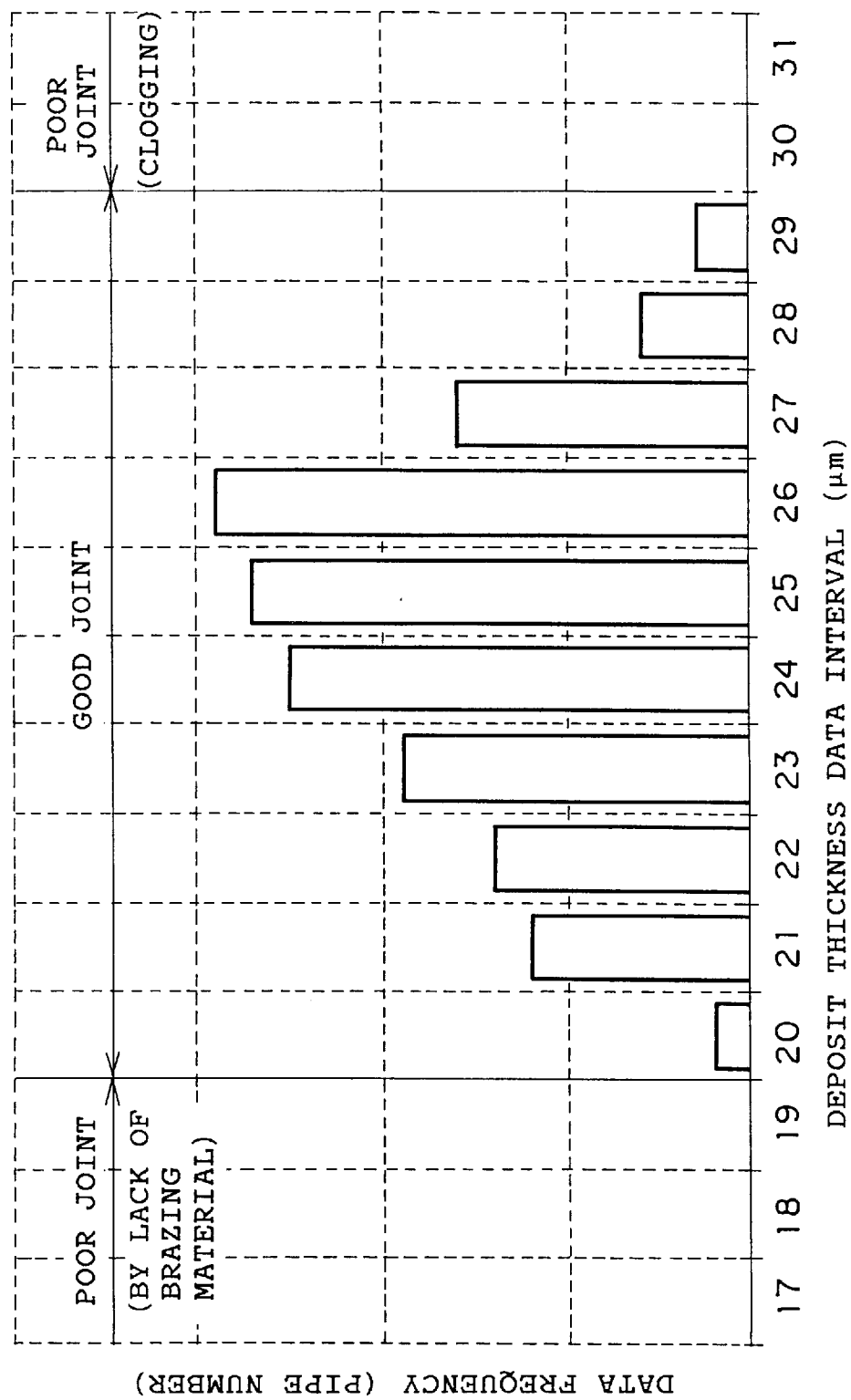
FIG. 33 is a deposit thickness control chart according to one embodiment of the present invention.

An excessively decreased deposit thickness causes incomplete joint by lack of solder required for joint, and results in a weak structure. That is, thermal contact becomes incomplete, heat exchanging ability of the heat exchanger is reduced, and strength thereof is also reduced. Otherwise, an excessively increased deposit thickness causes an excessive amount of melted solder so that the solder enters a gap between the heat transfer tubes, or a gap between rings including the small-gage wires, resulting in clogging such as clogging between the rings. This may cause reduction of the heat exchanging ability. Thus, in each material for brazing, the deposit thickness is controlled in an approximate range of 10 to 30 μm. It is thereby possible to provide sure joint with no clogging. FIG. 33 shows a deposit thickness distribution in case of solder. From the drawing, it is possible to recognize a control range to cause no joint failure as described above.

Figure 34:
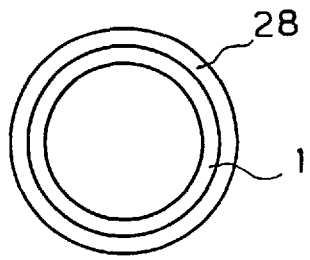
FIG. 34 is a sectional view showing a heat transfer tube according to one embodiment of the present invention.
Figure 35:
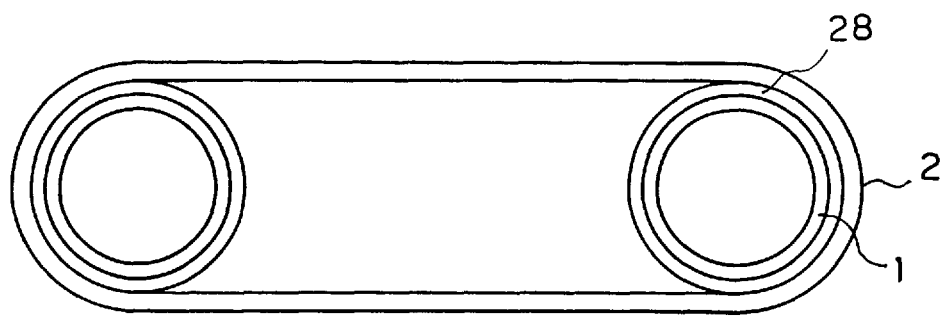
FIG. 35 is sectional views showing a joint between heat transfer tubes and a small-gage wire according to one embodiment of the present invention.
Figure 35:
Figure 35:
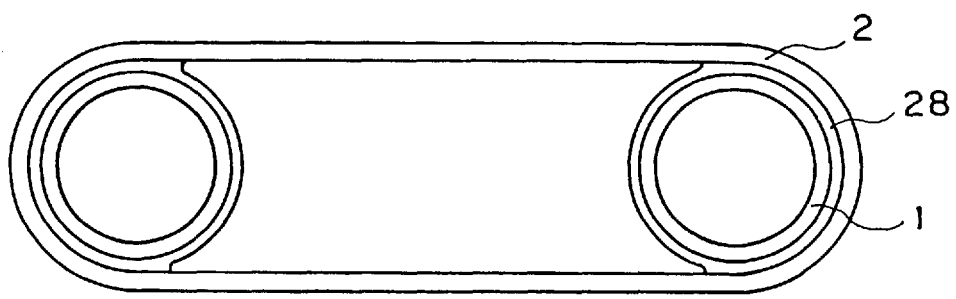

FIG. 34 is a sectional view showing another embodiment of a heat transfer tube used in the modification. In a discrete step, a heat transfer tube 1 is previously coated with electroless Ni plating 28 (containing 87 to 93% of nickel, 4 to 12% of phosphorus, and 1% of other components). A deposit thickness is controlled in an approximate range of 5 to 30 μm. Then, small-gage wires are incorporated with the heat transfer tubes 1, and are inserted into a header plate 5. Thereafter, the assembly is inserted into a brazing furnace in a vacuum atmosphere (of about $10^{-3}$ Torr), and is heated for 30 minutes at a temperature of 950° C. Consequently, this melts Ni; and the melted Ni is gathered at contact portions between the heat transfer tubes 1 and the small-gage wires 2. After the completion of heat treatment, the assembly is cooled to condense the Ni plating 28 as shown in FIG. 35, resulting in completion of joint between the heat transfer tubes 1 and the small-gage wire 2.

When the heat transfer tube is plated, and the plating is fused to join the small-gage wire with the heat transfer tube so as to fabricate the heat exchanger as set forth above, sure thermal connection can be established, and heat exchanger effectiveness can be enhanced. Further, since so tremendous thermal energy is not required for joint, it is possible to provide a method of fabrication, which is very advantageous in view of workability, security, processability, and cost.

It is to be noted that the present invention should not be limited to the brazing material described above, and any material may be used as joint material as long as the material has a lower melting point than that of a material forming the small-gage wire or the heat transfer tube.

Figure 36:
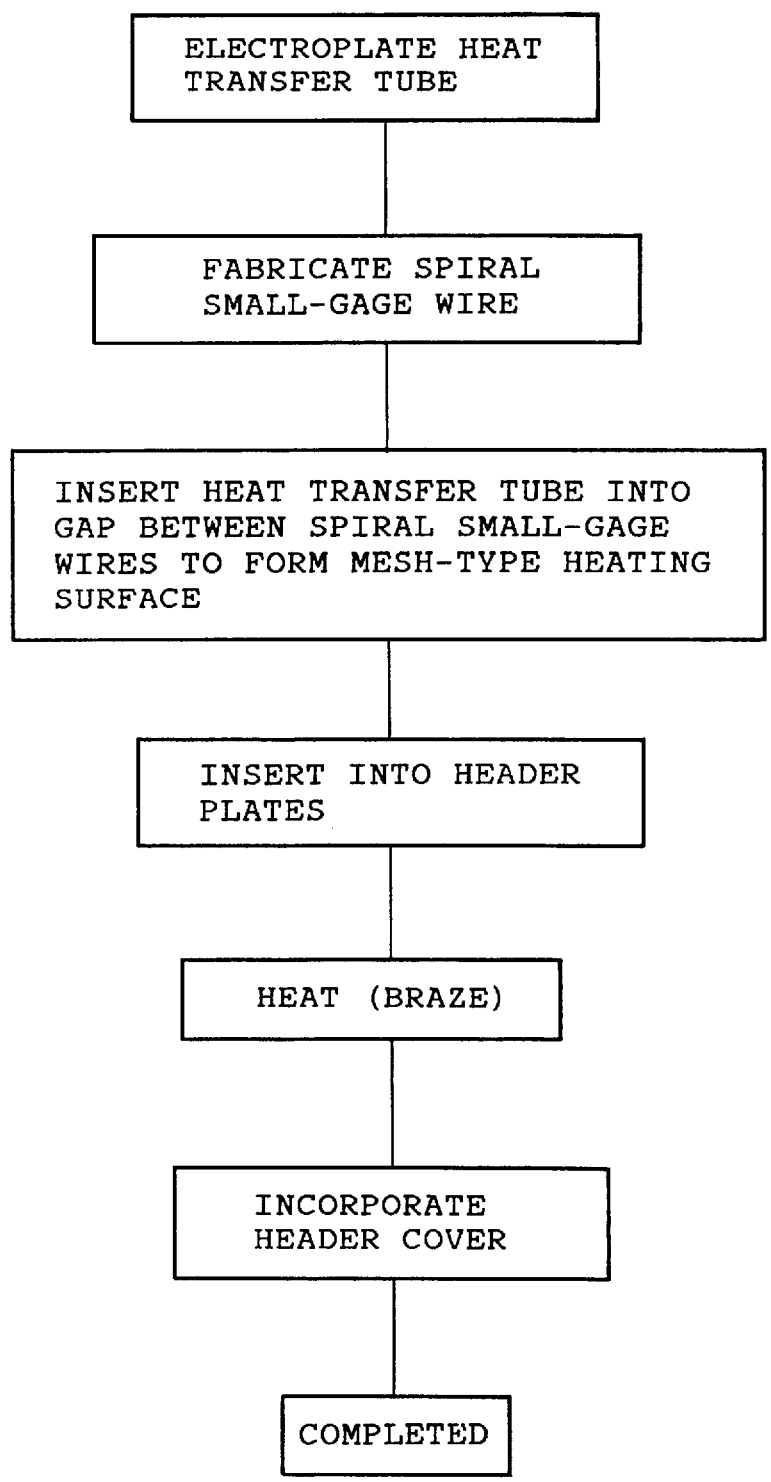
FIG. 36 is a flowchart showing a method of fabricating a heat exchanger according to one embodiment of the present invention.
Figure 37:
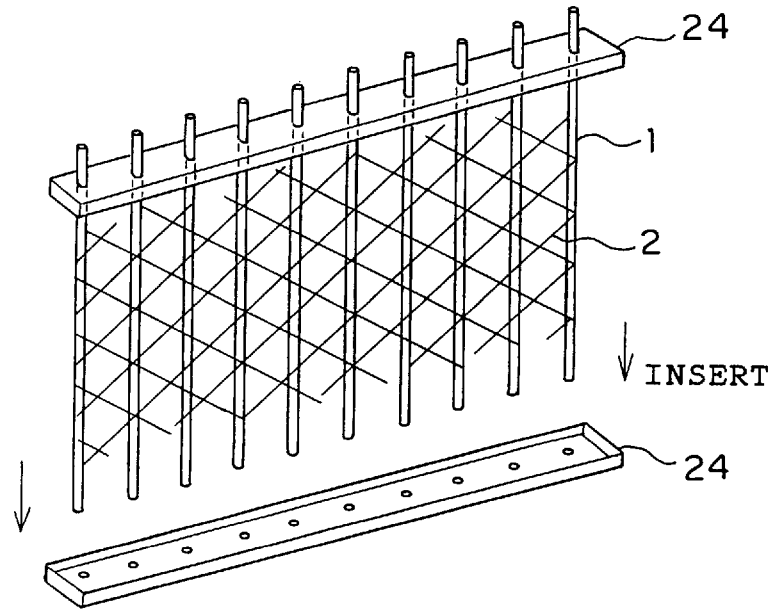
FIG. 37 is a perspective view showing a method of fabrication according to one embodiment of the present invention.

FIG. 36 is a flowchart showing the step in a method of fabricating a heat exchanger according to another embodiment of the present invention. FIG. 37 is a perspective view in which heat transfer tubes 1 are incorporated with header plates 24 serving as component parts of headers 3. As shown in FIG. 37, holes are previously provided in the header plates 24 according to certain intervals between the disposed heat transfer tubes. Before the heat transfer tubes 1 are joined with the small-gage wires 2, the heat transfer tubes 1 incorporated with the small-gage sires 2 are inserted into the holes in the header plates 24. Thereafter, both ends of the heat transfer tubes 1 are broken, or the holes in both the ends are filled with resin and so forth. In this case, as the holes, cylindrical holes may be provided through bearing processing so as to provide good contact between the holes and both the ends of the heat transfer tube 1.

Figure 38:
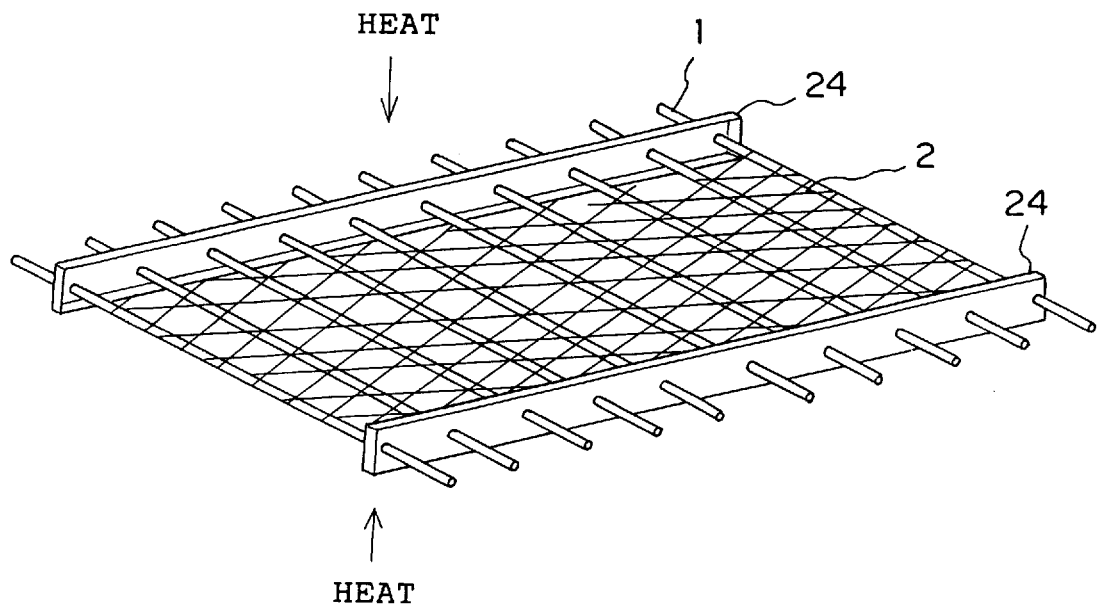
FIG. 38 is a perspective view showing a method of fabrication according to one embodiment of the present invention.
Figure 39:
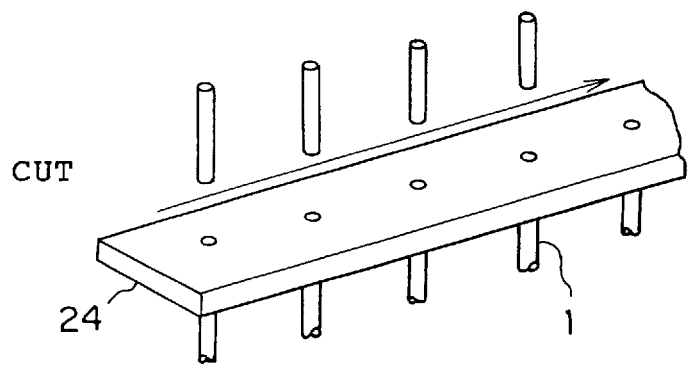
FIG. 39 is a perspective view showing a method of fabrication according to one embodiment of the present invention.
Figure 40:
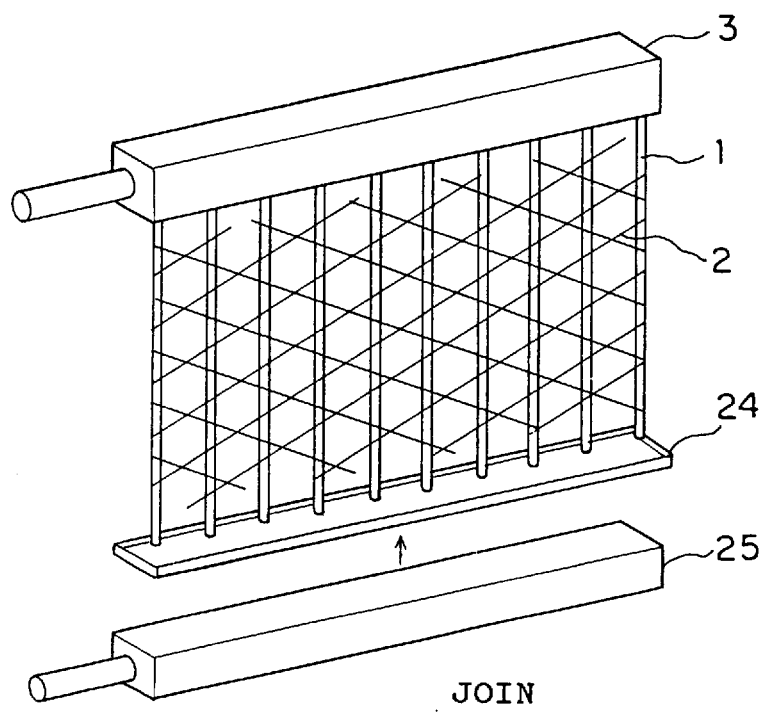
FIG. 40 is a perspective view showing a method of fabrication according to one embodiment of the present invention.

Subsequently, as shown in FIG. 38, the small-gage wires 2 and the heat transfer tubes 1, and the heat transfer tubes 1 and the header plates 24 are concurrently heated and joined. Thereafter, excess heat transfer tubes passing through the header plate 24 are cut away as shown in FIG. 39, and a header cover 25 is joined with the header plate 24 as shown in FIG. 40, thereby completing assembly of the heat exchanger.

If the headers are mounted after the joint between the small-gage wires and the heat transfer tubes, intervals between the tubes are deviated due to, for example, elasticity of the small-gage wires, or thermal deformation thereof at a time of joint. Consequently, the deviated intervals can not be fitted with the intervals between the holes which are previously provided in the heater plates according to original intervals between the tubes. Hence, the assembly of the header plates and the heat transfer tubes may be hindered, or at a time of joint between the tube and the header plate, the brazing material may enter the tube, resulting in clogging of the tube.

In order to avoid the clogging of the tube by the brazing material, the tube passing through the header may be made longer. However, in case of the longer tube passing through the header, if the tube passing through the header is not cut away as described in the above embodiment, the deeply passing tube may inhibit a flow or a distribution of in-tube fluid A. Therefore, in the embodiment, the header plates are mounted before the heat transfer tubes are joined with the small-gage wires, and thereafter the operation proceeds to the step of joint, thereby solving the above problem.

As set forth above, the method of fabrication in the embodiment is particularly available for fabrication of a heat exchanger having a specification in which an effect of thermal deformation at the time of joint becomes more serious, and the intervals between the tubes are more easily deviated, such as a heat exchanger having small-diameter heat transfer tubes, or heat transfer tubes in a multi-row.

Figure 41:
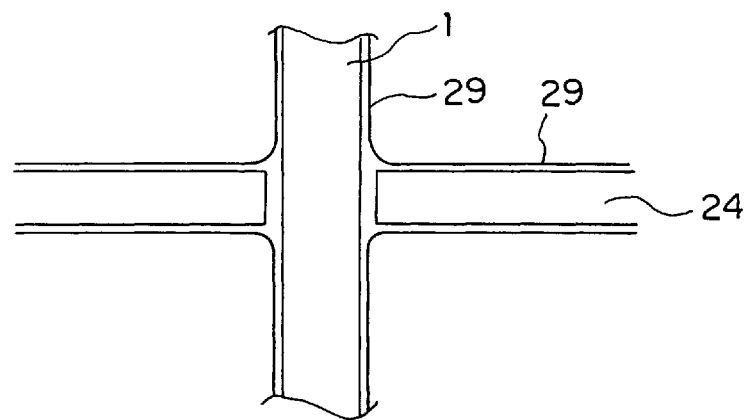
FIG. 41 is a sectional view showing a method of fabrication according to one embodiment of the present invention.

FIG. 41 is a sectional view showing a joint between a heat transfer tube and a header plate in a method of fabrication according to another embodiment of the present invention. First, the header plate 24 is previously plated with brazing material 29 having a thickness in an approximate range of 5 to 30 μm. The brazing material 29 is identical with material described in the above embodiment.

Next, the heat transfer tube 1 plated with the brazing material 29 is inserted into a hole in the header plate 24 plated with the brazing material 29. After the insertion, the heat transfer tube 1 and the header plate 24 are joined through heat treatment and cooling.

In this joint, as well as the brazing material 29 on the heat transfer tube 1, the brazing material 29 on the header plate 24 flows into a gap between the heat transfer tube 1 and the header plate 24. Then, the gap is filled with the brazing material 29 on both the heat transfer tube 1 and the header plate 24. Even if there is a variation in gaps, the heat transfer tube and the header plate can more completely be joined. It is thereby possible to provide a highly reliable heat exchanger in which high airtightness can be ensured, and leakage of in-tube fluid (such as coolant) can be avoided.

Subsequently, a description will now be given of a modification in which a header plate 24 is made of aluminium or alloy thereof, brazing material is previously applied to the header plate 24 through brazing, and a heat transfer tube and a small-gage wire are made of aluminium or alloy thereof.

In this joint between the heat transfer tube 1 and the header plate 24, as well as a brazing material 29 on the heat transfer tube 1, a brazing material 29 brazed on the header plate 24 flows into a gap between the heat transfer tube 1 and the header plate 24. Then, the gap is filled with the brazing material 29 on both the heat transfer tube 1 and the header plate 24. Even if there is a variation in size of the gap, the heat transfer tube and the header plate can more completely be joined. It is thereby possible to provide a highly reliable heat exchanger in which high airtightness can be ensured, and leakage of in-tube fluid (such as coolant) can be avoided.

Figure 42:
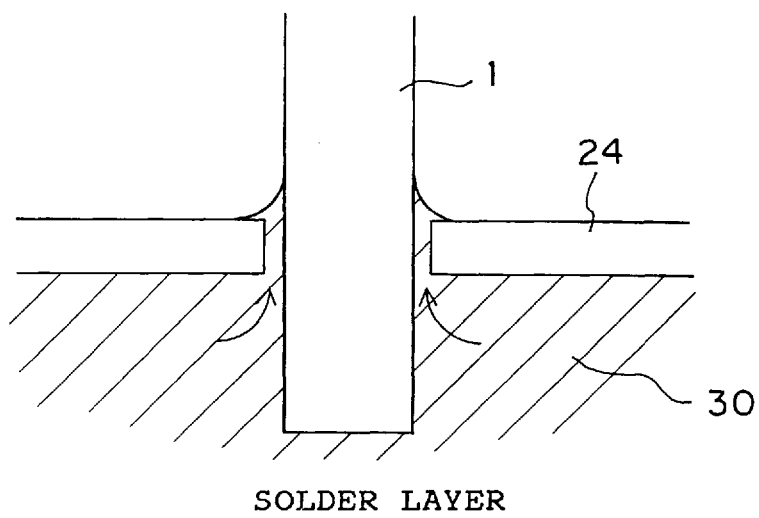
FIG. 42 is a sectional view showing a method of fabricating a heat exchanger according to one embodiment of the present invention.

FIG. 42 is a sectional view showing another modification of joint between a heat transfer tube and a header. In the embodiment, as set forth above, a header plate 24 is joined with the heat transfer tube 1, and a small-gage wire 2 is joined with the heat transfer tube 1. After the joint, a joint between the heat transfer tube 1 and the header plate 24 is dipped into a bath of molten solder such that a gap between the heat transfer tube 1 and the header plate 24 can be filled with solder 30 having a lower melting point than that of brazing material. More complete joint can be established between the header plate 24 and the heat transfer tube 1, thereby fabricating a heat exchanger.

The heat exchanger is fabricated as described above. It is thereby possible to provide a highly reliable heat exchanger in which higher airtightness can be provided at a connecting portion between the heat transfer tube and the header plate, and leakage of in-tube fluid (such as coolant) can be avoided.

Figure 43:
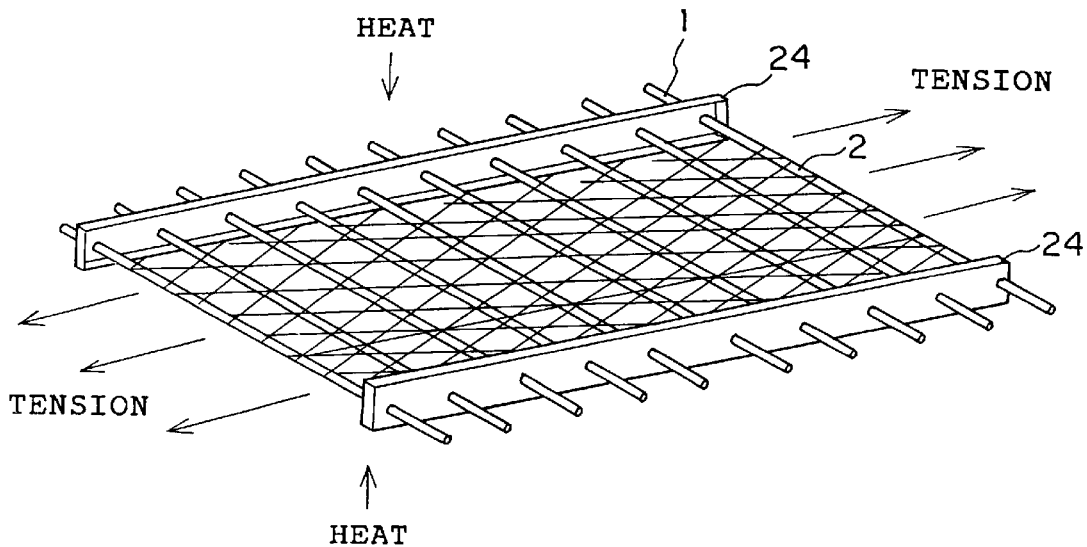
FIG. 43 is a perspective view showing a method of fabrication according to one embodiment of the present invention.

FIG. 43 shows joint between small-gage wires 2, heat transfer tubes 1, and header plates 24 which are plated with brazing material or brazed. In this case, preferably, while tension is continuously applied to the small-gage wires 2 through the heat transfer tubes in an array direction of heat transfer tubes (i.e., in a direction perpendicular to the heat transfer tube), the small-gage wires 2, the heat transfer tubes 1, and the header plates 24 are joined in a furnace or oil. Alternatively, when the heat transfer tube is made of material having high rigidity (such as stainless), tension can uniformly be applied to the entire heat exchanger and an entire heating surface by repulsion of elasticity of the heat transfer tubes restrained by the header plates, and elasticity of the spiral small-gage wires.

While the tension is applied between the heat transfer tubes and the small-gage wires, the joint is made specially for the following reasons. That is, completion of the joint between the small-gage wires and the heat transfer tubes should be avoided in state where the small-gage wire is not in contact with the heat transfer tube due to deformation of the small-gage wire having lower strength and an easily deformable shape. Alternatively, completion of the joint between the small-gage wires and the heat transfer tubes should be avoided in state where plating material or brazing material on the heat transfer tube or the small-gage wire still flows due to a variation in temperature in a furnace at a time of joint.

Therefore, in order to ensure the joint between the small-gage wire and the heat transfer tube, as shown in FIG. 43, the arrayed heat transfer tubes on both sides are pulled to apply tension to the small-gage wires 2 through the heat transfer tubes 1. Alternatively, an entirely heating surface may be deformed to provide a convex heating surface on a single side so as to apply uniform tension by repulsion of elasticity of the restrained heat transfer tube or the restrained small-gage wire.

In this method, the joint can be made in state where the small-gage wires are brought into sure contact with the heat transfer tubes, and the plating material or the brazing material on the joint never flows because of the contact. It is thereby possible to provide a highly reliable heat exchanger in which the small-gage wires can be brought into sure contact with the heat transfer tubes, and a heat transfer performance is more enhanced.

In the embodiment, a description has been given of a plan heating surface including the small-gage wires 2 and the heat transfer tubes 1 in the heat exchanger. However, even in case of curved surfaces as shown in FIGS. 26 and 27, or cylindrical shapes as shown in FIGS. 28 and 29, as in the above discussion, small-gage wires may be joined with heat transfer tubes while tension is continuously applied to the heating surface, resulting in the same effect. The same holds true for a multi-row heat exchanger.

As set forth above, the heat transfer tubes on both sides are pulled to apply tension to both ends, or the entire heating surface is deformed to apply uniform tension to the plurality of heat transfer tubes by spring force of the spiral small-gage wires, thereby providing sure joint between the heat transfer tubes and the small-gage wires. It is thereby possible to provide a high-performance and highly reliable heat exchanger in which a good heat transfer efficiency can be provided, and no separation occurs between the heat transfer tubes and the small-gage wires at a time of use of the heat exchanger.

Figure 44:
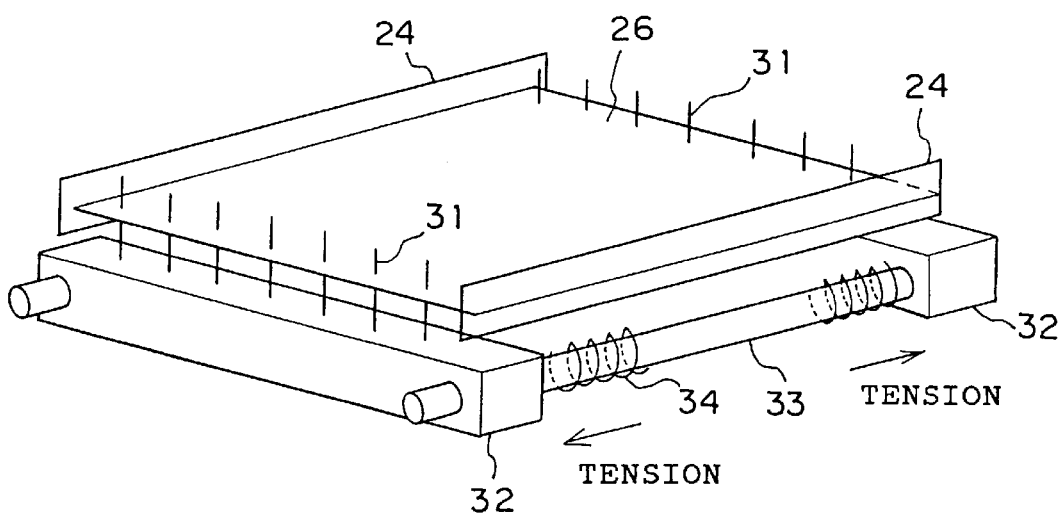
FIG. 44 is a perspective view showing a method of fabrication according to one embodiment of the present invention.

FIG. 44 shows a specific embodiment of an apparatus for applying tension to the heat transfer tube and the small-gage wire. Reference numeral 26 means a heating surface of a heat exchanger, 24 is header plates, 31 is pins disposed at certain intervals, 32 is jigs to fix the pins 31, 33 is a guide shaft for the jigs 32, and 34 is a spring into which the guide shaft 33 is inserted. The jigs 32 are continuously expanded in both side directions by the springs 34 into which the guide shaft 33 is inserted.

Thus, the heat transfer tubes 1 on both sides of the heat exchanger are anchored by the pins 31, thereby continuously applying tension to the small-gage wires in an array direction of the heat transfer tubes. In addition, since a lot of pins 31 are disposed at certain intervals, it is possible to apply uniform tension in the array direction of the heat transfer tubes. It is not always necessary to anchor heat transfer tubes in the outermost rows by the pins. For example, anchoring force may be applied to the plurality of rows of pins by the heat transfer tubes.

Though the heat transfer tubes 1 are restrained by holes in the header plates 24, a diameter of the heat transfer tube 1 is sufficiently small for a length of the heat transfer tube 1. Hence, when the heat transfer tubes 1 on both sides are pulled, the heat transfer tubes 1 are bent to pull the small-gage wires 2. The pulled small-gage wire 2 pulls the heat transfer tube 1 ahead thereof, and the pulled heat transfer tube pulls the next small-gage wire, thereby sequentially applying tension to all the small-gage wires 2. If the heat transfer tubes are pulled without the header plates, the tension is directly applied to the small-gage wires.

The heat exchanger as described above is set on the apparatus, and is inserted into a furnace or dipped into hot oil. Then, while tension is applied to the small-gage wires 2 of the heat exchanger through the heat transfer tubes 1, joint is made between the small-gage wires, the heat transfer tubes, and the header plates. It is thereby possible to provide, in particular, a highly reliable heat exchanger in which sure joint can be made between the small-gage wires and the heat transfer tubes, and sure heat transfer can be carried out.

A description has been given of the apparatus for applying the tension to the heat transfer tubes at both ends of the heat exchanger in the embodiment. However, the tension may also be applied from several positions at an intermediate portion of the heat exchanger. Alternatively, the pins 31 may be fixed to pull the heat transfer tubes on the single side of the heat exchanger, and only the other pins 31 may be pulled by the springs 34 so as to apply tension to the small-gage wires 2 through the heat transfer tubes 1.

In the above discussion, the heat transfer tubes on both sides are pulled by the springs so as to apply tension to the coil-like small-gage wires. Self-weights of the small-gage wire 2 and the heat transfer tube 1 may be used, or diameters of the coil-like small-gage wires may be set smaller than intervals between the holes in the header plates 24 so as to apply the tension. Alternatively, there may be provided another apparatus for pulling the heat transfer tubes on both sides by using power.

A description has been given of the heat exchanger having the header in the embodiment. However, it is possible to provide the same effect by a heat exchanger without header, that is, the heat exchanger including the heat transfer tubes and small-gage wires wound at the heat transfer tubes. Thus, the present invention may also be applied to the heat exchanger without header.

Figure 45:
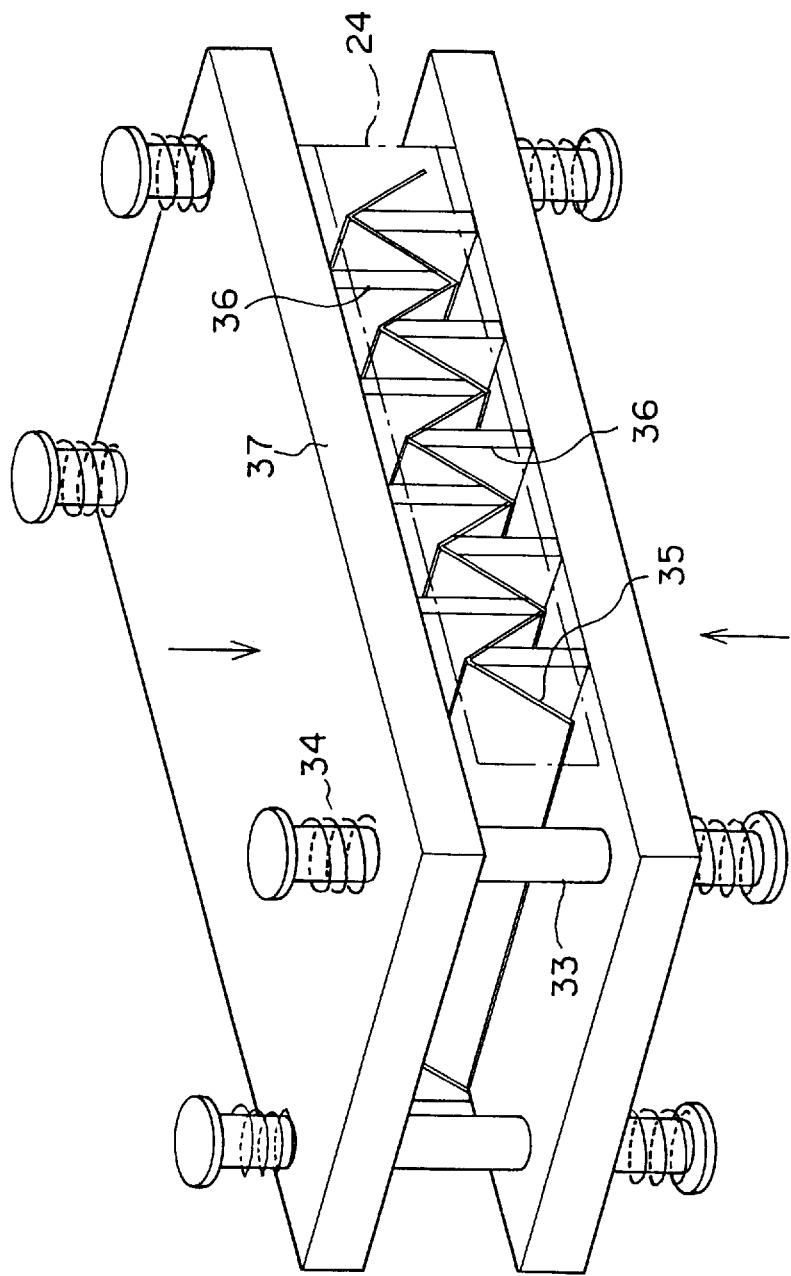
FIG. 45 is a perspective view showing a method of fabrication according to one embodiment of the present invention.

FIG. 45 shows another embodiment of an apparatus for applying tension to heat transfer tubes and small-gage wires for joint. Reference numeral 35 means a wave-like heating surface of a heat exchanger, 24 is a header plate, 36 is plates which are set higher than a wave-height of the heating surface 35 to press the heat transfer tubes, 37 is jigs to fix the plates 36, 33 is guide shafts for the jigs 37, and 34 is springs.

In the apparatus, the plates 36 are disposed to press peaks and troughs of the heating surface 35 of the heat exchanger, thereby applying uniform tension between tops of the peaks and bottom portions of the troughs.

The heat exchanger as described above is set on the apparatus, and is dipped into hot oil or inserted into a furnace. Brazing material is used to join small-gage wires, the heat transfer tubes, and the header plates. In the processing, the heat transfer tubes 1 are joined with the small-gage wires 2 while tension is applied to the small-gage wires 2 by the heat transfer tubes 1 pressed by the plates 36, resulting in sure joint between the small-gage wires 2 and the heat transfer tubes 1. It is thereby possible to provide a highly reliable heat exchanger in which sure heat transfer can be provided between the small-gage wires and the heat transfer tubes.

Further, this apparatus is particularly suitable for joint between the heat transfer tubes 1 and the small-gage wires 2 of the heat exchanger having the wave-like heating surface 35.

Figure 46:
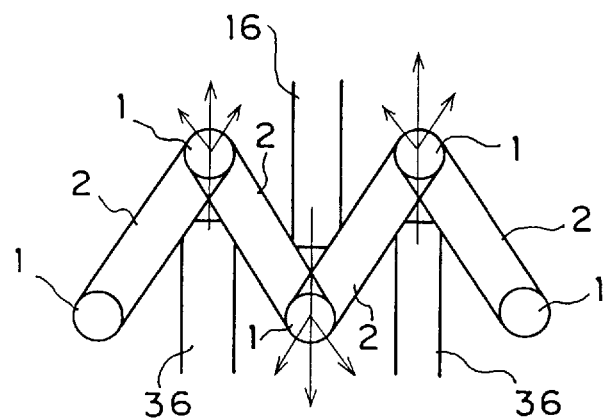
FIG. 46 is an explanatory view showing a method of fabrication according to one embodiment of the present invention.

FIG. 46 shows a heating surface with peaks and troughs pressed. When the peaks and the troughs are pressed as shown in FIG. 46, tension is applied to pull heat transfer tubes so as to enhance tight contact between spiral small-gage wires and the heat transfer tubes, resulting in an enhanced brazing performance.

Though the tension is applied by pressing the tops of the peaks and the bottom portions of the troughs in the embodiment, another apparatus may be employed to pull the tops and the bottom portions, resulting in the same effect. Alternatively, elasticity may be applied to the entire heating surface.

Though the force is applied to the heat transfer tubes in the above discussion, tension may be generated by using repulsion of elasticity of the heat transfer tubes restrained by the header plates, and elasticity of the spiral small-gage wires. In this case, there are methods in which, for example, the heat transfer tubes are pressed from one side, and are entirely deformed so as to provide a convex form.

Figure 47:
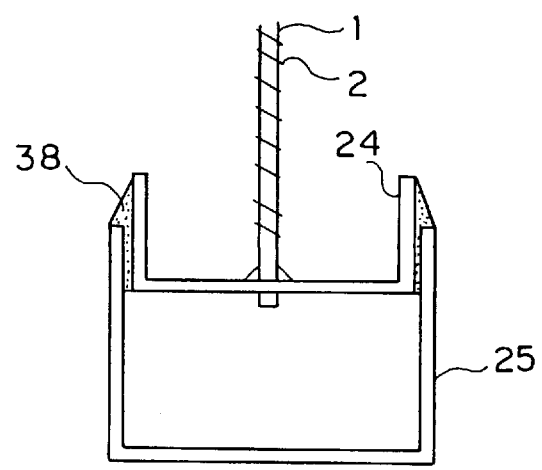
FIG. 47 is a sectional view showing a method of fabricating a heat exchanger according to one embodiment of the present invention.

FIG. 47 is a sectional view showing a method of fabricating a header. Reference numeral 1 means a heat transfer tube, 2 is a small-gage wire, 24 is a header plate, 25 is a header cover, and 38 is brazing material.

After the step of brazing, an excess portion of the heat transfer tube 1 is cut to prevent the heat transfer tube 1 passing through the header plate 24 from contacting the header cover so as to avoid clogging of a hole in the heat transfer tube. For the sake of simplicity of the cutting operation, the header plate 24 is provided with a channel-shaped section, and an opening is directed to the heating surface of the heat exchanger. In such a structure, it is possible to cut the excess portion of the heat transfer tube 1 with no problem.

Subsequently, after the excess portion of the heat transfer tube 1 is cut away, the header plate 24 is coated with the header cover 25. At this time, in the header plate 24 having the channel-shaped section, surfaces of opening distal ends are positioned outer than surfaces coated with the header cover 25. In such a structure, it is possible to easily find an area for welding, and facilitate a welding operation.

Finally, the header plate 24 and the header cover 25 are welded or brazed.

One joint between the heat transfer tube 1 and the small-gage wire 2, and the other joint between the heat transfer tube 1 and the header plate 24 may discretely be made. In this case, it is necessary to avoid, during execution of one joint, separation in the other joint due to heat of welding or brazing, and prevent the melting brazing material from clogging the hole in the heat transfer tube 1. For these purposes, the other joint free from a joint operation may be cooled, or the joints may be made according to a welding process (such as laser welding, or plasma welding) in which heat is caused only in a limited range. It is thereby possible to prevent the separation in the joint, and clogging of the heat transfer tube. In the header structure in the embodiment, the prevention can simply and easily be realized.

As set forth above, since the header plate 24 is provided with the channel-shaped section, it is possible to easily find a surface to be joined with the header cover, and facilitate the cutting operation and the welding operation, resulting in surely improving reliability of the joint. Further, because of the step of finally mounting the header cover 25, it is possible to provide a convenient header which can easily incorporate, for example, a structure or an apparatus for control of a coolant flow.

Though a description has been given of the header plate 24 having the channel-shaped section in the embodiment, the header plate 24 may be provided with a U-shaped section or a semicircular section. Similarly, the header cover 25 may be provided with a U-shaped section or a semicircular section.

Figure 48:
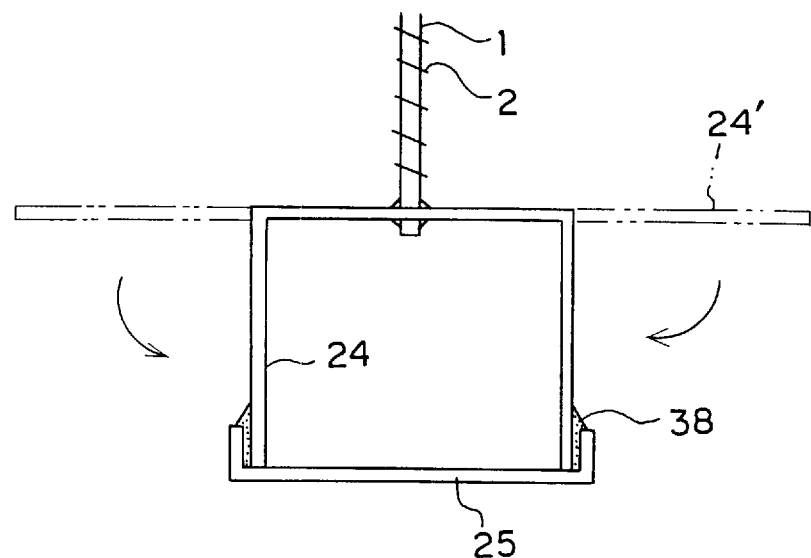
FIG. 48 is a sectional view showing a method of fabricating a heat exchanger according to one embodiment of the present invention.

FIG. 48 is a sectional view showing another method of fabricating a header. Reference numeral 1 means a heat transfer tube, 2 is a small-gage wire, 24 is a header plate, 24' is a bent portion of the header plate 24, 25 is a header cover, and 38 is brazing material or eluting metal.

After the step of brazing, an excess portion of the heat transfer tube 1 passing through the header plate 24 is cut away. Thereafter, the header plate 24 is bent to have a channel-shaped section including the bent portion 24'. The bent portion 24' of the header plate is coated with the header cover 25, and is welded or brazed.

In the embodiment, a joint between the header cover 25 and the header plate 24 is spaced apart from a joint between the heat transfer tube 1 and the header plate 24. Cooling can easily be made to prevent heat at a time of welding or brazing. Though the header plate 24 is provided with the channel-shaped section in the embodiment, the header plate 24 may be provided with a U-shaped section or a semicircular section.

Figure 49:
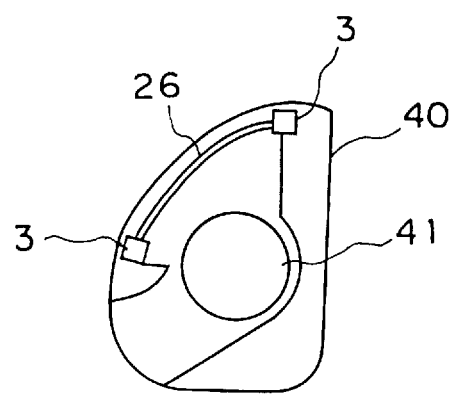
FIG. 49 is an explanatory view showing an air conditioner according to one embodiment of the present invention.

FIG. 49 shows illustrative application of a heat exchanger of the present invention, which is fabricated according to the above method of fabrication. Reference numeral 40 means an illustrative indoor machine of an air conditioner, 26 is a heating surface, 3 is upper and lower headers, and 41 is a fan. The heating surface 26 can be provided with a curved surface according to a shape of the fan, resulting in an increased degree of freedom for a shape of the indoor machine.

Figure 50:
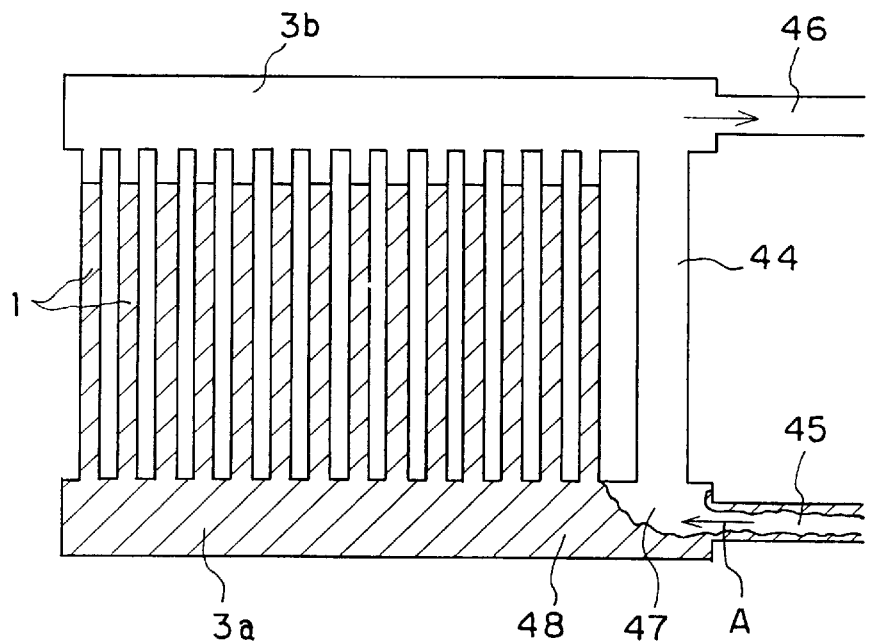
FIG. 50 is a sectional view showing a heat exchanger according to one embodiment of the present invention.

As described above, the heat exchanger of the present invention is used in a coolant circuit as shown in FIG. 1, and is provided with a structure as shown in the perspective view of FIG. 2. FIG. 50 is a sectional view showing the heat exchanger according to the embodiment. Reference numeral 3a means an inlet header disposed at a lower position and connected to inlet coolant piping 45, and 3b is an outlet header disposed at an upper position and connected to outlet coolant piping 46. A plurality of heat transfer tubes 1 are connected between the inlet and outlet headers to form a multi-path evaporator. Reference numeral 44 means a gas bypass pipe to communicate the inlet header 3a with the outlet header 3b. The gas bypass pipe is provided between the heat transfer tube 1 and a connecting portion between the inlet header 3a and the inlet coolant piping 45, and has a larger bore diameter than that of the heat transfer tube 1. The arrow A shows a flow of coolant.

Since the inlet header 3a has a larger sectional area than that of the inlet coolant piping 45, a two-phase coolant flows into the inlet header 3a while the coolant is decelerated. The coolant forms a wave-like flow in which an upper gaseous phase 47 and a lower liquid phase 48 (shaded portion) are separated from one another. Hence, the gaseous phase 47 intensively flows into the gas bypass pipe 44, and only the liquid phase 48 passes through the plurality of heat transfer tubes 1. As a result, it is possible to eliminate an inhomogeneous distribution of the coolant. Thereafter, the coolant flows into the plurality of heat transfer tubes 1 to perform heat exchange between the coolant and out-tube operating fluid, and is evaporated in the tube. After the coolant turns into the gaseous phase to flow into the outlet header 3b, the coolant is discharged through the outlet coolant piping 46 together with the gaseous phase discharged through the gas bypass pipe 44. As a result, it is possible to perform uniform heat exchange in the plurality of heat transfer tubes 1. That is, only in the gas bypass pipe, the heat exchange can not easily be performed due to the flow of the gaseous phase. It is thereby possible to restrain reduction of an effective heating surface area. In the structure including the lower inlet header 3a and the upper outlet header 3b, when the heat exchanger is incorporated in an air conditioner which is long from side to side, it is possible to mount the piping while realizing space saving because of a short distance between the inlet header and the outlet header. Further, the gas-liquid two-phase coolant flows into the inlet header, resulting in a smooth flow of the coolant.

Figure 51:
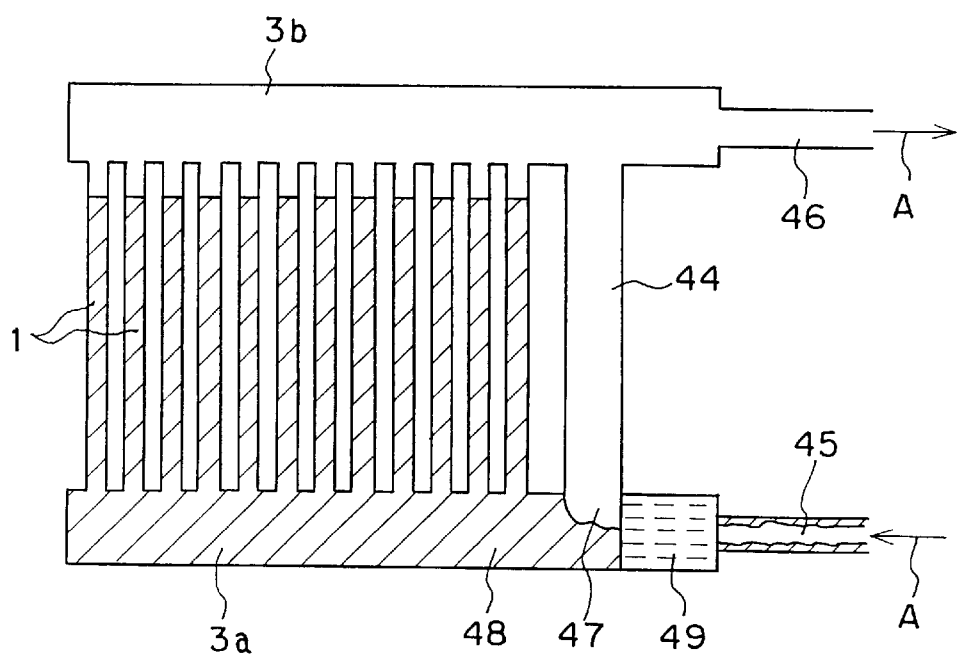
FIG. 51 is a sectional view showing a heat exchanger according to one embodiment of the present invention.

FIG. 51 is a sectional view showing a heat exchanger according to another embodiment of the present invention. Reference numeral 3a means an inlet header disposed at a lower position, and 3b is an outlet header disposed at an upper position. A plurality of heat transfer tubes 1 are connected between the inlet and outlet headers to form a multi-path evaporator. Reference numeral 44 means a gas bypass pipe to communicate the inlet header 3a with the outlet header 3b, 45 is inlet coolant piping, and 46 is outlet coolant piping. Further, reference numeral 49 means a honeycomb-like lattice, serving as rectifying means, mounted between a connecting portion between the inlet header 3a and the inlet coolant piping 45 and the gas bypass pipe 44. In the lattice 49, a plurality of narrow flow paths are formed in a direction of a coolant flow, and holes are provided in walls defining the flow paths. The arrow A shows the coolant flow.

A two-phase coolant flows into the inlet header 3a through the inlet coolant piping 45 while the coolant is decelerated. While the coolant flow is rectified through the lattice 49, an upper gaseous phase 47 and a lower liquid phase 48 are separated from one another. Immediately after passing through the lattice 49, there is a wave-like flow including the upper gaseous phase 47 and the lower liquid phase 48. Hence, the gaseous phase 47 intensively flows into the gas bypass pipe 44, and only the liquid phase passes through the plurality of heat transfer tubes 1. As a result, it is possible to eliminate an inhomogeneous distribution of the coolant. Further, as in the above embodiment, there is an effect of restraining reduction of an effective heating surface area, and a description thereof is omitted. A description has been given of the inlet header 3a disposed at the lower position in the embodiment. However, it is to be noted that the inlet header 3a may be disposed at the upper position as long as a connection of the gas bypass pipe is mounted to an upper portion of the inlet header, resulting in the same effect.

Figure 52:
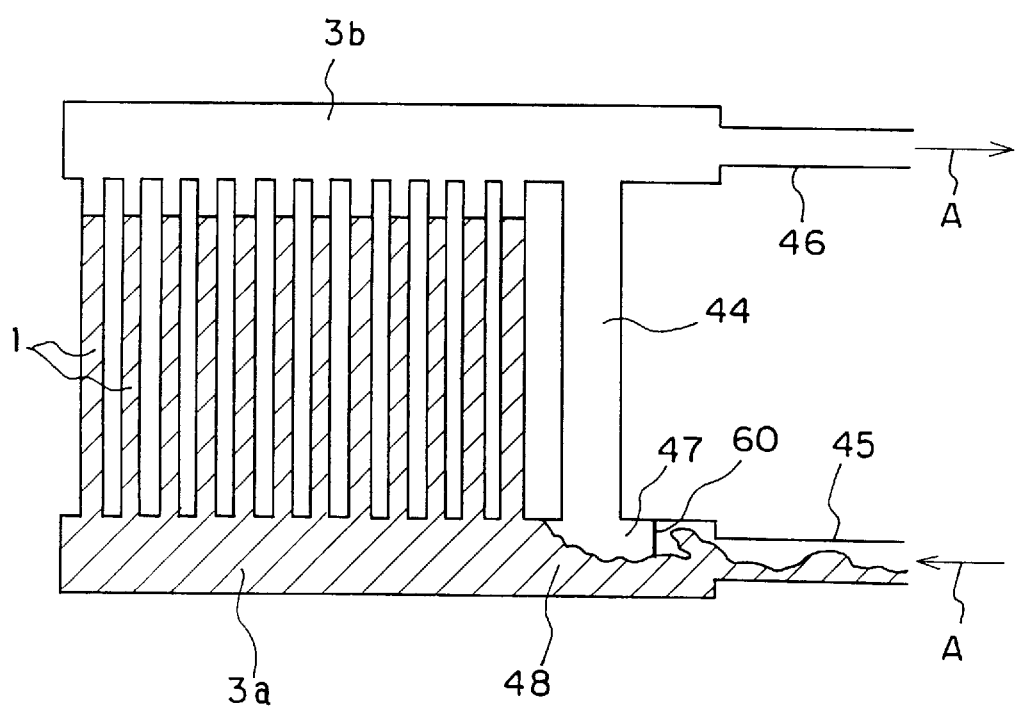
FIG. 52 is a sectional view showing a heat exchanger according to one embodiment of the present invention.

FIG. 52 is a sectional view showing a heat exchanger according to another embodiment of the present invention. Reference numeral 3a means an inlet header disposed at a lower position, and 3b is an outlet header disposed at an upper position. A plurality of heat transfer tubes 1 are connected between the inlet and outlet headers to form a multi-path evaporator. Reference numeral 44 means a gas bypass pipe to communicate the inlet header 3a with the outlet header 3b, 45 is inlet coolant piping, and 46 is outlet coolant piping. Further, a projection 60 extends from an upper portion in a section of a flow path disposed between coolant piping connecting portion of the inlet header 3a and the gas bypass pipe 44. The arrow A shows a flow of coolant.

The coolant A flows into the inlet header 3a through the inlet coolant piping 45 while the coolant is decelerated. Even when the coolant A forms a wave-like flow due to turbulence of a gas-liquid interference, waves are canceled by the projection 60. Therefore, immediately after passing by the projection 60, the coolant flow becomes gentle and tends to be a stratified flow in which an upper gaseous phase and a lower liquid phase are separated from one another. Hence, the gaseous phase 47 more intensively flows into the gas bypass pipe 44, and only the liquid phase passes through the plurality of heat transfer tubes 1. As a result, it is possible to eliminate an inhomogeneous distribution of the coolant. Further, as in the above embodiment, there is an effect of restraining reduction of an effective heating surface area, and a description thereof is omitted. A description has been given of the inlet header 3a disposed at the lower position in the embodiment. However, it is to be noted that the inlet header 3a may be disposed at the upper position as long as a connection of the gas bypass pipe is mounted to an upper portion of the inlet header, resulting in the same effect.

Figure 53:
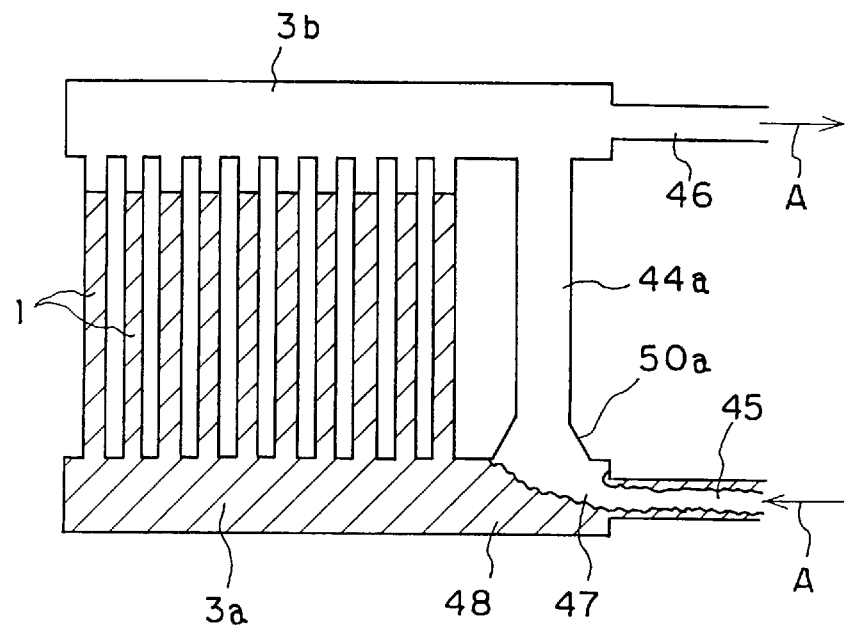
FIG. 53 is a sectional view showing a heat exchanger according to one embodiment of the present invention.

FIG. 53 is a sectional view showing a heat exchanger according to another embodiment of the present invention. Reference numeral 3a means an inlet header disposed at a lower position, and 3b is an outlet header disposed at an upper position. A plurality of heat transfer tubes 1 are connected between the inlet and outlet headers to form a multi-path evaporator. Reference numeral 45 is inlet coolant piping, and 46 is outlet coolant piping. The arrow A shows a flow of coolant. Reference numeral 44a means a gas bypass pipe to communicate the inlet header 3a with the outlet header 3b. In the gas bypass pipe 44a, a portion 50a connected to the inlet header 3a has a larger bore diameter than that of a portion connected to the outlet header 3b. This provides a larger sectional area of a liquid level defined by a connecting portion between the inlet header 3a and the gas bypass pipe 44a. Thus, even in case of a turbulent gas-liquid interface of a two-phase coolant flowing into the inlet header 3a through the inlet coolant piping 45 while the coolant is decelerated, a gaseous phase 47 is easy to intensively flow into the gas bypass pipe 44a. Further, only the liquid phase can more easily pass through the plurality of heat transfer tubes 1. As a result, it is possible to eliminate an inhomogeneous distribution of the coolant. Further, as in the above embodiment, there is an effect of restraining reduction of an effective heating surface area, and a description thereof is omitted.

Figure 54:
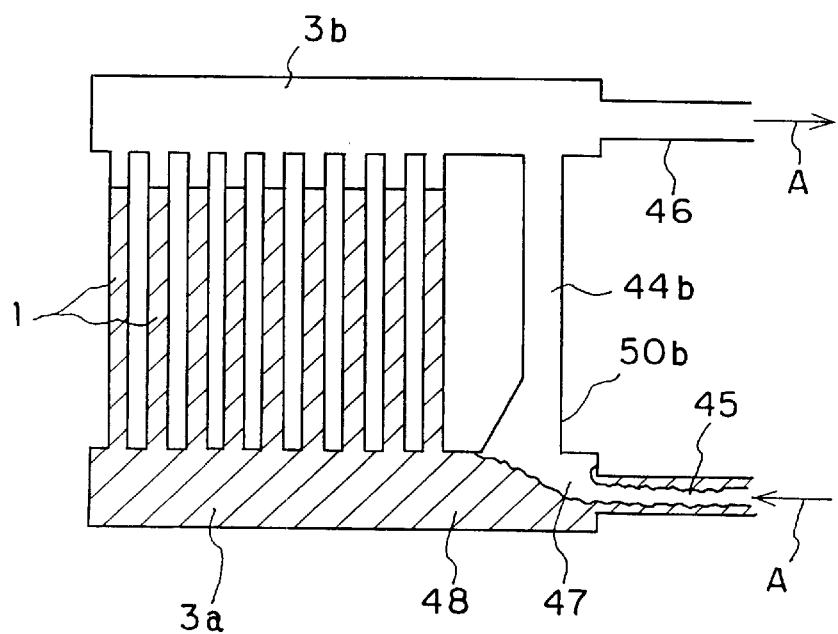
FIG. 54 is a sectional view showing a heat exchanger according to one embodiment of the present invention.

FIG. 54 is a sectional view showing a heat exchanger according to another embodiment of the present invention. Reference numeral 3a means an inlet header disposed at a lower position, and 3b is an outlet header disposed at an upper position. A plurality of heat transfer tubes 1 are connected between the inlet and outlet headers to form a multi-path evaporator. Reference numeral 45 is inlet coolant piping, and 46 is outlet coolant piping. The arrow A shows a flow of coolant. Reference numeral 44b means a gas bypass pipe to communicate the inlet header with the outlet header. In the gas bypass pipe 44b, a portion 50b connected to the inlet header 3a has a larger bore diameter than that of a portion connected to the outlet header 3b, and a tube axis of the gas bypass pipe eccentrically extends on the side of the heat transfer tubes. Thus, even in case of a turbulent gas-liquid interface of a two-phase coolant flowing into the inlet header 3a through the inlet coolant piping 45 while the coolant is decelerated, a liquid phase having higher inertia is easy to directly pass through the connecting portion 50b, and a gaseous phase having lower inertia is easy to intensively flow into the gas bypass pipe 44b. Further, as in the above embodiment, there is an effect of providing a larger sectional area of a liquid level which is defined in the vicinity of the connecting portion 50b. Hence, only the liquid phase is easy to pass through the plurality of heat transfer tubes 1. As a result, it is possible to eliminate an inhomogeneous distribution of the coolant. Further, as in the above embodiment, there is an effect of restraining reduction of an effective heating surface area, and a description thereof is omitted.

Figure 55:
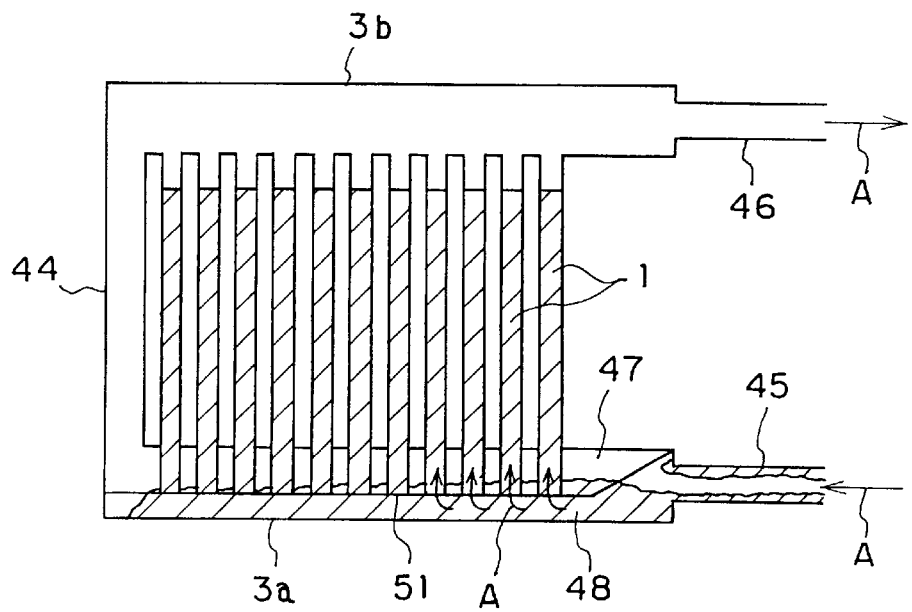
FIG. 55 is a sectional view showing a heat exchanger according to one embodiment of the present invention.
Figure 56:
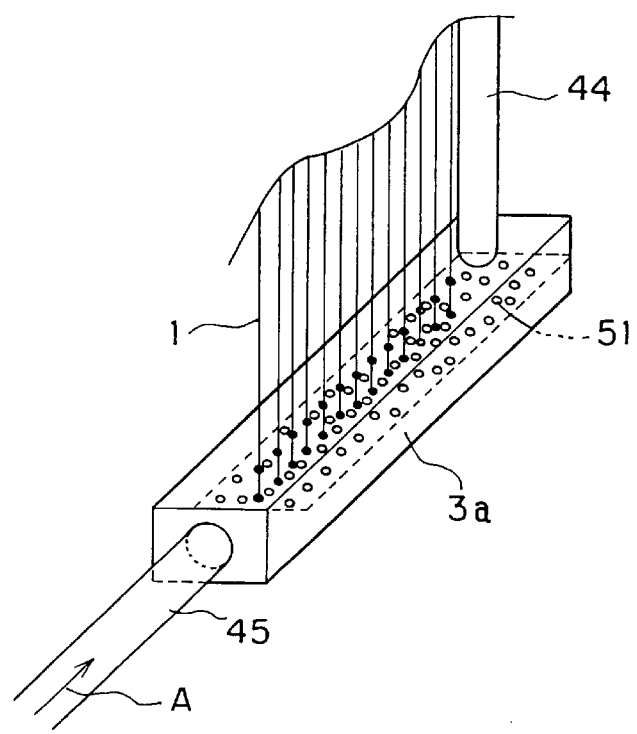
FIG. 56 is a perspective view showing the vicinity of an inlet header of a heat exchanger according to one embodiment of the present invention.

FIG. 55 is a sectional view showing a heat exchanger according to another embodiment of the present invention. FIG. 56 is a perspective view showing the vicinity of an inlet header in the embodiment. Reference numeral 3a means the inlet header disposed at a lower position, and 3b is an outlet header disposed at an upper position. A plurality of heat transfer tubes 1 are connected between the inlet and outlet headers to form a multi-path evaporator. Reference numeral 44 means a gas bypass pipe to communicate the inlet header with the outlet header, 45 is inlet coolant piping, and 46 is outlet coolant piping. Reference numeral 51 means a horizontal perforated plate mounted in the inlet header, through which the heat transfer tubes 1 pass. The horizontal perforated plate 51 partitions a space in the inlet header into upper and lower spaces. The arrow A shows a flow of coolant.

The coolant flows into the inlet header 3a through the inlet coolant piping 45 while the coolant is decelerated. Though the coolant flows along the horizontal perforated plate 51, a gaseous phase 47 having lower specific gravity passes through holes to be naturally positioned at an upper portion of the inlet header, and a liquid phase 48 having higher specific gravity is naturally positioned at a lower portion thereof. Consequently, separated flows are caused in the inlet header. At this time, the horizontal perforated plate 51 drives bubbles in the liquid phase out to the upper portion, and serves to restrain turbulence of a gas-liquid interface. In such a manner, the liquid phase and the gaseous phase are separated from one another. Hence, only the liquid phase passes through the plurality of heat transfer tubes 1 whose openings are positioned under the horizontal perforated plate 51. The gaseous phase 47 intensively flows into the gas bypass pipe 44 which is provided for the inlet header 3a on the side opposed to a connecting portion between the inlet header 3a and the inlet coolant piping 45. As a result, it is possible to eliminate an inhomogeneous distribution of the coolant. Further, a flow velocity is more decreased toward the inner side of the inlet header in its longitudinal direction. It is thereby possible to facilitate separation of a gas from liquid, and sufficiently separate the gas. As in the above embodiment, there is an effect of restraining reduction of an effective heating surface area, and a description thereof is omitted.

Figure 57:
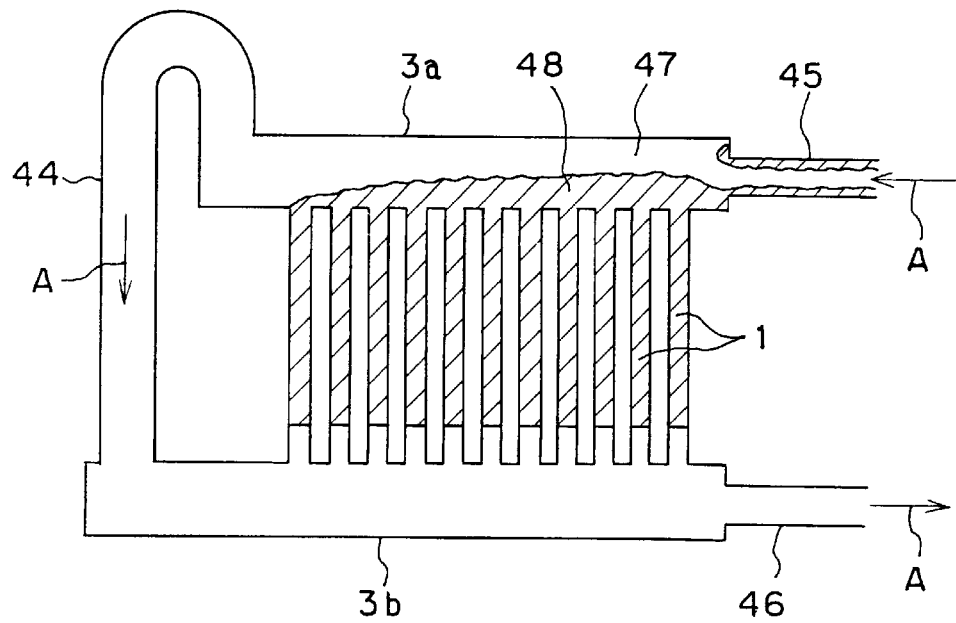
FIG. 57 is a sectional view showing a heat exchanger according to one embodiment of the present invention.

FIG. 57 is a sectional view showing a heat exchanger according to another embodiment of the present invention. In the embodiment, an inlet header 3a is disposed at an upper position, and an outlet header 3b is disposed at a lower position. A plurality of heat transfer tubes 1 are connected between the inlet and outlet headers to form a multi-path evaporator. Reference numeral 44 means a gas bypass pipe to communicate the inlet header with the outlet header. The gas bypass pipe is provided for the inlet header 3a on the side opposed to a connecting portion between the inlet header 3a and inlet coolant piping 45. An upward curved connecting portion is mounted between the inlet header 3a and the gas bypass pipe 44. The arrow A shows a flow of coolant.

The coolant flows into the inlet header 3a through the inlet coolant piping 45 while the coolant is decelerated. The coolant forms a wave-like flow in which an upper gaseous flow 47 and a lower liquid phase are separated from one another. Hence, the liquid phase 48 flows into the plurality of heat transfer tubes 1, and the gaseous phase 47 passes through an upper portion of the inlet header 3a and intensively flows into the gas bypass pipe 44. In this case, because of the curved connecting portion between the inlet header 3a and the gas bypass pipe 44, it is possible to prevent liquid coolant closer to the upper portion of the inlet header 3a from passing through the gas bypass pipe 44 and flowing into the outlet header 3b. As in the above embodiment, there is an effect of restraining reduction of an effective heating surface area, and a description thereof is omitted. As described in the embodiment, the inlet header may be mounted at the upper portion according to a mounting shape of a unit. In such a shape, it is possible to reduce a pressure loss on the inside of the tube by potential energy.

Figure 58:
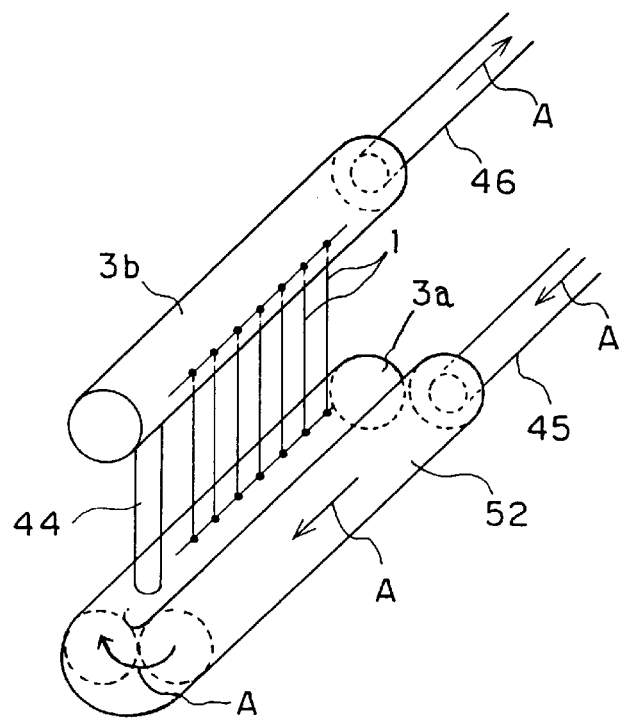
FIG. 58 is a perspective view showing a heat exchanger according to one embodiment of the present invention.

FIG. 58 is a perspective view showing a heat exchanger according to another embodiment of the present invention. Reference numeral 3a means an inlet header disposed at a lower position. The inlet header 3a is bent such that straight tubes having substantially the same length are adjacently disposed to extend. Further, the inlet header 3a includes a first interval 52 connected to inlet coolant piping 45 and serving as an approach run interval of a coolant flow in the inlet header 3a, and a second interval connected to heat transfer tubes 1 and to a gas bypass pipe 44 to communicate the inlet header 3a with an outlet header 3b. Reference numeral 3b means the outlet header disposed at an upper position. A plurality of heat transfer tubes 1 are connected between the inlet and outlet headers to form a multi-path evaporator. The arrow A shows a flow of coolant.

The coolant flows into the straight tube 52 through the inlet coolant piping 45 while the coolant is decelerated. A uniform coolant flow is observed in the first interval 52 serving as the approach run interval, and forms a stratified flow in which an upper gaseous phase 47 and a lower liquid phase 48 are separated from one another. After flowing into the inlet header 3a, the gaseous phase is easy to flow into the gas bypass pipe 44, and the liquid phase 48 is easy to flow into the plurality of heat transfer tubes 1. Hence, the gaseous flow 47 intensively flows into the gas bypass pipe 44. As a result, it is possible to eliminate an inhomogeneous distribution of the coolant. As in the above embodiment, there is an effect of restraining reduction of an effective heating surface area, and a description thereof is omitted.

In the embodiments, descriptions have been given of cases where gas-liquid separation is made, and the liquid level is stabilized by, for example, employing the rectifying means such as honeycomb or projection, varying the position or the diameter of the gas bypass pipe, or providing the long approach run interval. However, it must be noted that the present invention should not be limited to these structures, and may be applied to any structure as long as the liquid coolant can uniformly be distributed to the heat transfer tubes after separation in the structure, that is, as long as the gas-liquid separation is made, liquid level stabilizing means is mounted, and the liquid coolant can uniformly flow into the heat transfer tubes in the structure.

Figure 59:
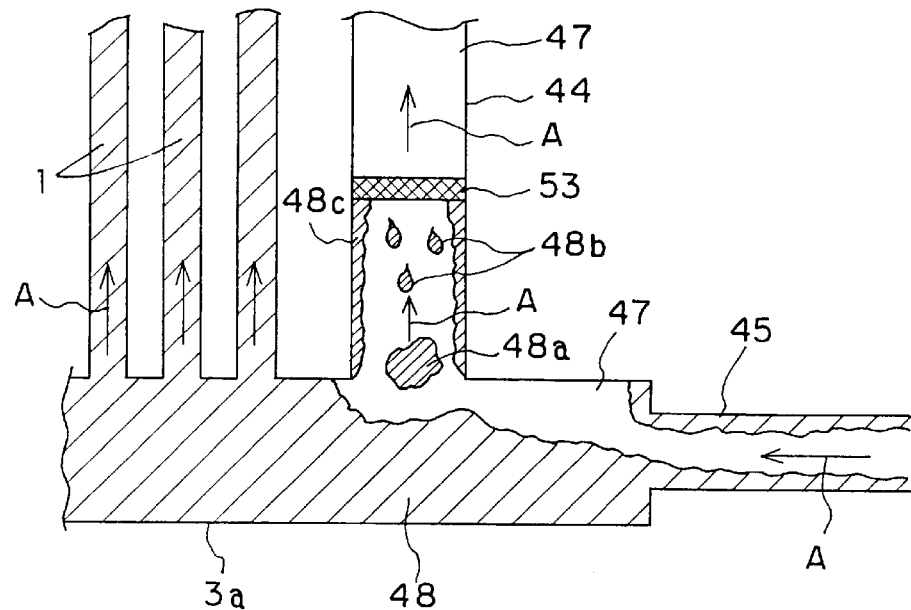
FIG. 59 is a sectional view showing the vicinity of an inlet header of a heat exchanger according to one embodiment of the present invention.

FIG. 59 is a partial sectional view showing a heat exchanger according to another embodiment of the present invention. Reference numeral 3a means an inlet header disposed at a lower position, 1 is a plurality of heat transfer tubes, 44 is a gas bypass pipe, 45 is inlet coolant piping, and 53 is a mesh serving as a gas-liquid separating member mounted for gas-liquid separation in the gas bypass pipe. The mesh 53 is made of Cu, Al, SUS, or the like. The arrow A shows a flow of coolant.

The coolant flows into the inlet header 3a through the inlet coolant piping 45 while the coolant is decelerated. In the coolant, an upper gaseous phase 47 and a lower liquid phase 48 are separated from one another. However, in case of, for example, a great amount of circulating coolant, the gaseous phase 47 may flow into the bypass pipe 44 together with liquid lump 48a and so forth. When liquid reaches a compressor due to an inflow of the liquid lump 48a, the compressor may be destroyed due to compression of the liquid, and a heat exchange performance may be reduced. In a structure in the embodiment, the gaseous phase 47 and the liquid lump 48a upward pass through the gas bypass pipe 44. While the gaseous phase 47 can pass through the mesh 53, the liquid lump 48a collides with the mesh 53 and can not pass through a mesh portion. The liquid lump 48a turns into droplets 48b or liquid membrane 48c to drop by gravity. Hence, only the gaseous flow 47 intensively flows into the gas bypass pipe 44, and only the liquid phase flows into the plurality of heat transfer tubes 1. As a result, it is possible to eliminate an inhomogeneous distribution of the coolant. Further, no liquid phase flows into an outlet header, and a back flow of the liquid can be avoided. As a result, it is possible to enhance reliability of a coolant circuit. As in the above embodiment, there is an effect of restraining reduction of an effective heating surface area, and a description thereof is omitted. In this case, in order to avoid an effect of pulsation of the liquid, the mesh is preferably mounted at a position lower than an intermediate portion of the gas bypass pipe 44.

Figure 60:
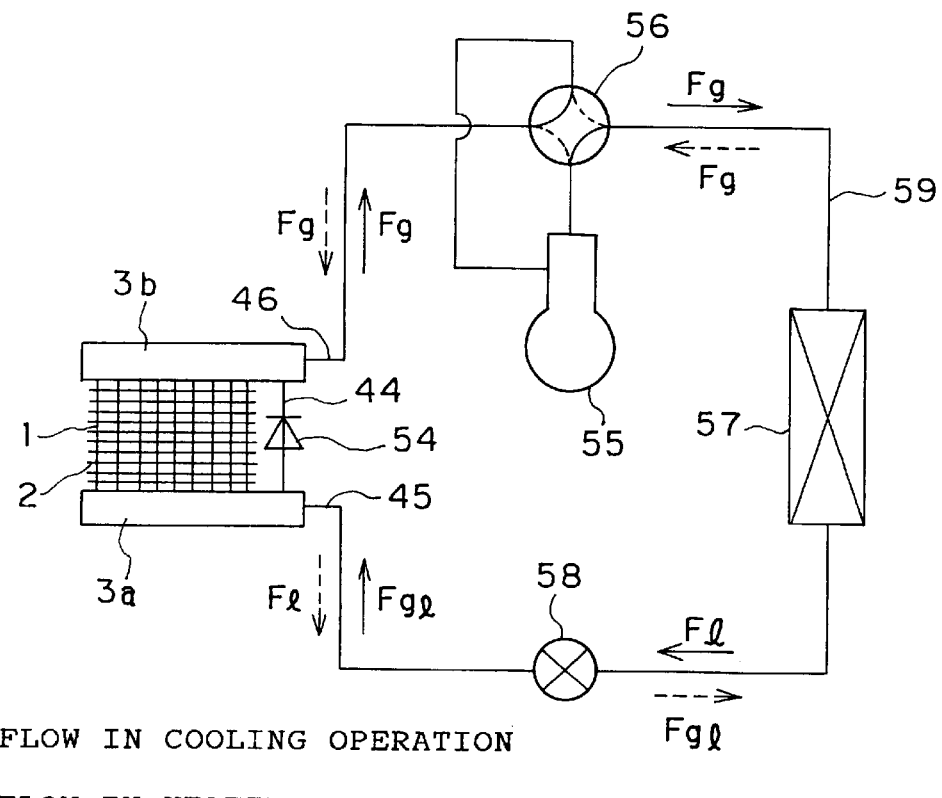
FIG. 60 is a circuit diagram showing a coolant circuit including a heat exchanger according to one embodiment of the present invention.

FIG. 60 is a circuit diagram showing a coolant circuit according to one embodiment of the present invention. In the drawing, the present invention is applied to a heat exchanger of an indoor machine of a heat pump. The solid line arrow Fg shows a flow of gaseous phase coolant during cooling operation, the solid line arrow Fl is a flow of liquid phase coolant during the cooling operation, the solid line arrow Fgl is a flow of gas-liquid two-phase coolant during the cooling operation, the dotted line arrow Fg is a flow of the gaseous phase coolant during heating operation, the dotted line arrow Fl is a flow of the liquid phase coolant during the heating operation, and the dotted line arrow Fgl is a flow of gas-liquid two-phase coolant during the heating operation.

Reference numerals 3a and 3b mean an inlet header and an outlet header during the cooling operation, and mean the outlet header and the inlet header during the heating operation. Further, reference numerals 45 and 46 mean inlet coolant piping and outlet coolant piping during the cooling operation, and mean outlet coolant piping and inlet coolant piping during the heating operation. Reference numeral 1 means a plurality of heat transfer tubes, 2 is a heating fin, 44 is a gas bypass pipe, and 54 is a check valve provided for the gas bypass pipe. Reference numeral 55 means a compressor, 56 is a four-way valve, 57 is a heat exchanger of an outdoor machine, 58 is an expansion valve, and 59 is coolant piping.

During the cooling operation, the gaseous phase coolant is discharged from the compressor 55 to pass through the four-way valve 56, thereafter causing radiation of heat in the heat exchanger 57 (in this case, a condenser) of the outdoor machine. The gaseous phase coolant turns into the liquid phase coolant in the heat exchanger 57, and turns into the gas-liquid two-phase coolant in the expansion valve 58 through pressure reduction and expansion. Further, the coolant passes through the inlet coolant piping 45, and flows into the inlet header 3a of the heat exchanger (in this case, an evaporator) of the indoor machine. As described in the above embodiments, the gaseous phase coolant flows into the gas bypass pipe 44, and the liquid phase coolant flows into the plurality of heat transfer tubes 1. Further, the coolant entirely turns into the gaseous phase coolant through endothermic reaction to flow into the outlet header 3b. Subsequently, the coolant passes through the outlet header 3b, the outlet coolant piping 46, and the four-way valve 56, thereafter returning to the compressor 15.

On the other hand, during the heating operation, the gaseous phase coolant is discharged from the compressor 55 to pass through the four-way valve 56, thereafter flowing into the inlet header 3a through the inlet coolant piping 45. Further, the coolant moves in directions to flow into the plurality of heat transfer tubes 1 and the gas bypass pipe 44. However, since the gas bypass pipe is closed by an action of the check valve 54, no gaseous coolant can bypass through the gas bypass pipe. The coolant can uniformly flow into the heat transfer tubes 1 because of a single-phase gas. Thereafter, the coolant causes radiation of heat in the heat transfer tubes 1 to turn into liquid, and the liquid phase coolant passes through the outlet coolant piping 46. Through pressure reduction and expansion in the expansion valve 58, the coolant turns into the gaseous phase coolant through endothermic reaction in the outdoor heat exchanger 57 (in this case, an evaporator), and passes through the four-way valve 56 to return to the compressor.

As stated above, the check valve is provided in the course of the gas bypass pipe. It is thereby possible to use the heat exchanger of the present invention as the evaporator and the condenser. Thus, the heat exchanger of the present invention can be used for the coolant circuit to drive the heat pump. Further, it is possible to realize cost reduction because of a simple structure, and provide higher reliability because of no operating part in the structure. In addition, the check valve 54 can easily be replaced.

Figure 61:
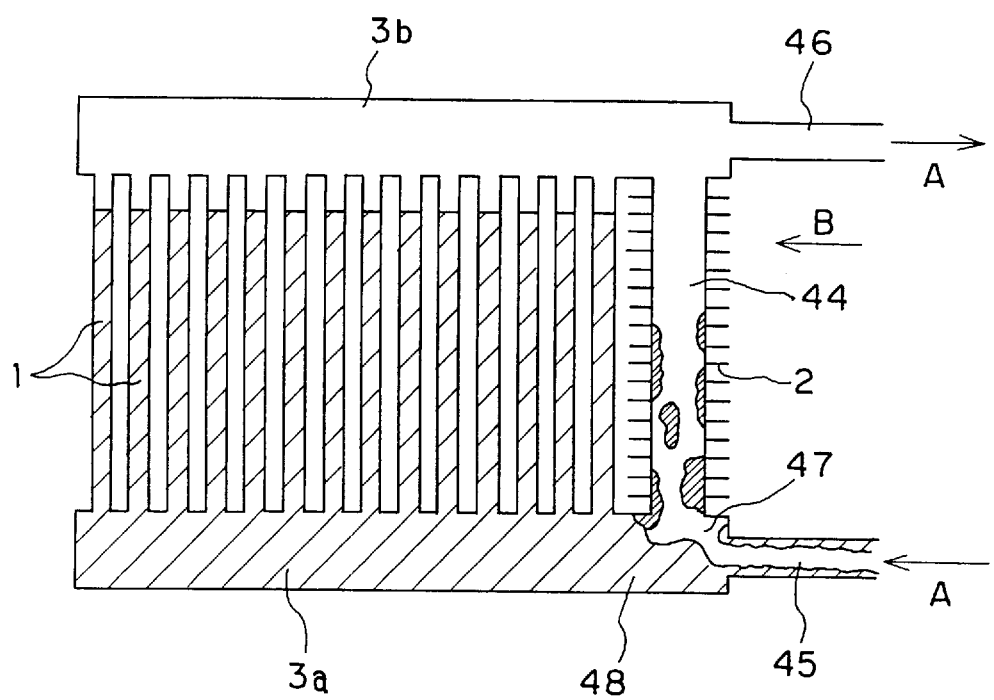
FIG. 61 is a sectional view showing a heat exchanger according to one embodiment of the present invention.
Figure 62:
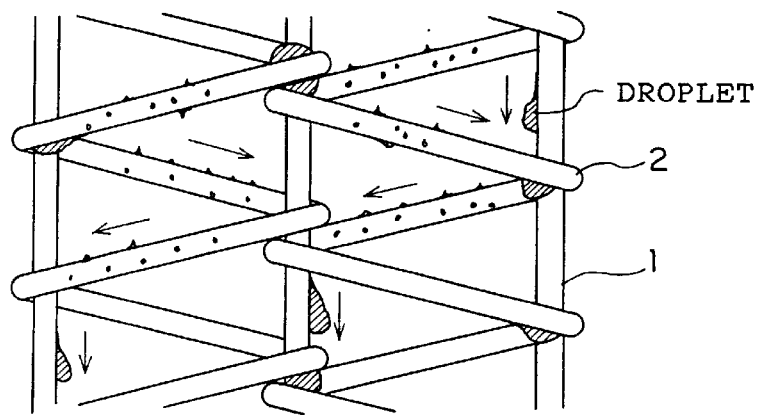
FIG. 62 is an explanatory view showing a heat exchanger according to one embodiment of the present invention.

FIG. 61 is a sectional view showing a heat exchanger according to another embodiment of the present invention. Reference numeral 3a means an inlet header disposed at a lower position, and 3b is an outlet header disposed at an upper position. A plurality of heat transfer tubes 1 are connected between the inlet and outlet headers to form a multi-path evaporator. Reference numeral 44 means a gas bypass pipe to communicate the inlet header with the outlet header. A fin 2 is provided for an outer surface of the gas bypass pipe 44. Reference numerals 45 means inlet coolant piping, and 46 is outlet coolant piping. The arrow A shows a flow of coolant.

The two-phase coolant flows into the inlet header 3a through the inlet coolant piping 45 while the coolant is decelerated. The coolant forms a stratified flow in which an upper gaseous flow 47 and a lower liquid phase 48 are separated from one another. The gaseous phase 47 intensively flows into the gas bypass pipe 44, and only the liquid phase 48 flows into the plurality of heat transfer tubes 1. In this case, the gaseous phase 47 including partial liquid phase may directly flow into the gas bypass pipe 44. However, the liquid phase flowing into the gas bypass pipe 44 is evaporated by heat exchange between the liquid phase and out-tube operating fluid B (such as air) flowing above the fin 2, and only the gaseous phase flows into the outlet header 3b. As a result, no liquid phase flows into the outlet header, and a back flow of liquid can be avoided. It is thereby possible to eliminate an inhomogeneous distribution of the coolant, and enhance reliability of a coolant circuit. As in the above embodiment, there is an effect of restraining reduction of an effective heating surface area, and a description thereof is omitted. It must be noted that the fin 2 in the embodiment may be applied to the various types of heat exchangers according to the above embodiments, resulting in the same effect.

In a heat exchanger having several tens to several hundreds paths, a lot of narrow heat transfer tubes are used to connect an inlet header to an outlet header. When the apparatus are arrayed on the upper and lower sides, there are loads applied to the narrow tubes, such as loads of the headers, loads of coolant inlet and outlet piping, and vibration during operation and so forth. If force is uniformly applied to the tubes, no major problem is caused. However, if excessive force is locally applied to, for example, the side connected to the inlet and outlet piping, there are possible problems of breakage of the narrow tubes in service, leakage of coolant, a reduced lifetime, and so forth. Hence, a gas bypass pipe having a diameter several times or more than that of the narrow tube is provided at a position to which the loads and the vibration are frequently applied. It is thereby possible to use the gas bypass pipe as a strength member so as to hold the apparatus by the gas bypass pipe together with the narrow tubes in view of strength, resulting in a highly reliable apparatus.

Figure 63:
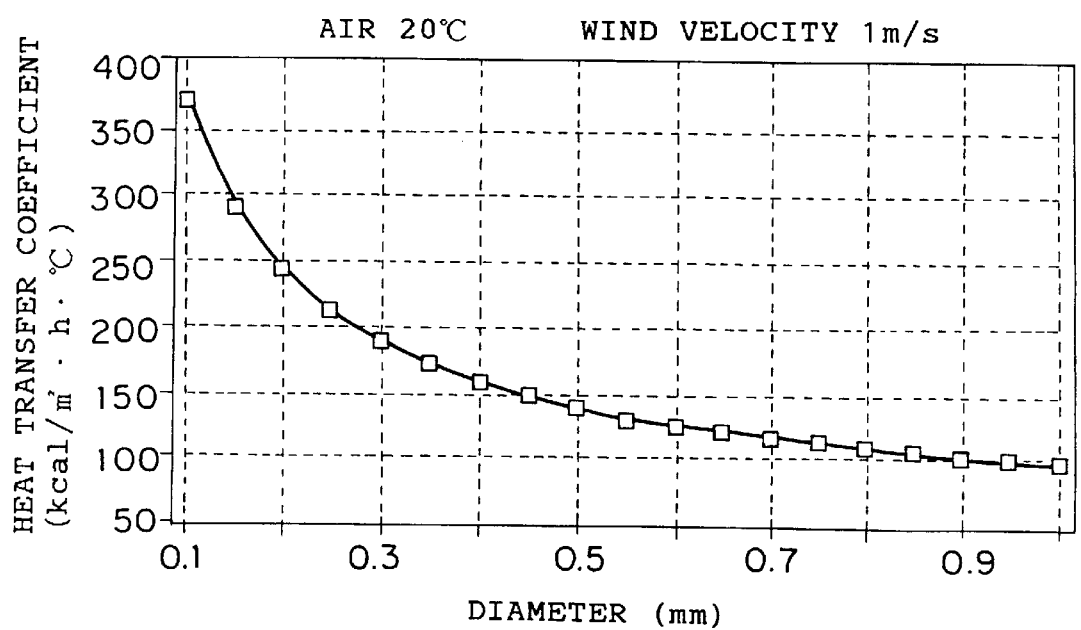
FIG. 63 is a characteristic view showing heat transfer coefficient of a fin according to the present invention.
Figure 64:
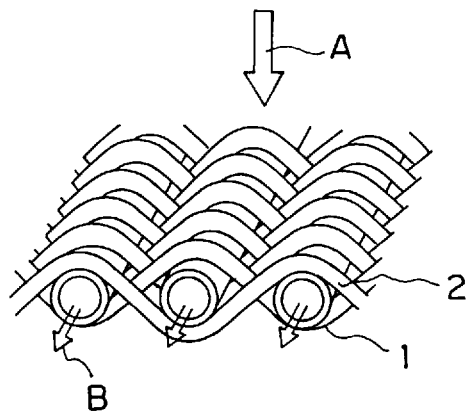
FIG. 64 is a perspective view of a conventional heat exchanger.
Figure 65:
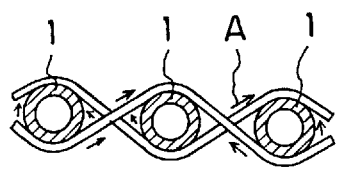
FIG. 65 is a sectional view of a conventional heat exchanger.
Figure 66:
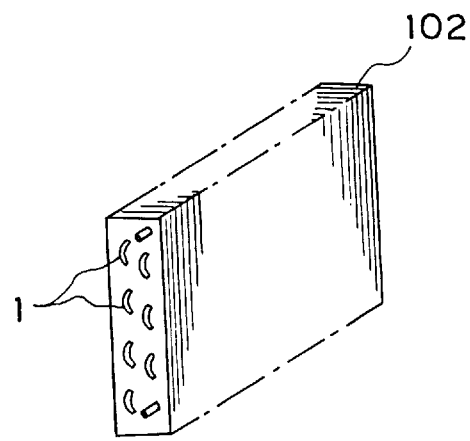
FIG. 66 is a perspective view of a conventional heat exchanger.
Figure 67:
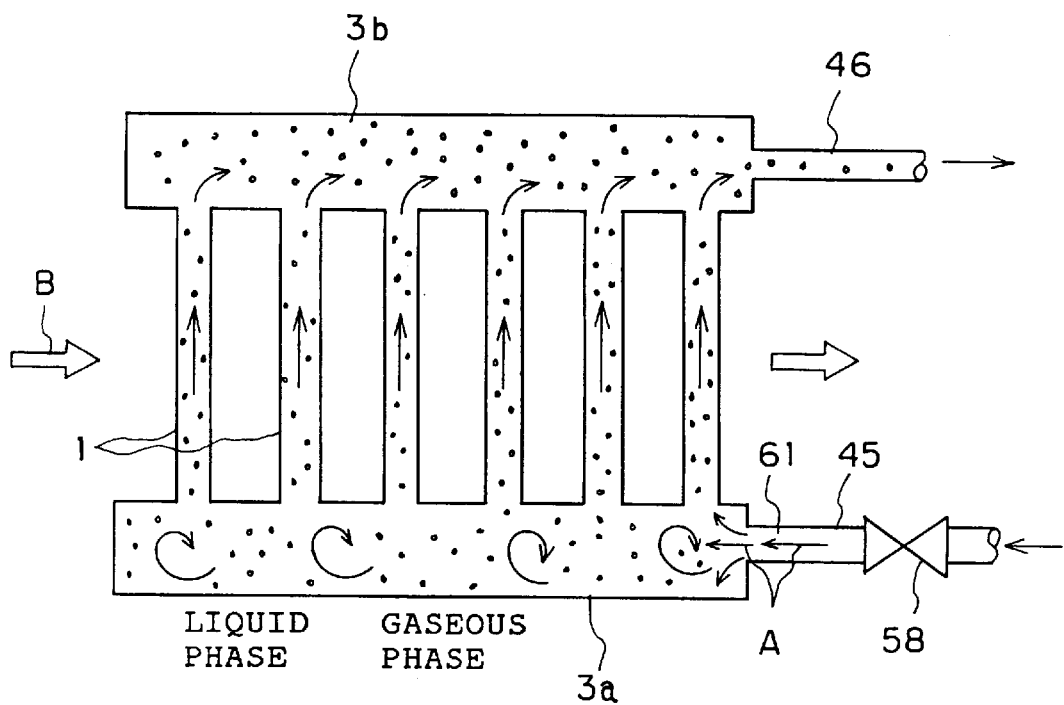
FIG. 67 is a sectional view of a conventional heat exchanger.
Figure 68:
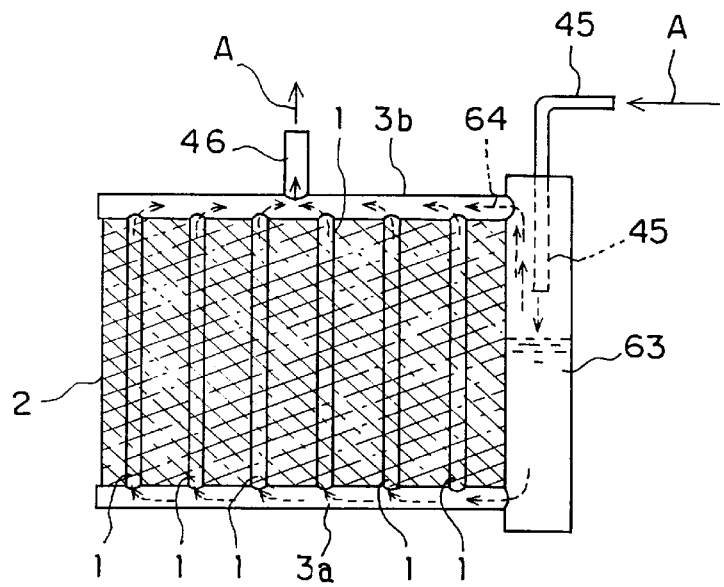
FIG. 68 is a sectional view of a conventional heat exchanger.
Figure 69:
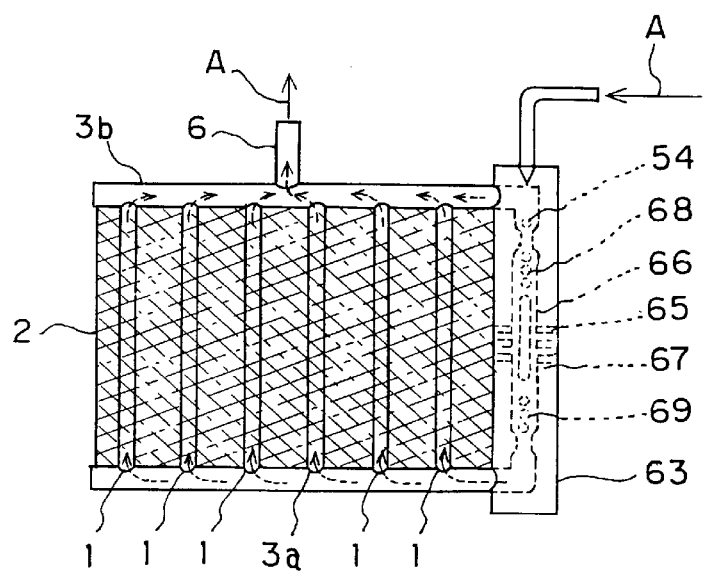
FIG. 69 is a sectional view of a conventional heat exchanger.
Figure 70:
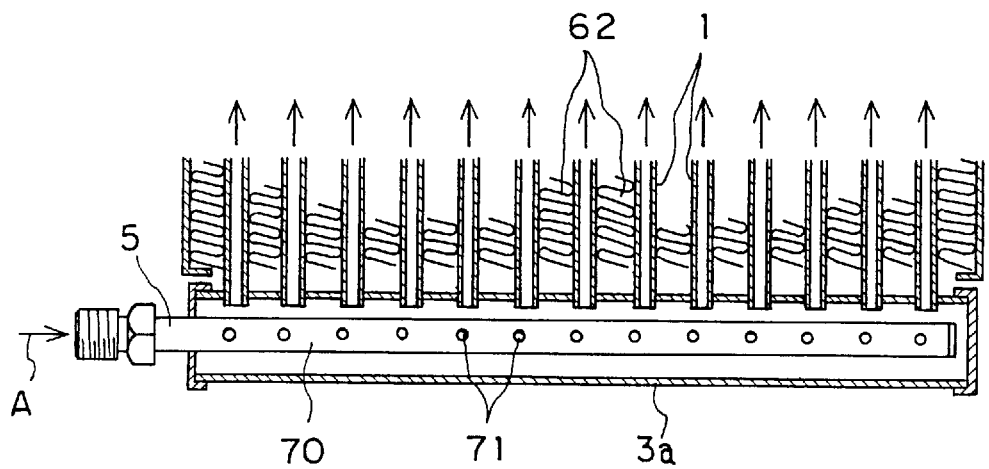
FIG. 70 is a sectional view of an inlet header portion of a conventional heat exchanger.
Figure 71:
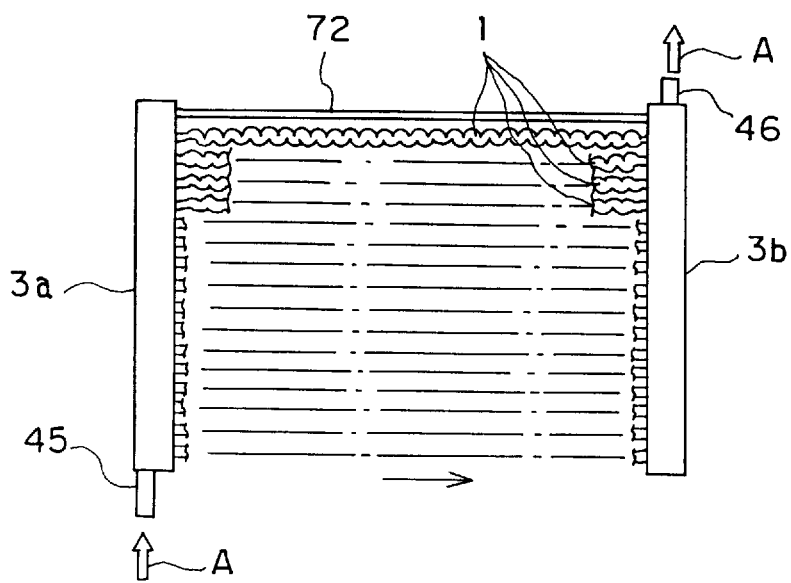
FIG. 71 is a front view of a conventional heat exchanger.

As shown in FIGS. 4 to 7, in the heat exchanger of the present invention, the one spiral fin is wound at the plurality of heat transfer tubes. In the structure, the spiral is preferably canted as shown in FIG. 8. Referring now to FIG. 63, in view of the canted spiral, a description will now be given of a mechanism of drain of droplets generated by dehumidification.

The small-gage wire fin is wound at the heat transfer tube in the spiral manner, thereby forming an angle of the small-gage wire with respect to a horizontal direction. Therefore, the droplets generated by dehumidification on the small-gage wire fin can more easily drop by gravity to positions where the heat transfer tubes are in contact with the small-gage wire fin. Further, capillarity is generated because of slight gaps at the positions where the heat transfer tubes are in contact with the small-gage wire fin, and the droplets can more easily be attracted and moved to the positions where the heat transfer tubes are in contact with the small-gage wire fin. As set forth above, the small-gage wire fin is wound at the heat transfer tube in the spiral manner. Thus, by the gravity and the capillarity, the droplets generated by dehumidification on the small-gage wire fin can more easily be moved to the positions where the heat transfer tubes are in contact with the small-gage wire fin. The droplets are concentrated at a contact position between the heat transfer tubes and the small-gage wire fin, and grow to a certain size. Thereafter, the droplets move and drop by the gravity along the heat transfer tube. Further, the droplets drop while absorbing other droplets existing in a dropping direction. As a result, droplets can more rarely be held in the entire heat exchanger. Further, it is possible to restrain reduction of an amount due to reduction of an air flow.

Further, the fin is provided in the spiral form, thereby providing a larger contact portion between the heat transfer tube and the fin. In spite of a substantial point contact in a mesh-type structure, a linear contact portion can be provided in this structure since the fin is wound at the heat transfer tube. That is, when one fin is wound at two heat transfer tubes in a spiral manner, a semicircular contact portion can be obtained for each heat transfer tube, and a longer contact portion can be obtained with a larger angle of spiral. It is thereby possible to provide an enhanced heat transfer characteristic, and make the apparatus more compact. Further, it is possible to provide a highly reliable apparatus in which the heat transfer tube and the fin are surely joined, and are more rarely be separated from one another, resulting in higher strength. As a result, it is possible to facilitate handling at a time of transportation, assembly, or the like, thereby providing an apparatus offering handling ease.

On the other hand, because of the above winding in the spiral manner, it is possible to provide an apparatus having a high hydro-extracting performance. In water, surface tension is generated so that each part of a liquid surface is extracted as if an elastic membrane is tensed. Further, the liquid surface is forcedly attracted to and concentrated at the slight gap. That is, the water moves along the upper and lower heat transfer tubes, and is concentrated at a drain pan (not shown) disposed at a lower portion of the heat exchanger. As a result, it is possible to provide an apparatus which can continuously hold a good heat transfer characteristic.

In the structure of the present invention, a pipe diameter is extremely smaller than that of a conventional heat exchanger. Therefore, a considerably lot of flow paths are provided in order to avoid an increase in a pressure loss in the pipe. On the other hand, uniform separation of the coolant becomes important. Since the uniform separation can be obtained in case of a flow including only liquid coolant, the gas-liquid two-phase coolant is divided into a gas and liquid to pass the liquid through the heat transfer tubes and pass the gas through the bypass pipe 44 of FIG. 1. Referring now to FIG. 63, a description will now be given of the reason why a more excellent air side performance can be obtained with smaller diameters of the heat transfer tubes and the fin in the structure. When a representative size of the diameter related to heat transfer is reduced, it is possible to reduce development of a thermal boundary layer, and bring most of a heating portion into contact with flesh fluid. It is thereby possible to provide higher heat transfer coefficient. That is, by reducing the outer diameters of the heat transfer tubes and the fin so as to reduce the representative size, it is possible to provide a heat exchanger in which higher heat transfer coefficient can be obtained. FIG. 63 shows the embodiment in which the heat transfer coefficient can remarkably be enhanced by providing the fin diameter smaller than 0.5 mm.

Further, because of the reduced outer diameters, the heat transfer tubes and the fin are provided with reduced thicknesses in an air flow direction. It is thereby possible to reduce an air side pressure loss. As a result, as compared with the conventional apparatus, it is possible to realize noise reduction or an improved performance according to an increase in an air flow.

That is, in the heat exchanger, the fin wound in the spiral manner has the diameter smaller than 0.5 mm, the narrow heat transfer tubes are employed, and the gas and liquid are separated to flow, resulting in a remarkably excellent heat transfer characteristic. At the same time, performances such as a reduced windage loss are far advanced, and a more compact and more reliable heat exchanger can be provided. Besides, the narrow tube can easily be, for example, bent, and the headers larger than the narrow tube allow optional arrangement of the heat transfer tubes, and the plurality of rows. Hence, the heat exchanger can be provided with an optional form so that optional designs can be selected for other component parts such as fin and for structures of the indoor machine and so forth. It is thereby possible to select the optimal product performance and product shape. That is, it is possible to provide a refrigeration system or an air conditioner which can be set at a narrower or smaller space, and to provide the air conditioner or the refrigeration system which is convenient for a user.

In the above discussion employing the small-gage wires, i.e., thread fins, the numerical values are for illustrative purposes only, and it must be noted that the values may be varied according to, for example, ambient conditions, a type of coolant, and types, temperatures, velocities of air or other heat exchanging gases and heat exchanging liquid. However, it can be understood that the numerical values highly depend upon a thread diameter. Needless to say, for the fin of the heat exchanger, it is necessary to find the optimal thread diameter in view of, as well as heat transfer coefficient, a pressure loss, a heating surface area, a fin efficiency, and so forth. Thus, it is apparent that the present invention should not be limited to the structures and the sizes in the above embodiments.

According to the present invention, in order to separate the gas from the liquid in the gas-liquid two-phase coolant, the inlet header larger than the inlet piping is employed so as to make use of expansion of the sectional area. The separation is carried out by making use of a difference in specific gravity between the gaseous phase and the liquid phase, for example, a difference in that one specific gravity ranges from about 40 to 60 times the other specific gravity in fluorocarbons. This causes a large difference in flow velocity, and further enhances an efficiency of the separation in the above structure. In addition, because of stabilization of the liquid level, it is possible to avoid the effect of the pulsation of the liquid so as to provide smooth distribution of the coolant, and stabilize a heating performance.

As stated above, there are the following effects according to the present invention.

In the heat exchanger of the present invention, the one, or two or more small-gage wires are wound in the spiral manner to form the fin, thereby generating the three-dimensional turbulence. Thus, heating of the small-gage wire fin in the downstream can be promoted, and the small-gage wires do not intersect each other in the cross-section perpendicular to the heat transfer tubes. Further, the larger gap can be established between the small-gage wires in the air flow direction. Therefore, even when vapor in the air condenses, the droplets can more rarely be held. Further, even when the heat exchanger is used with a wet surface thereof, clogging is more rarely caused, resulting in a lower pressure loss. Consequently, it is possible to restrain reduction of the amount of heat exchange due to reduction of the air flow.

Therefore, even if the heat exchanger is used in such a circumstance that moisture in the air condenses, the drops of water are more rarely held so that the clogging is more rarely caused. As a result, there is an effect of restraining reduction of the amount of heat exchange due to the reduction of the air flow.

Further, in the heat exchanger of the present invention, the adjacent heat transfer tubes disposed at certain intervals are respectively paired. The heating fin including the one, or two or more small-gage wires is wound for each pair of heat transfer tubes, thereby generating the three-dimensional turbulence. Thus, heating of the heating fin in the downstream can be promoted, and the larger area can be provided in the cross-section perpendicular to the heat transfer tube. Thus, even when vapor in the air condenses, the drops of water can more rarely be held. Further, even when the heat exchanger is used with the wet heating surface, clogging is more rarely caused, resulting in a smaller pressure loss. Consequently, it is possible to restrain reduction of the amount of heat exchange due to reduction of the air flow.

The out-tube fluid passes through the heat exchanger to generate the three-dimensional turbulence while the out-tube fluid is accelerated. As a result, there are effects of an increase in out-tube heat transfer coefficient, and promoted heating.

In addition, since the larger area can be provided in the cross-section perpendicular to the heat transfer tube, the drops of water generated by dehumidification can more rarely be held in the structure. Therefore, even if the heat exchanger is used in such a circumstance that moisture in the air condenses, the drops of water are more rarely held so that the clogging is more rarely caused. As a result, there is an effect of restraining reduction of the amount of heat exchange due to the reduction of the air flow.

Further, according to the present invention, there is provided the heat exchanger used for air conditioning, in which the plurality of heat transfer tubes are disposed at certain intervals, and the small-gage wires forming the heating fin and the heat transfer tubes are assembled in the mesh-type structure. The one, or two or more small-gage wires are wound at the adjacent right and left heat transfer tubes in the spiral manner. The out-tube fluid passes through the heat exchanger to generate the three-dimensional turbulence while the out-tube fluid is accelerated. As a result, there are effects of an increase in out-tube heat transfer coefficient, and promoted heating. In addition, the small-gage wires 2 are wound in the spiral manner. Consequently, the small-gage wires do not intersect each other in the cross-section perpendicular to the heat transfer tubes, and the larger gap can be established between the small-gage wires in the air flow direction. Further, the small-gage wires rarely serves as obstacles in the tube axial direction of the heat transfer tube. Therefore, even if the heat exchanger is used in such a circumstance that moisture in the air condenses, the drops of water are rarely held so that clogging is more rarely caused. As a result, there is an advantage of restraining reduction of the amount of heat exchange due to reduction of the air flow. In addition, there is another effect in that an increase in the angle of spiral can increase a heating surface area greater than a heating surface area in the mesh-type structure with the same pitch.

According to the present invention, the heat exchanger has the above structure. In the heat exchanger, the plurality of heat transfer tubes are disposed, and the disposed heat transfer tubes are respectively pulled in the opposite directions to apply tension to the small-gage wires. While applying the tension, the small-gage wires are joined with the outer surfaces of the heat transfer tubes. Thus, it is possible to ensure the tight contact between the small-gage wires and the heat transfer tubes, and correct deformation of the small-gage wires. It is thereby possible to provide a highly reliable heat exchanger in which the out-tube fluid can smoothly flow, and the heat exchange performance can be enhanced.

Further, the brazing material having the predetermined thickness is previously applied to any one of the outer surfaces of the heat transfer tubes and the hole portion surfaces of the headers. The previously applied brazing material is melted and cooled to join the both ends of the heat transfer tubes with the hole portions in the headers. Control is made such that the applied brazing material is concentrated and condensed at the joints between the heat transfer tubes and the headers, thereby surely avoiding leakage of the in-tube fluid. It is thereby possible to provide a highly reliable apparatus in which the heat exchanging ability is never reduced.

The brazing material having the predetermined thickness is previously applied to the outer surface of at least any one of the small-gage wires and the heat transfer tubes, and to at least any one of the outer surfaces of the heat transfer tubes and the hole portion surfaces of the headers. The previously applied brazing material is melted and cooled to join the small-gage wires with the outer surfaces of the heat transfer tubes, and join the both ends of the heat transfer tubes with the hole portions in the headers. Hence, no variation is caused in the heat transfer tubes due to thermal deformation of the small-gage wires. Further, it is possible to reduce repetition of joint operation and joint energy for the heat transfer tubes, the small-gage wires, and the headers. It is thereby possible to provide a highly reliable heat exchanger having a good heat exchange performance at lower cost.

Further, the small-gage wire used to anchor the plurality of heat transfer tubes is provided in the spiral form. After the formation, the brazing material having the predetermined thickness is previously applied to the outer surface of at least any one of the spiral small-gage wire and the plurality of heat transfer tubes. After the application, the spiral small-gage wire is set to surround the outer peripheries of the adjacent heat transfer tubes. After setting the small-gage wire, the heat transfer tubes are respectively pulled in the opposite directions to apply tension to the small-gage wires. Then, after applying the tension, the brazing material is melted and cooled to join the small-gage wires with the outer surfaces of the heat transfer tubes. Therefore, it is possible to easily fabricate the heat exchanger in which the tight contact between the heat transfer tubes and the small-gage wires is enhanced while correcting deformation of the small-gage wires. Further, it is possible to provide a method of fabricating an apparatus, in which yield on a finished product can be enhanced.

Further, the brazing material having the predetermined thickness is previously applied to at least any one of the outer surfaces of the plurality of heat transfer tubes and the hole portion surfaces of the headers. After the application, the both ends of the heat transfer tubes are fitted with the hole portions in the headers. After the fitting operation, the brazing material is melted and cooled to join the both ends with the hole portions. Control is made such that the applied brazing material is concentrated and condensed at the joints between the heat transfer tubes and the headers, thereby surely avoiding leakage of the in-tube fluid. It is thereby possible to easily fabricate the heat exchanger in which the heat exchanging ability is never reduced.

Further, after the heat transfer tubes are inserted into the hole portions in the headers, the brazing material is melted and cooled to join the small-gage wire with the outer surfaces of the heat transfer tubes, and to join the both ends of the heat transfer tubes with the hole portions in the headers. Consequently, the intervals between the heat transfer tubes are not affected by the thermal deformation of the small-gage wire, and a correcting operation for the intervals between the heat transfer tubes becomes unnecessary. Besides, it is possible to simplify the joint operation for the joint between the heat transfer tubes, the small-gage wire, and the headers, and to reduce joint energy consumption. As a result, the heat exchanger can economically be fabricated.

Further, after the both ends of the heat transfer tubes are joined with the hole portions in the headers, the small-gage wire is joined with the outer surfaces of the heat transfer tubes. In this case, though the small-gage wire is easily distorted due to an effect of heat, the small-gage wire is free from the effect of heat generated to join the both ends of the heat transfer tubes with the hole portions in the headers. Therefore, it is possible to economically fabricate the heat exchanger having a good heat exchange performance without the correcting operation for the intervals between the heat transfer tubes.

Further, after the both ends of the heat transfer tubes are joined with the hole portions in the headers, the joint is dipped into the bath of molten solder. Subsequently, the gap in the joint between the both ends of the heat transfer tube and the hole portions is filled with solder, resulting in more enhanced airtightness. As a result, it is possible to fabricate the heat exchanger in which leakage of the in-tube fluid can more surely be prevented.

Further, after the both ends of the heat transfer tubes are joined with the hole portions in the headers, the joint is dipped into the bath of molten solder. Subsequently, the gap in the joint between the both ends of the heat transfer tubes and the hole portions is filled with solder. As a result, it is possible to fabricate the heat exchanger with more enhanced airtightness.

Further, in the apparatus for fabricating the heat exchanger, the tension jig is provided with the pair of jigs to which the pin portions are fixed so as to engage the outer surfaces of the heat transfer tubes, the guide shafts inserted into the pairs of through-holes provided in the pair of jigs so as to be connected to the pair of jigs through the through-holes, and the coil springs disposed between the pair of jigs, into which the guide shafts are inserted. Thus, when the heat transfer tubes are anchored by the respective pin portions of the pair of jigs, the heat transfer tubes are anchored while pulling the pin portions and compressing the coil springs. Therefore, after the completion of anchoring, in reverse, the pin portions pull the heat transfer tubes, and the pulled heat transfer tubes pull the spiral small-gage wires wound at the heat transfer tubes.

In the apparatus for fabricating the heat exchanger, the tension jig pulls the spiral small-gage wires wound at the adjacent heat transfer tubes in the simple structure. As a result, it is possible to economically provide the tension jig having a good tension balance performance.

Further, in the apparatus for fabricating the heat exchanger, the tension jig is provided with the pair of jigs to which the plate portions are fixed so as to engage the heating surface including the heat transfer tubes and the small-gage wire wound at the outer peripheries of the heat transfer tubes for each pair of adjacent heat transfer tubes among the heat transfer tubes, the guide shafts inserted into the pairs of through-holes provided in the pair of jigs so as to be connected to the pair of jigs through the through-holes, and the coil springs mounted on the outside of the pair of jigs, into which the guide shafts are inserted. The heating surface is inserted between the plate portions of the pair of jigs. In this case, since the heat surface is inserted while the plate portions of the pair of jigs are pressed, the coil spring is compressed. Subsequently, after the completion of insertion, in reverse, the heating surface including the heat transfer tubes and the small-gage wires is pressed by the plate portions, thereby pulling the spiral small-gage wires wound at the adjacent heat transfer tubes.

In the apparatus for fabricating the heat exchanger, the tension jig has the simple structure in which the heating surface including the heat transfer tubes and the small-gage wire is pressed by the plate portions, thereby pulling the spiral small-gage wire wound at the adjacent heat transfer tubes irrespective of positions of the heat transfer tubes. As a result, it is possible to provide the economical and convenient tension jig having a good tension balance performance.

Further, the headers are provided with the channel-shaped header plates having the hole portions respectively connected to the both ends of the plurality of heat transfer tubes, and the header covers connected to the channel-shaped side surfaces of the header plates. The both ends of the heat transfer tubes are inserted into the channel-shaped header plates from the opening side of the channel shape so as to be connected to the hole portions in the headers. In the structure, it is easy to recognize a state of the both ends of the heat transfer tubes passing through the header plate hole portions after insertion, and to cut the both ends. As a result, it is possible to provide the heat exchanger having a structure to facilitate fabrication thereof.

Further, the both ends of the heat transfer tubes are inserted into the hole portions in the header plates so as to be welded, and the excess portions of the heat transfer tubes passing through the hole portions are cut after welding. After the cutting operation, the both sides of the header plates are bent to form the channel-shaped header plates. After the formation, the channel-shaped header plates are covered with the header covers and are welded. As a result, it is possible to easily cut the excess heat transfer tubes passing through the hole portions, thereby easily fabricating the heat exchanger having a good distribution of the in-tube fluid.

As stated above, according to the present invention, there is provided the heat exchanger including the inlet header into which the gas-liquid two-phase coolant flows, the outlet header from which the coolant is discharged after heat exchange, the inlet header and the outlet header being disposed on the upper and lower sides at the predetermined interval, and the plurality of heat transfer tubes to communicate the inlet header with the outlet header. In the heat exchanger, the coolant is divided into the gaseous phase and the liquid phase in the inlet header, and the gas bypass pipe is mounted to send the gaseous coolant to the outlet header. In the coolant divided into the gaseous phase and the liquid phase in the inlet header, the gaseous phase having the lower specific gravity is positioned on the upper side, and the liquid phase having the higher specific gravity is positioned on the lower side. Hence, the gaseous phase intensively flows into the gas bypass pipe, and only the liquid phase flows into the plurality of heat transfer tubes. As a result, it is possible to eliminate the inhomogeneous distribution of the coolant, and restrain reduction of the effective heating surface area. Further, when the heat exchanger is incorporated in the air conditioner which is long from side to side, it is possible to mount the piping while realizing space saving because of the short distance between the inlet header and the outlet header.

Further, according to the present invention, the rectifying means including, for example, the honeycomb-like lattice is mounted between the coolant piping connecting portion of the inlet header and the gas bypass pipe. Then, the coolant flows into the inlet header through the coolant piping while the coolant is decelerated. The coolant flow is rectified through the lattice, and tends to be the stratified flow in which the upper gaseous phase and the lower liquid phase are separated from one another. Hence, the gaseous phase intensively flows into the gas bypass pipe, and only the liquid phase passes through the plurality of heat transfer tubes. As a result, it is possible to eliminate the inhomogeneous distribution of the coolant, and restrain reduction of the effective heating surface area. Further, when the heat exchanger is incorporated in the air conditioner which is long from side to side, it is possible to mount the piping while realizing space saving because of the short distance between the inlet header and the outlet header.

Further, according to the present invention, the projection extends from the upper portion in the section of the flow path between the coolant piping connecting portion of the inlet header and the gas bypass pipe. Thus, even if the flowing two-phase coolant forms the wave-like flow due to the turbulent gas-liquid interface, the waves are canceled by the projection. Therefore, the two-phase coolant flow becomes gentle and tends to be the stratified flow in which the upper gaseous phase and the lower liquid phase are separated from one another. Hence, the gaseous phase intensively flows into the gas bypass pipe, and only the liquid phase passes through the plurality of heat transfer tubes. As a result, it is possible to eliminate the inhomogeneous distribution of the coolant, and restrain reduction of the effective heating surface area. Further, when the heat exchanger is incorporated in the air conditioner which is long from side to side, it is possible to mount the piping while realizing space saving because of the short distance between the inlet header and the outlet header.

Further, according to the present invention, there is provided the heat exchanger including the inlet header connected to the coolant piping, into which the gas-liquid two-phase coolant flows, the outlet header disposed at the upper position than that of the inlet header, and the plurality of heat transfer tubes to communicate the inlet header with the outlet header. In the heat exchanger, the gas bypass pipe to communicate the inlet header with the outlet header is mounted on the side of the coolant piping connecting portion of the inlet header with respect to the heat transfer tubes. Hence, when the coolant flows into the inlet header through the coolant piping while the coolant is decelerated, the coolant forms a flow in which the upper gaseous phase and the lower liquid phase are separated from one another. Accordingly, the gaseous phase intensively flows into the gas bypass pipe, and only the liquid phase passes through the plurality of heat transfer tubes. As a result, it is possible to eliminate the inhomogeneous distribution of the coolant, and restrain reduction of the effective heating surface area. Further, when the heat exchanger is incorporated in an air conditioner which is long from side to side, it is possible to mount the piping while realizing space saving because of the short distance between the inlet header and the outlet header.

Further, according to the present invention, the connecting portion between the gas bypass pipe and the inlet header has a larger bore diameter than that of the connecting portion to the outlet header, thereby setting a larger sectional area of the liquid level defined by the connecting portion between the inlet header and the gas bypass pipe. Consequently, even in case of the turbulent gas-liquid interface, separation of the gas from the liquid can be facilitated. Hence, the gaseous phase intensively flows into the gas bypass pipe, and only the liquid phase passes through the plurality of heat transfer tubes. As a result, it is possible to eliminate the inhomogeneous distribution of the coolant, and restrain reduction of the effective heating surface area. Further, when the heat exchanger is incorporated in an air conditioner which is long from side to side, it is possible to mount the piping while realizing space saving because of the short distance between the inlet header and the outlet header.

Further, according to the present invention, the tube axis of the gas bypass pipe eccentrically extends on the side of the heat transfer tubes in the vicinity of the connecting portion to the inlet header. Thus, even in case of the turbulent gas-liquid interface, the liquid phase having higher inertia is easy to directly pass through the connecting portion to the gas bypass pipe. The gaseous phase having lower inertia is easy to intensively flow into the gas bypass pipe, and only the liquid phase passes through the plurality of heat transfer tubes. As a result, it is possible to eliminate the inhomogeneous distribution of the coolant, and restrain reduction of the effective heating surface area. Further, when the heat exchanger is incorporated in an air conditioner which is long from side to side, it is possible to mount the piping while realizing space saving because of the short distance between the inlet header and the outlet header.

Further, according to the present invention, there is provided the heat exchanger including the inlet header connected to the coolant piping, into which the coolant flows, the outlet header disposed at the upper position than that of the inlet header, and the plurality of heat transfer tubes to communicate the inlet header with the outlet header. In the heat exchanger, the perforated plate is mounted to have the plurality of holes and partition the space in the inlet header into the upper and lower spaces, and the gas bypass pipe to communicate the end of the inlet header on the side opposed to the coolant piping connecting portion with the outlet header. In addition, since the openings in the heat transfer tubes are positioned under the perforated plate, the perforated plate can reduce turbulence of the gas-liquid interface of the flowing two-phase coolant. In separation of the coolant, the gaseous phase having the lower specific gravity is positioned on the upper side, and the liquid phase having the higher specific gravity is positioned on the lower side. Hence, the liquid phase flows into the plurality of heat transfer tubes whose ends are disposed at relatively lower portions of the inlet header, and the gaseous phase intensively flows into the gas bypass pipe. As a result, it is possible to eliminate the inhomogeneous distribution of the coolant, and restrain reduction of the effective heating surface area. Since the gas bypass pipe is disposed at the end of the inlet header on the side opposed to the coolant piping connecting portion, the flow velocity of the coolant becomes lower in the gas bypass pipe than would be in the inlet portion. Consequently, the coolant can bypass with sufficient separation of the gas. Further, when the heat exchanger is incorporated in an air conditioner which is long from side to side, it is possible to mount the piping while realizing space saving because of the short distance between the inlet header and the outlet header.

Further, according to the present invention, there is provided the heat exchanger including the inlet header connected to the coolant piping, into which the coolant flows, the outlet header disposed at the lower position than that of the inlet header, and the plurality of heat transfer tubes to communicate the inlet header with the outlet header. In the heat exchanger, the gas bypass pipe to communicate the inlet header with the outlet header is mounted at the end of the inlet header on the side opposed to the coolant piping connecting portion. The coolant is divided into the gaseous phase and the liquid phase in the inlet header. The gaseous phase having the lower specific gravity is positioned on the upper side, and the liquid phase having the higher specific gravity is positioned on the lower side. Hence, the liquid phase flows into the plurality of heat transfer tubes, and the gaseous phase intensively flows into the gas bypass pipe. As a result, it is possible to eliminate the inhomogeneous distribution of the coolant, and restrain reduction of the effective heating surface area. Further, when the heat exchanger is incorporated in an air conditioner which is long from side to side, it is possible to mount the piping while realizing space saving because of the short distance between the inlet header and the outlet header.

Further, according to the present invention, there is provided the interval in which the coolant forms the stratified flow between the coolant piping connecting portion of the inlet header and the heat transfer tubes. In the interval, the gaseous phase and the liquid phase are substantially completely separated from one another, and the gaseous phase having the lower specific gravity is positioned on the upper side, and the liquid phase having the higher specific gravity is positioned on the lower side. Hence, the gaseous phase intensively flows into the gas bypass pipe, and only the liquid phase flows into the plurality of heat transfer tubes. As a result, it is possible to eliminate the inhomogeneous distribution of the coolant, and restrain reduction of the effective heating surface area.

Further, according to the present invention, the inlet header is provided with the first interval having the coolant inlet, and the second interval coupled with the heat transfer tubes and the gas bypass pipe. The inlet header is bent such that the first interval can be disposed adjacent to the second interval. Thereby, the piping can be mounted while realizing space saving, and the gaseous phase and the liquid phase are substantially completely separated from one another in the first interval. That is, the gaseous phase having the lower specific gravity is positioned on the upper side, and the liquid phase having the higher specific gravity is positioned on the lower side. Hence, in the second interval, the gaseous phase intensively flows into the gas bypass pipe, and only the liquid phase flows into the plurality of heat transfer tubes. As a result, it is possible to eliminate the inhomogeneous distribution of the coolant, and restrain reduction of the effective heating surface area.

Further, according to the present invention, the gas-liquid separating member is mounted to separate the gas from the liquid in the gas bypass pipe. Therefore, even if the liquid phase enters the gas bypass pipe, the liquid phase adheres to the gas-liquid separating member to drop by gravity. Hence, only the gaseous phase can pass through the gas bypass pipe, and no liquid phase flows into the outlet header, thereby avoiding a back flow of the liquid. It is thereby possible to enhance reliability of the coolant circuit.

Further, according to the present invention, the gas bypass pipe is provided with the fin for heat exchange. Therefore, even if the liquid phase enters the gas bypass pipe, the liquid phase is evaporated to turn into the gaseous phase by heat exchange between the liquid phase and the out-tube operating fluid flowing above the fin. As a result, no liquid phase flows into the outlet header, and a back flow of the liquid can be avoided. It is thereby possible to enhance reliability of the coolant circuit.

Further, according to the present invention, the check valve is mounted in the course of the gas bypass pipe. Therefore, the heat exchanger can also be used as the evaporator by reversing the flow of the coolant. As a result, the heat exchanger of the present invention can be applied to the coolant circuit to drive the heat pump.

While preferred embodiments of the invention have been described using specific terms, such description is for illustrative purposes only, and it is to be understood that changes and variations may be made without departing from the spirit or scope of the following claims.

What is claimed is:

1. In a refrigeration system including a compressor, a condenser, and an evaporator, to circulate a coolant through the compressor, the condenser, and the evaporator, a heat exchanger of at least one of the condenser and the evaporator comprising:
at least three heat transfer tubes disposed between a pair of headers; and
a plurality of small-gage wire fins each wire fin being wound in a spiral manner around a pair of adjacent heat transfer tubes among the plurality of heat transfer tubes such that a wire fin is wound around all pairs of adjacent heat transfer tubes.

2. A refrigeration system according to claim 1, wherein an angle of spiral of the small-gage wire wound in the spiral manner is set greater than a predetermined angle.

3. A refrigeration system according to claim 1, wherein the plurality of heat transfer tubes are curved.

4. A refrigeration system according to claim 1, wherein an array including the plurality of heat transfer tubes is disposed in a curved form or a bent form.

5. A heat exchanger according to any one of claims 1 to 4, wherein a small-gage wire having a fin diameter smaller than 0.5 mm is employed.

6. In an air conditioner including an outdoor machine and an indoor machine connected through piping, to circulate a coolant by a compressor, a heat exchanger of one of the indoor machine and the outdoor machine comprising:
of at least three heat transfer tubes disposed between a pair of headers; and
a plurality of small-gage wire fins each wire fin wound in a spiral manner a pair of adjacent heat transfer tubes among the plurality of heat transfer tubes such that a wire fin is wound around all pairs of adjacent heat transfer tubes.

7. An air conditioner according to claim 6, wherein an angle of spiral of the small-gage wire wound in the spiral manner is set greater than a predetermined angle.

8. An air conditioner according to claim 6, wherein the plurality of heat transfer tubes are curved.

9. An air conditioner according to claim 6, wherein an array including the plurality of heat transfer tubes is disposed in a curved form or a bent form.

10. A heat exchanger according to any one of claims 6 to 9, wherein a small-gage wire having a fin diameter smaller than 0.5 mm is employed.

* * * * *